(12) United States Patent
Kim et al.

(10) Patent No.: US 10,009,657 B2
(45) Date of Patent: Jun. 26, 2018

(54) IMAGE DISPLAY APPARATUS

(71) Applicant: LG ELECTRONICS INC., Seoul (KR)

(72) Inventors: Sungoh Kim, Seoul (KR); Seongwoon Seol, Seoul (KR); Hyeseung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 14/865,407

(22) Filed: Sep. 25, 2015

(65) Prior Publication Data

US 2016/0098963 A1 Apr. 7, 2016

(30) Foreign Application Priority Data

| Oct. 1, 2014 | (KR) | 10-2014-0132616 |
| Oct. 1, 2014 | (KR) | 10-2014-0132618 |
| Jan. 6, 2015 | (KR) | 10-2015-0001154 |

(51) Int. Cl.
*G09G 5/00* (2006.01)
*H04N 21/485* (2011.01)
(Continued)

(52) U.S. Cl.
CPC ....... *H04N 21/4854* (2013.01); *G09G 3/3406* (2013.01); *G09G 3/3426* (2013.01); *H04N 5/45* (2013.01); *H04N 5/57* (2013.01); *G02F 2001/133601* (2013.01); *G09G 2320/0271* (2013.01); *G09G 2320/062* (2013.01); *G09G 2320/066* (2013.01); *G09G 2320/0626* (2013.01); *G09G 2320/0646* (2013.01);
(Continued)

(58) Field of Classification Search
CPC ...... H04N 13/0022; G09G 3/342; G09G 5/10; G09G 3/3426; G09G 3/3406
USPC ................................ 345/207, 419, 690, 609
See application file for complete search history.

(56) References Cited

U.S. PATENT DOCUMENTS

| 2003/0146919 A1* | 8/2003 | Kawashima ......... G09G 3/3406 |
| | | 345/609 |
| 2011/0122171 A1* | 5/2011 | Kwon .................... G09G 3/342 |
| | | 345/690 |

(Continued)

FOREIGN PATENT DOCUMENTS

| CN | 100470626 | 3/2009 |
| WO | WO 2013/175841 A1 | 11/2013 |

OTHER PUBLICATIONS

European Search Report dated Mar. 14, 2016 issued in Application No. 15002792.8.

(Continued)

*Primary Examiner* — Abdul-Samad A Adediran
(74) *Attorney, Agent, or Firm* — KED & Associates, LLP

(57) ABSTRACT

An image display apparatus is disclosed. The image display apparatus includes a display panel, a backlight unit including a plurality of light sources to output light to the display panel, an image receiver to receive multiple images from a plurality of image sources, and a controller to perform control to display the multiple images received from the image receiver and to independently perform local dimming on each of the multiple images according to multiple image display input, and thus performs local dimming for each multiple image during display of the multiple images.

17 Claims, 48 Drawing Sheets

(51) Int. Cl.
*G09G 3/34* (2006.01)
*H04N 5/45* (2011.01)
*H04N 5/57* (2006.01)
*H04N 5/445* (2011.01)
*G02F 1/1335* (2006.01)

(52) U.S. Cl.
CPC . *G09G 2320/0686* (2013.01); *G09G 2320/08* (2013.01); *G09G 2340/04* (2013.01); *G09G 2340/045* (2013.01); *G09G 2340/0464* (2013.01); *G09G 2340/10* (2013.01); *G09G 2360/16* (2013.01); *G09G 2370/10* (2013.01); *G09G 2370/12* (2013.01); *G09G 2370/20* (2013.01); *H04N 5/445* (2013.01); *H04N 5/44591* (2013.01)

(56) References Cited

U.S. PATENT DOCUMENTS

| | | | | |
|---|---|---|---|---|
| 2011/0316829 A1* | 12/2011 | Oka | .................... | G09G 3/3426 345/207 |
| 2012/0113099 A1* | 5/2012 | Kim | .................. | H04N 13/0022 345/419 |
| 2013/0155125 A1* | 6/2013 | Inamura | .................. | G09G 5/10 345/690 |
| 2014/0085360 A1 | 3/2014 | Ohno et al. | | |
| 2015/0161932 A1 | 6/2015 | Kure et al. | | |

OTHER PUBLICATIONS

Chinese Office Action issued in Application 201510645018.1 dated Dec. 20, 2017 (full Chinese text and full English translation).

* cited by examiner

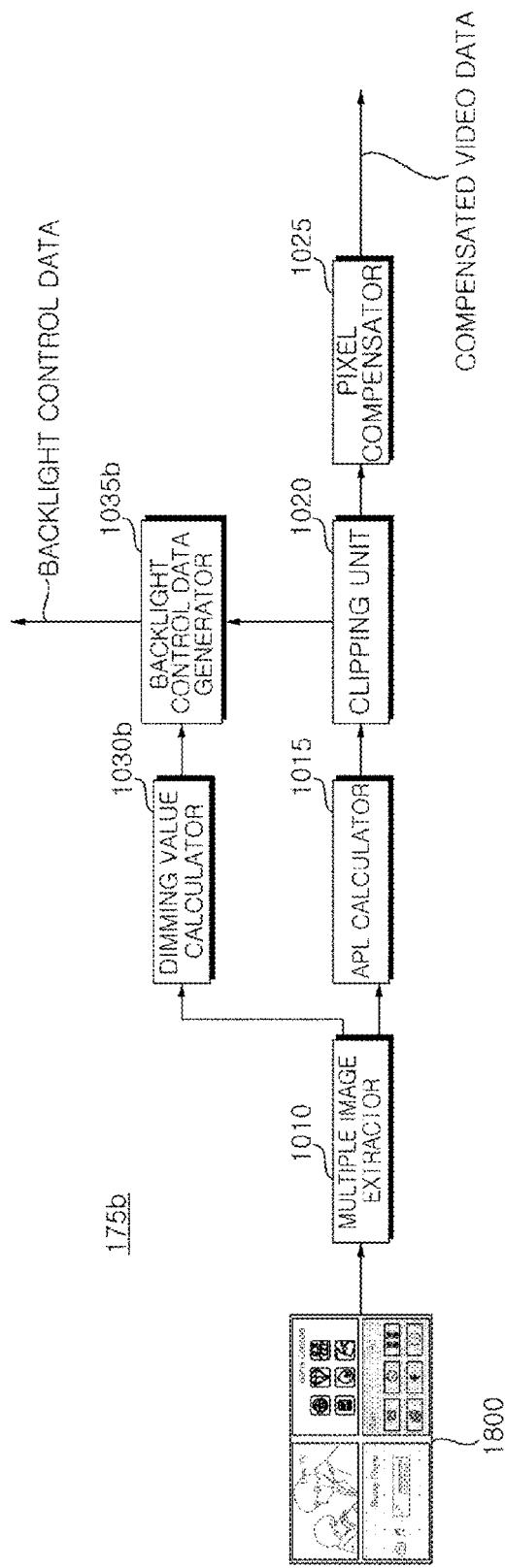

FIG. 22
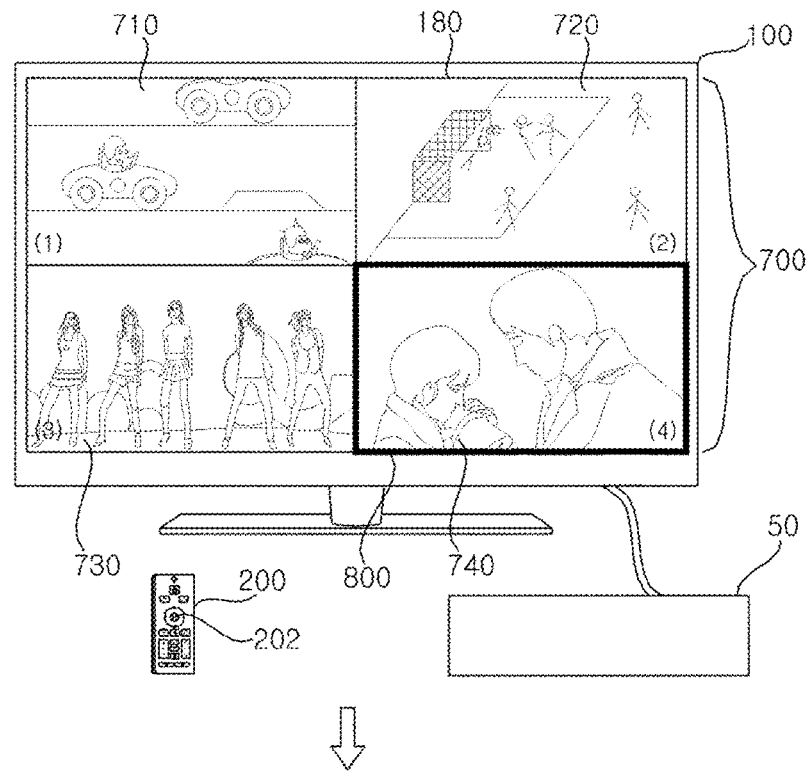
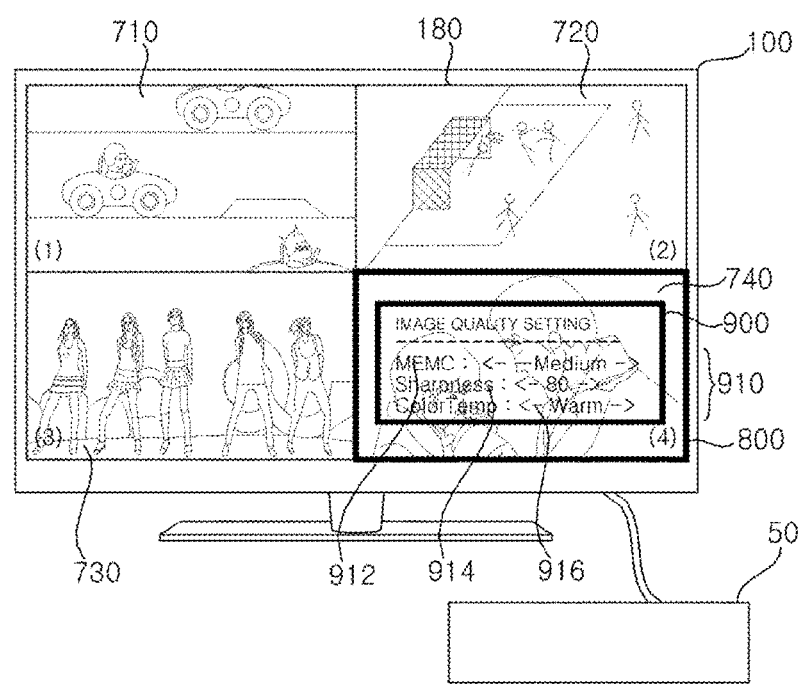

FIG. 33
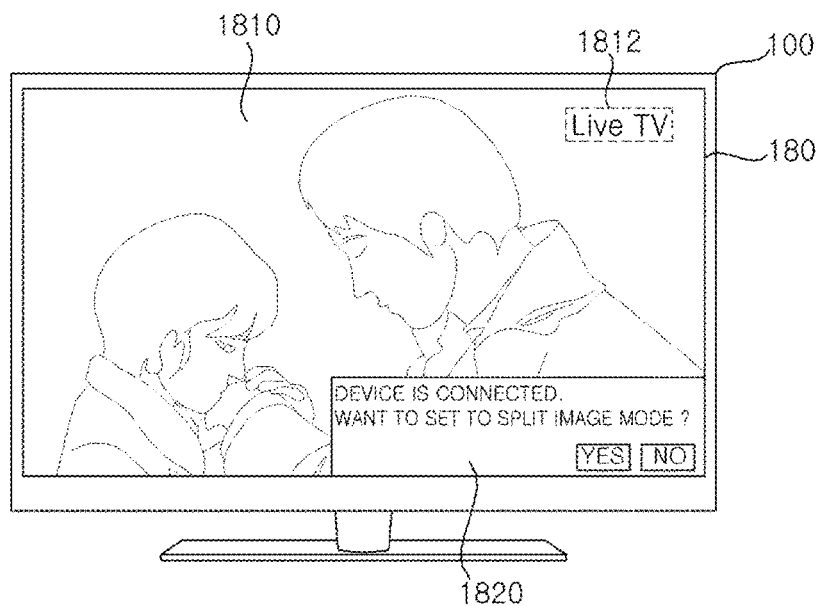
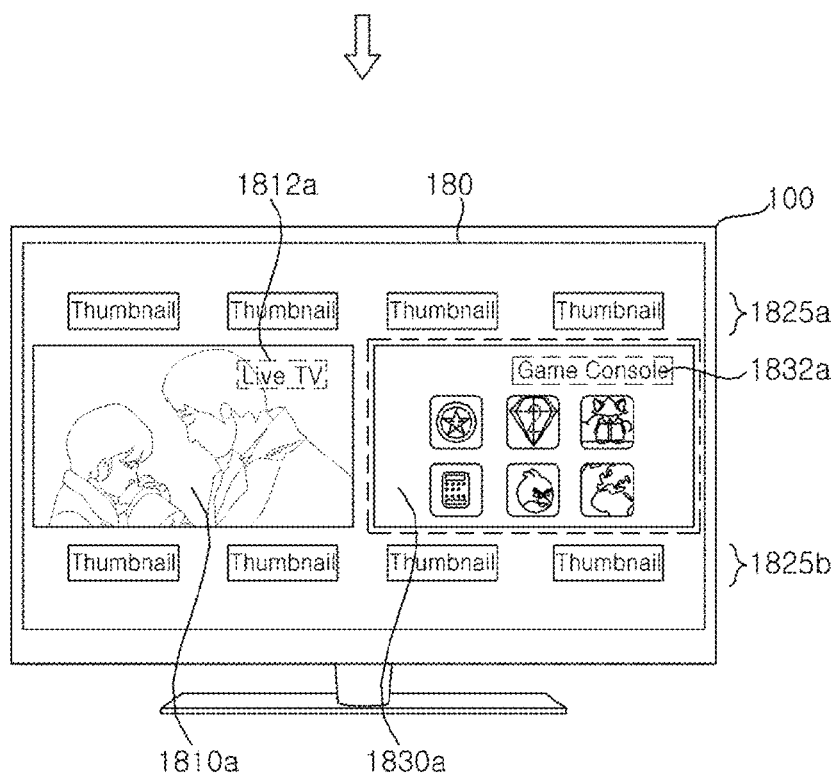

FIG. 34
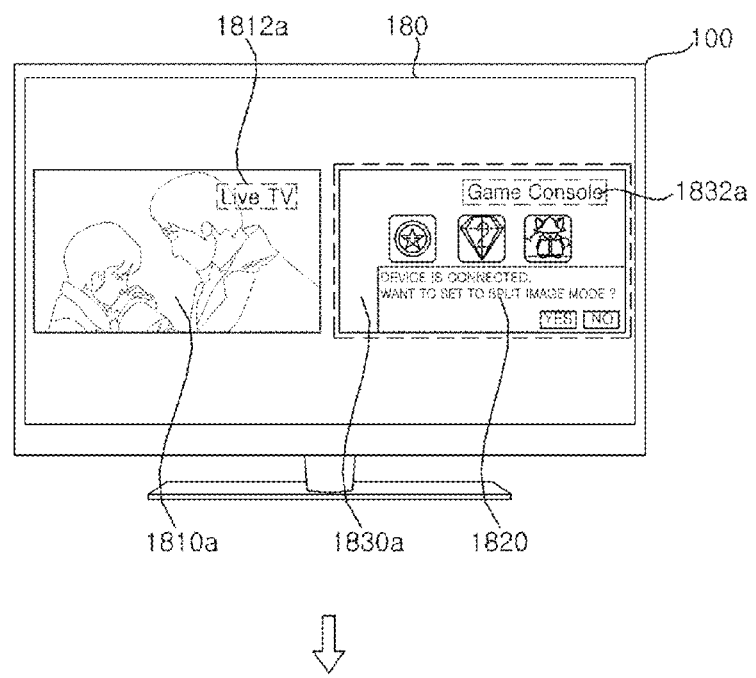
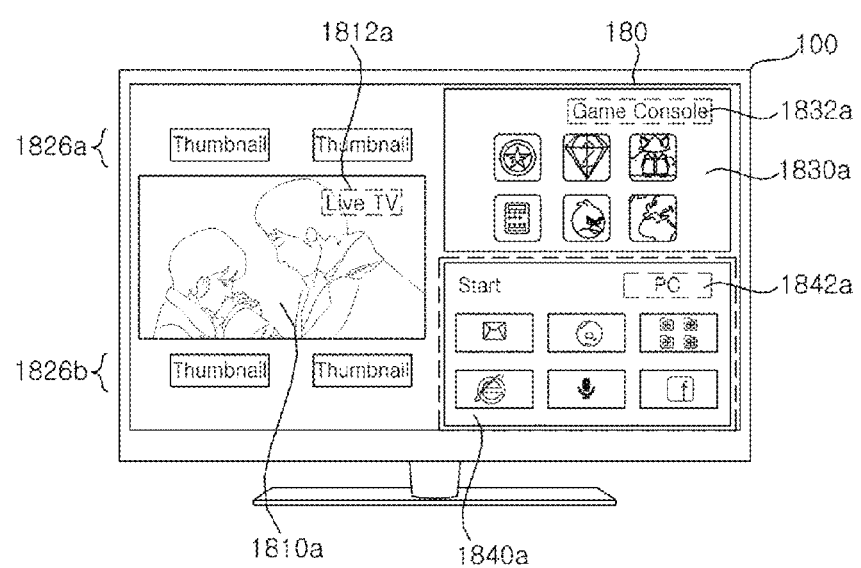

FIG. 35
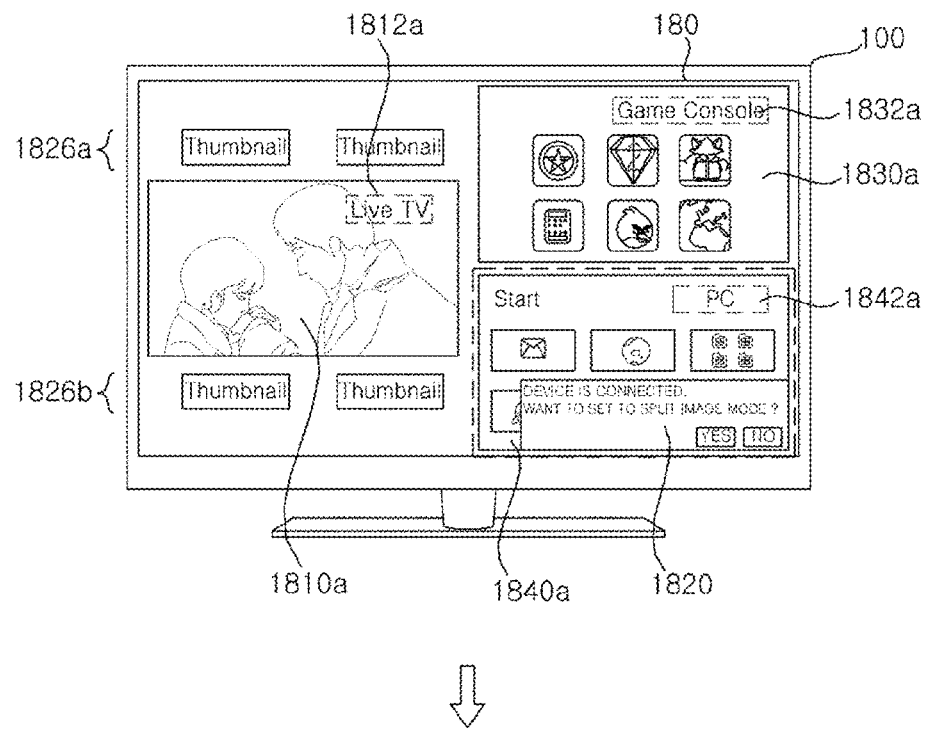
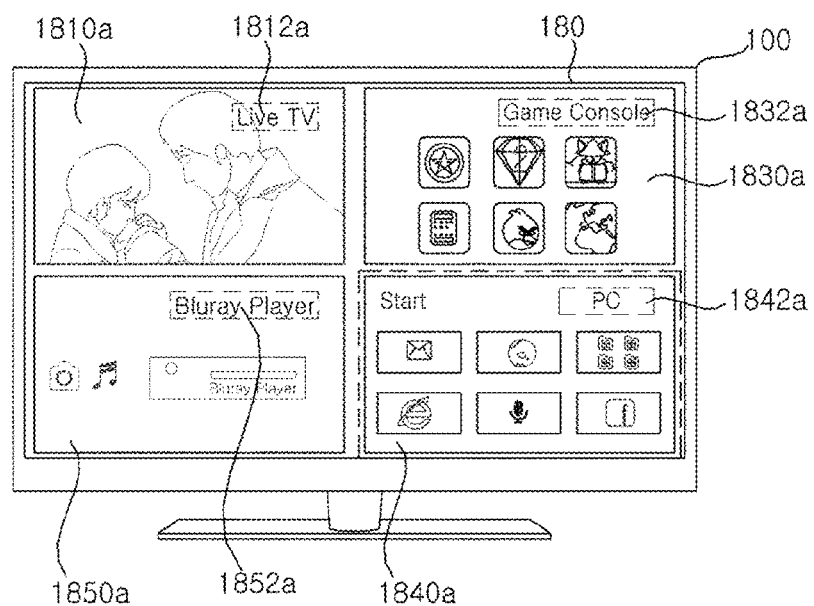

IMAGE DISPLAY APPARATUS

CROSS-REFERENCE TO RELATED APPLICATION

This application claims the priority benefit of Korean Patent Application Nos. 10-2015-0001154, filed on Jan. 6, 2015, 10-2014-0132618 and 10-2014-0132616, filed on Oct. 1, 2014, in the Korean Intellectual Property Office, the disclosure of which is incorporated herein by reference.

BACKGROUND OF THE INVENTION

1. Field of the Invention

The present invention relates to an image display apparatus, and more particularly to an image display apparatus for performing local dimming for each multiple image during display of multiple images.

2. Description of the Related Art

Digital broadcasting transmits a digital image and a voice signal. Digital broadcasting has low data loss due to high robustness to external noise, is advantageous for error correction, has high resolution, and provides a clear image, compared to analog broadcasting. In addition, digital broadcasting is able to provide an interactive service compared to analog broadcasting.

According to user demand for a clear image, resolution of an image display apparatus has been enhanced, and accordingly an image display apparatus with enhanced resolution has been developed.

SUMMARY OF THE INVENTION

Therefore, the present invention has been made in view of the above problems, and it is an object of the present invention to provide an image display apparatus that may perform local dimming for each multiple image during display of multiple images.

It is another object of the present invention to provide an image display apparatus and a method for operating the same, for simply performing image setting on a plurality of split images.

It is another object of the present invention to provide an image display apparatus and a method for operating the same, for simply recognizing source information of a plurality of images while the plurality of images is displayed as the same screen image.

In accordance with an aspect of the present invention, the above and other objects can be accomplished by the provision of an image display apparatus including a display panel, a backlight unit including a plurality of light sources to output light to the display panel, an image receiver to receive multiple images from a plurality of image sources, and a controller to perform control to display the multiple images received from the image receiver and to independently perform local dimming on each of the multiple images according to multiple image display input.

In accordance with another aspect of the present invention, there is provided an image display apparatus including a display panel, a backlight unit including a plurality of light sources to output light to the display panel, an image receiver to receive multiple images from a plurality of image sources, and a controller to perform control to extract the multiple images received from the image receiver, to calculate an average brightness level for each of the extracted multiple images, to perform clipping on a brightness level of the multiple images based on the average brightness level for each of the multiple images, to drive a light source based on a brightness level clipped for each of the multiple images.

In accordance with a further aspect of the present invention, there is provided an image display apparatus including a display panel, a backlight unit including a plurality of light sources to output light to the display panel, an image receiver to receive multiple images from a plurality of image sources, and a controller to perform control to display black of a first image with lower brightness than black of other images of the multiple images during display of black of the first image of the multiple images when an average brightness level of a single image containing multiple images is a first predetermined value, if an average brightness level of the first image of the multiple images is a second predetermined value less than the first predetermined value.

BRIEF DESCRIPTION OF THE DRAWINGS

The above and other objects, features and other advantages of the present invention will be more clearly understood from the following detailed description taken in conjunction with the accompanying drawings, in which:

FIGS. 9 to 16 are diagrams for explanation of the operating method of FIG. 8.

FIGS. 20 to 29 are diagrams for explanation of the operation method of FIG. 19.

FIGS. 32 to 38B are diagrams for explanation of the operation method of FIG. 31.

DETAILED DESCRIPTION OF THE PREFERRED EMBODIMENTS

Exemplary embodiments of the present invention will be described with reference to the attached drawings.

In addition, the suffixes "module" and "unit" of elements herein are used for convenience of description and do not have any distinguishable meanings or functions. Accordingly, "module" and "unit" can be used interchangeably.

Figure 1:
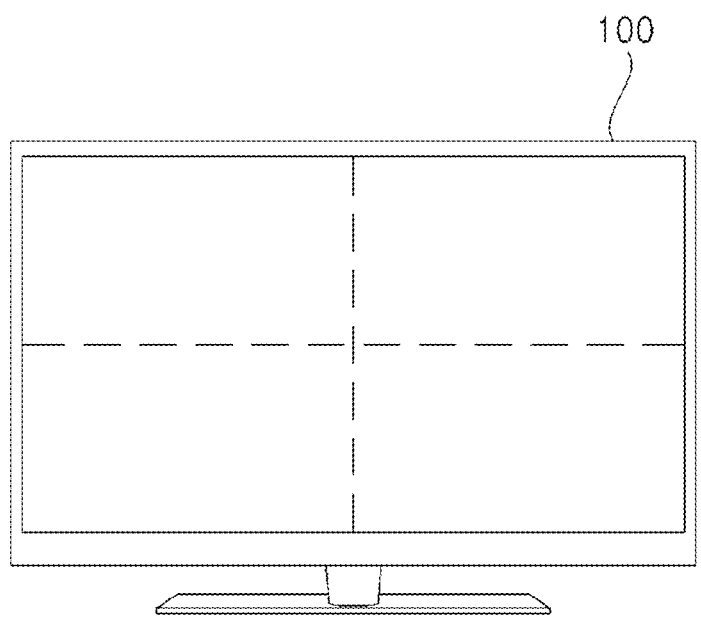
FIG. 1 is a diagram illustrating an external appearance of an image display apparatus according to an embodiment of the present invention

FIG. 1 is a diagram illustrating an external appearance of an image display apparatus 100 according to an embodiment of the present invention.

Referring to FIG. 1, the image display apparatus 100 according to an embodiment of the present invention may include a display 180 (refer to FIG. 2) and a controller 170 (refer to FIG. 2) for display of an image on the display 180.

The display 180 (refer to FIG. 2) may include a liquid crystal display panel 210 (refer to FIG. 6) and a plurality of light sources 252 (refer to FIG. 6) for output of light to the crystal panel 210.

The display 180 (refer to FIG. 2) including a plurality of light sources may perform local dimming in order to enhance contrast and so on during display of black of an image.

As resolution of the image display apparatus 100, in particular, the display 180 has been enhanced to high definition (HD), full HD, ultra high definition (UHD), 4 k, 8 k, and so on, the number of images displayable on the image display apparatus 100 has increased. For example, a UHD image display apparatus 100 may display four HD images.

Accordingly, in response to multiple image display being input, the image display apparatus 100 may mix multiple images received by an image receiver 105 (refer to FIG. 2) into one single image and display the single image.

In this case, when the multiple images are displayed as one single image, if the multiple images are considered as one single image and local dimming and so on are performed, images may be differently displayed or image quality may be degraded in some regions due to multiple images with different brightnesses and so on.

According to an embodiment of the present invention, in order to overcome this issue, the image display apparatus 100 may perform local dimming on each extracted multiple image according to the multiple image display input, thereby overcoming the issue in terms of different display of multiple images and enhancing overall image quality.

For example, the image display apparatus 100 may output backlight control data for control of a light source to the plurality of light sources 252 (refer to FIG. 6) based on at least one of a brightness level and dimming value of the extracted multiple image.

In detail, when an average brightness level (APL) of a single image containing multiple images is a small first predetermined value, if an APL of a first image of the multiple images is a second predetermined value less than the first predetermined value, the image display apparatus 100 may perform control to display black of the first image of the multiple images with lower brightness than black of other images of the multiple images during display of black of the first image of the multiple images, thereby overcoming the issue in terms of different display of multiple images and enhancing overall image quality.

In addition, when the APL of the single image containing multiple images is a large third predetermined value, if the APL of the first image of the multiple images is a fourth predetermined value larger than the third predetermined value, the image display apparatus 100 may perform control to display black of the first image of the multiple images with higher brightness than black of other images of the multiple images during display of black of the first image of the multiple images, thereby overcoming the issue in terms of different display of multiple images and enhancing overall image quality.

According to another embodiment of the present invention, according to multiple image display input, the image display apparatus 100 may extract multiple received images, calculate an APL of each extracted multiple image, perform clipping on a brightness level of the multiple images based on the APL of each multiple image, and drive a light source based on the brightness level clipped for each multiple image.

Various embodiments of the present invention will be described in more detail with reference to FIG. 8.

Figure 2:
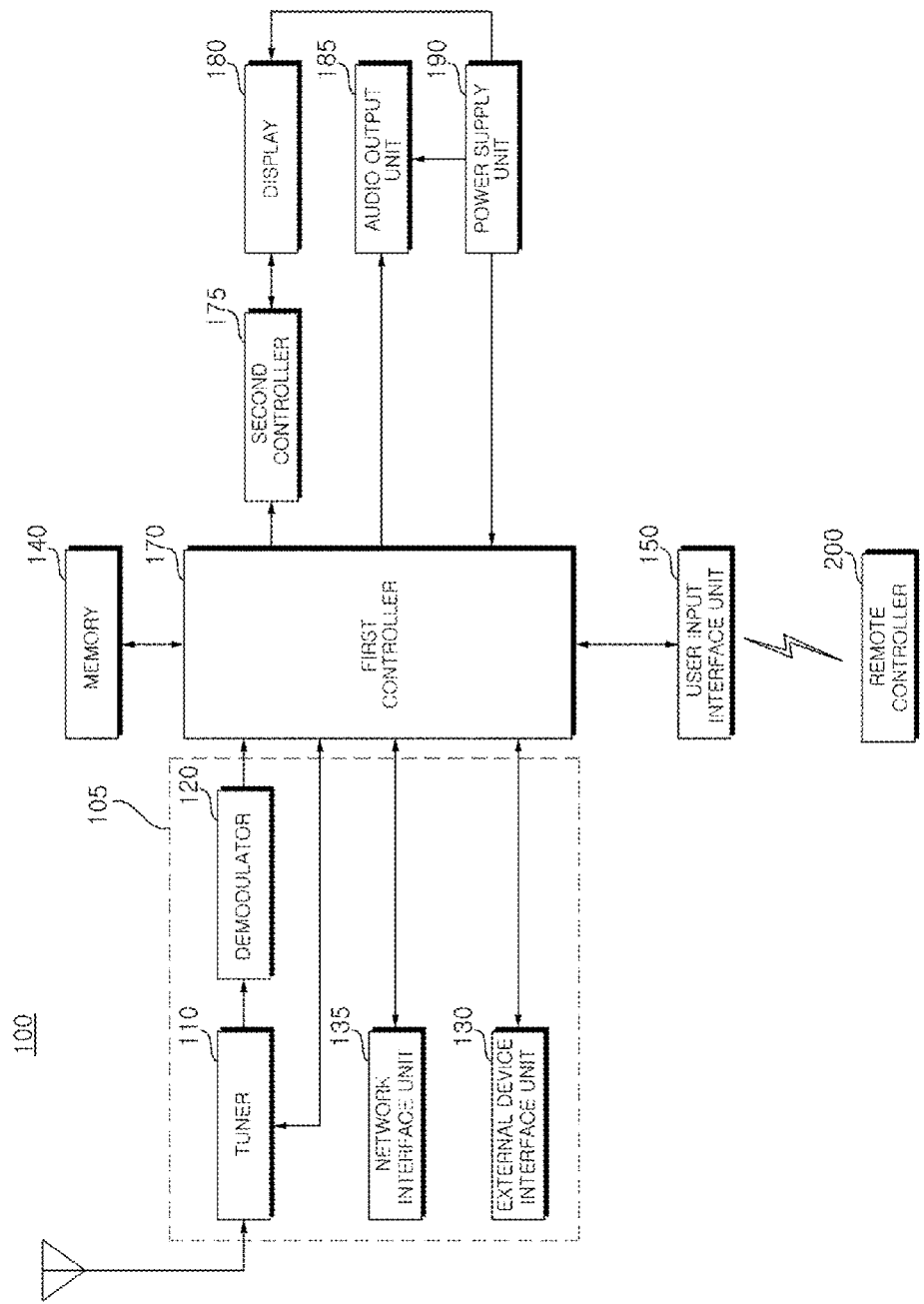
FIG. 2 is an internal block diagram of the image display apparatus of FIG. 1.

FIG. 2 is an internal block diagram of the image display apparatus 100 of FIG. 1.

Referring to FIG. 2, the image display apparatus 100 according to an embodiment of the present invention may include the image receiver 105, an external device interface unit 130, a memory 140, a user input interface unit 150, a sensor (not shown), a first controller 170, a second controller 175, the display 180, and an audio output unit 185.

The image receiver 105 may include a tuner 110, a demodulator 120, a network interface unit 135, and the external device interface unit 130.

That is, the image receiver 105 may receive multiple images from an external device. In detail, the image receiver 105 may receive a broadcast image from the tuner 110, a stream image from the network interface unit 135, and an external input image from the external device interface unit 130.

The multiple images from the image receiver 105 may be forwarded to the first controller 170.

The tuner 110 may tune to a radio frequency (RF) broadcast signal corresponding to a channel selected by a user or all pre-stored channels among RF broadcast signals received through an antenna 50. In addition, the selected RF broadcast signal may be converted into an intermediate frequency signal, a baseband image, or a voice signal.

For example, the selected RF broadcast signal may be converted into a digital IF (DIF) signal in the case of a digital broadcast signal and converted into an analog baseband image or a voice signal (CVBS/SIF) in the case of an analog broadcast signal. That is, the tuner 110 may process the digital broadcast signal or the analog broadcast signal. The analog baseband image or the voice signal (CVBS/SIF) output from the tuner 110 may be input directly to the first controller 170.

According to the present invention, the tuner 110 may sequentially select RF broadcast signals of all broadcast channels stored via a channel recording function among RF broadcast signals received through an antenna and may convert the RF broadcast signals into an intermediate frequency signal, a baseband image, or a voice signal.

In order to receive broadcast signals of a plurality of channels, the tuner 110 may include a plurality of tuners. Alternatively, the tuner 110 may include a single tuner for simultaneously receiving the broadcast signals of the plurality of channels.

The demodulator 120 may receive the digital IF (DIF) signal converted by the tuner 110 and demodulate the DIF signal.

The demodulator 120 may output a steam signal TS after demodulation and channel decoding. In this case, the stream signal may be obtained by multiplexing an image signal, a voice signal, or a data signal.

The stream signal output from the demodulator 120 may be input to the first controller 170. The first controller 170 may perform demultiplexing and image/voice signal processing to output an image to the display 180 and to output voice to the audio output unit 185.

The external device interface unit 130 may transmit or receive data to and from a connected external device 190. To this end, the external device interface unit 130 may include an audio/video (A/V) input and output unit (not shown) or a wireless communication unit (not shown).

The external device interface unit 130 may be connected by wire or wirelessly to an external device such as a digital versatile disc (DVD) player, a Bluray player, a game console, a camera, a camcorder, a computer (notebook computer), a set-top box, and so on, and may perform an input/output operation with an external device.

The A/V input and output unit may receive an image and voice signal of the external device. The wireless communication unit may perform short-range communication with other electronic devices.

The network interface unit 135 may provide an interface for connecting the image display apparatus 100 to a wireless/wired network including the Internet. For example, the network interface unit 135 may receive content or data provided by the Internet, a content provider, or a network operator through a network.

The memory 140 may store a program for processing and controlling each signal in the first controller 170 or the second controller 175 and store the signal-processed image, voice, or data signals.

The memory 140 may temporally store the image, voice, or data signals input to the external device interface unit 130. In addition, the memory 140 may store information about a predetermined broadcast channel through a channel recording function such as a channel map.

Although FIG. 2 illustrates the case in which the memory 140 is included separately from the first controller 170, the scope of the present invention is not limited thereto. The memory 140 may be included in the first controller 170.

The user input interface unit 150 may forward a signal input by a user or forward a signal from the first controller 170 to the user.

For example, the user input interface unit 150 may transmit/receive a user input signal such as power on/off, channel selection, and image setting to and from a remote controller 200, forward a user input signal input from a local key (not shown) such as a power key, a channel key, a volume key, and a setting key to the first controller 170, forward a user input signal input from a sensor (not shown) for setting a user gesture to the first controller 170, or transmit a signal from the first controller 170 to a sensor (not shown).

The first controller 170 may demultiplex a stream input through the tuner 110, the demodulator 120, or the external device interface unit 130 or process demultiplexed signals to generate and output signals for output of an image or voice.

In particular, the first controller 170 may mix and output multiple images from the image receiver 105 into one single image. To this end, the first controller 170 may scale each image and mix each image into one single image.

The first controller 170 will be described in more detail with reference to FIG. 3.

The second controller 170 may receive an image from the first controller 170 and signal-process the image to display the image on the display 180.

In particular, upon receiving one single image containing multiple images from the first controller 170, the second controller 170 may extract the multiple images. In addition, the second controller 170 may perform signal processing on each of the multiple images.

In particular, with regard to an embodiment of the present invention, the second controller 170 may perform control to perform local dimming for each multiple image.

In detail, the second controller 175 may perform control to extract the multiple images received from the image receiver and to perform local dimming on each of the extracted multiple images according to multiple image display input.

In addition, the second controller 175 may perform control to extract the multiple images received from the image receiver, to calculate an APL for each extracted multiple images, to perform clipping on a brightness level of the multiple images based on an APL of each multiple image, and to drive the light sources 252 (refer to FIG. 6) based on the brightness level clipped for each multiple image, according to multiple image display input.

In addition, when an APL of a single image containing multiple images is a small first predetermined value, if an APL of a first image of the multiple images is a second predetermined value less than the first predetermined value, the second controller 175 may perform control to display black of the first image of the multiple images with lower brightness than black of other images of the multiple images during display of black of the first image of the multiple images.

The first controller 170 may perform audio signal processing. The audio signal that is signal-processed by the first controller 170 may be forwarded to the audio output unit 185 and may be output as sound through the audio output unit 185.

In addition, the first controller 170 may control an overall operation in the image display apparatus 100. For example, the first controller 170 may control the tuner 110 to tune to an RF broadcast corresponding to a channel selected by a user or a pre-stored channel.

In addition, the first controller 170 may control the image display apparatus 100 according to an internal program or a user command input through the user input interface unit 150.

The first controller 170 may recognize a user position based on an image captured by a photographing unit (not shown). For example, the first controller 170 may recognize a distance (z-axis coordinates) between a user and the image display apparatus 100. In addition, the first controller 170 may recognize x-axis coordinates and y-axis coordinates on the display 180, which correspond to the user position.

Although not shown, the image display apparatus 100 may further include a channel browsing processor for generating a thumbnail image corresponding to a channel signal or an external input signal. The channel browsing processor may receive a stream signal output from the demodulator 120 or a stream signal and so on, which are output from the external device interface unit 130, and extract an image from the input stream input to generate a thumbnail image. The generated thumbnail image may be stream-decoded together with a decoded image, etc. and input to the first controller 170. The first controller 170 may perform control to display a thumbnail list including a plurality of thumbnail images on the display 180 using the input thumbnail image.

The display 180 may display a predetermined image according to an image signal and so on which are processed by the second controller 175.

Figure 6:
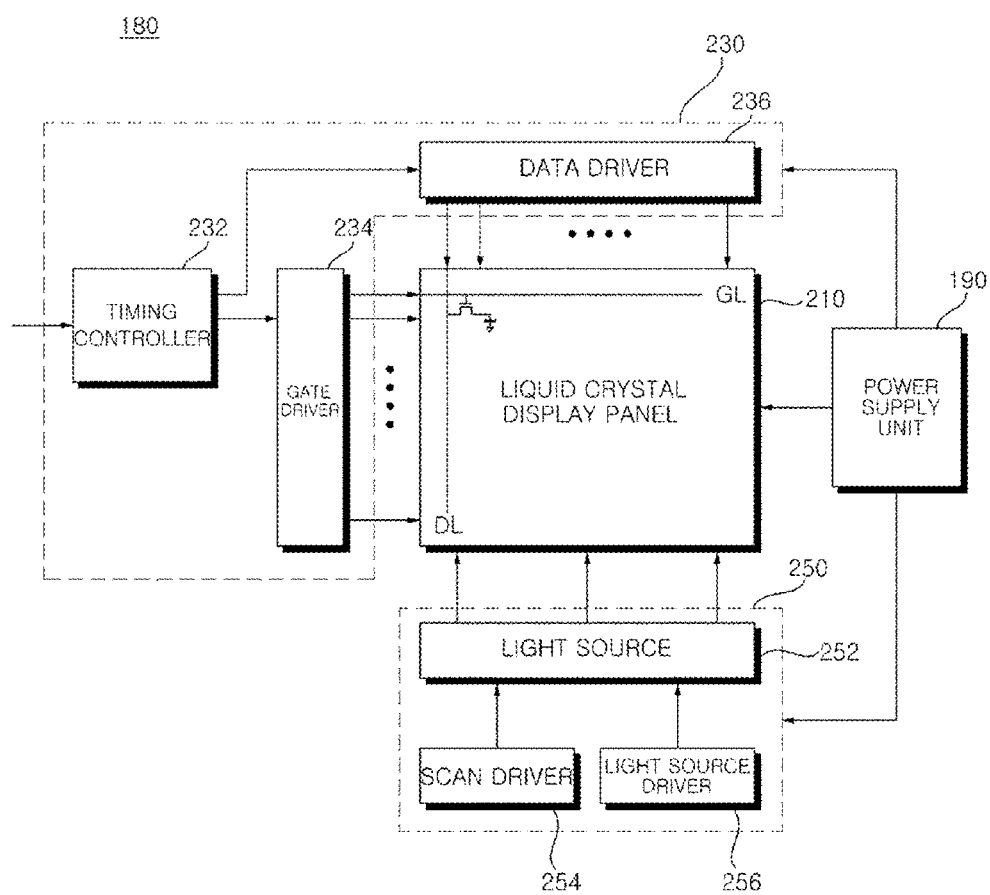
FIG. 6 is a diagram illustrating an example of an internal configuration of a power supply unit and a display of FIG. 2.

The display 180 may include the liquid crystal display panel 210 (refer to FIG. 6) and the plurality of light sources 252 (refer to FIG. 6).

The display 180 may be configured as a touchscreen so as to be used as an input device as well as an output device.

The audio output unit 185 may receive the audio signal that is signal-processed by the first controller 170 to output a corresponding sound.

The photographing unit (not shown) may photograph a user. The photographing unit (not shown) may include, but is not limited to, one camera and may include a plurality of cameras. The photographing unit (not shown) may be embedded in the image display apparatus 100 above the display 180 or may be separately disposed from the image display apparatus 100. Image information obtained by the photographing unit (not shown) may be input to the first controller 170.

The first controller 170 may detect a user gesture based on an image captured by the photographing unit (not shown), each signal detected from the sensor (not shown), or a combination thereof.

A power supply unit 190 may supply corresponding power across the image display apparatus 100. In particular, the power supply unit 190 may supply power to the first controller 170 embodied in the form of a system on chip (SOC), the display 180 for image display, and the audio output unit 185 for audio output.

In detail, the power supply unit 190 may include a converter for converting alternating current (AC) power into direct current (DC) power and a DC/DC converter for converting a level of the DC power.

The remote controller 200 may transmit user input to the user input interface unit 150. To this end, the remote controller 200 may use Bluetooth, radio frequency (RF) communication, infrared (IR) communication, ultra wideband (UWB), ZigBee, and so on. In addition, the remote controller 200 may receive image, voice, or data signals output from the user input interface unit 150 and display the signals or output voice through the remote controller 200.

The aforementioned image display apparatus 100 may be a stationary or mobile digital broadcast receiver that is capable of receiving digital broadcast.

The block diagram of the image display apparatus 100 of FIG. 2 is a block diagram of an embodiment of the present invention. Components of the block diagram may be integrated, added, or omitted according to the specification of the image display apparatus 100 that is actually embodied. That is, as necessary, two or more components may be integrated as one component or one component may be divided into two or more components. In addition, a function performed by each block is merely an embodiment of the present invention, and the scope of the present invention is not limited by a detailed operation or device.

Compared to FIG. 2, the image display apparatus 100 may receive and reproduce image content through the network interface unit 135 or the external device interface unit 130 without the tuner 110 and the demodulator 120 of FIG. 2.

The image display apparatus 100 is an example of an image signal processing apparatus that signal-processes an image stored in the apparatus or an input image. Another example of the image signal processing apparatus may include a set-top box, the aforementioned DVD player, a Bluray player, a game console, and a computer other than the display 180 and the audio output unit 185 illustrated in FIG. 2.

Figure 3:
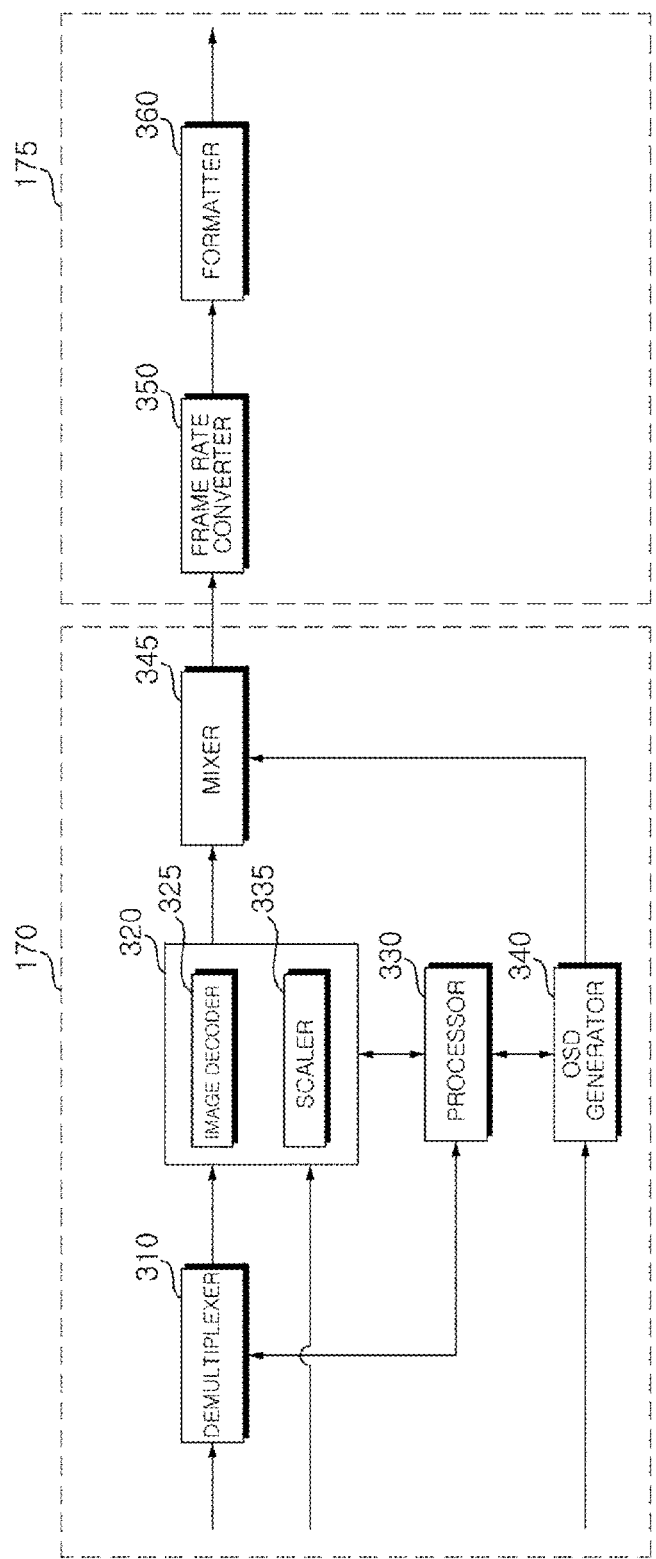
FIG. 3 is an internal block diagram of a first controller of FIG. 2.

FIG. 3 is an internal block diagram of the first controller 170 of FIG. 2.

Referring to FIG. 3, the first controller 170 according to an embodiment of the present invention may include a demultiplexer 310, an image processor 320, a processor 330, an OSD generator 340, a mixer 345, a frame rate converter 350, and a formatter 360. In addition, the first controller 170 may further include an audio processor (not shown) and a data processor (not shown).

The demultiplexer 310 may demultiplex an input stream. For example, when MPEG-2 TS is input, the MPEG-2 TS may be demultiplexed to extract image, voice, and data signals. Here, the stream signal input to the demultiplexer 310 may be a stream signal output from the tuner 110, the demodulator 120, or the external device interface unit 130.

The image processor 320 may image-process the demultiplexed image signal. To this end, the image processor 320 may include an image decoder 325 and a scaler 335.

The image decoder 325 may decode the demultiplexed image signal and the scaler 335 may scale resolution of the decoded image signal to output the image signal through the display 180.

The image decoder 325 may include various standards of decoders.

The image signal decoded by the image processor 320 may be various formats of 3D image signals. For example, the image signal may be a 3D image signal including a color difference image and a depth image or a 3D image signal including a multi-view image signal. The multi-view image signal may include, for example, a left-eye image signal or a right-eye image signal.

Here, a format of the 3D image signal may be a side by side format for positioning a left image signal L and a right image signal R to the left and right, a top/down format for positioning signals upward and downward, a frame sequential format for time division arrangement, an interlaced format for mixing a left image signal and a right image signal for each line, a checker box format for mixing a left image signal and a right image signal for each box, and the like.

The processor 330 may control an operation in the image display apparatus 100 or the first controller 170. For example, the processor 330 may control the tuner 110 to tune to an RF broadcast corresponding to a channel selected by a user or a pre-stored channel.

The processor 330 may control the image display apparatus 100 according to an internal program or a user command input through the user input interface unit 150.

The processor 330 may control data transmission through the network interface unit 135 or the external device interface unit 130.

In addition, the processor 330 may control operations of the demultiplexer 310, the image processor 320, the OSD generator 340, etc. in the first controller 170.

The OSD generator 340 may generate an OSD signal according to user input or autonomously. For example, the OSD generator 340 may generate a signal for displaying various information items as graphics or text on a monitor of the display 180 based on a user input signal. The generated OSD signal may include various data items such as a user interface image, various menu images, widgets, icons, and so on of the image display apparatus 100. In addition, the generated OSD signal may include a 2D object or a 3D object.

In addition, the OSD generator 340 may generate a pointer displayable on a display based on a pointing signal input from the remote controller 200. In particular, the pointer may be generated by a pointing signal processor, and the OSD generator 340 may include the pointing signal processor (not shown). Needless to say, the pointing signal processor (not shown) may not be disposed in the OSD generator 240 and may be separately provided from the OSD generator 240.

The mixer 345 may mix the OSD signal generated by the OSD generator 340 and the decoded image signal that is image-processed by the image processor 320. In this case, each of the OSD signal and the decoded image signal may include at least one of a 2D signal and a 3D signal. The mixed image signal may be provided to the frame rate converter 350.

The frame rate converter (FRC) 350 may convert a frame rate of an input image. The frame rate converter 350 may output the input image without changes without separate frame conversion.

The formatter 360 may arrange a left-eye image frame and a right-eye image frame of the 3D image with the converted frame rate. In addition, the formatter 360 may output a synchronization signal Vsync for opening a left-eye glass and a right-eye glass of a 3D viewing apparatus (not shown).

The formatter 360 may receive the signal mixed by the mixer 345, that is, the OSD signal and the decoded image signal, to extract a 2D image signal and a 3D image signal.

The formatter 360 may change a format of a 3D image signal. For example, the formatter 360 may change the format to any one of the aforementioned various formats.

The formatter 360 may convert a 2D image signal into a 3D image signal. For example, according to a 3D image generation algorithm, an edge or a selectable object may be detected from the 2D image signal, and an object according to the detected edge or the selectable object may be extracted and generated as a 3D image signal. In this case, as described above, the generated 3D image signal may be separated into a left image signal L and a right image signal R and the left image signal L and the right image signal R may be arranged.

Although not shown, after the formatter 360, a 3D processor (not shown) for 3-dimensional (3D) effect signal processing may be further disposed. The 3D processor (not shown) may adjust the brightness, tint, and color of the image signal in order to enhance the 3D effect. For example, signal processing and so on may be performed to make a short distance be in focus and to make a long distance be out of focus. The function of the 3D processor may be integrated with the formatter 360 or the image processor 320.

The audio processor (not shown) in the first controller 170 may voice-process the demultiplexed voice signal. To this end, the audio processor (not shown) may include various decoders.

The audio processor (not shown) in the first controller 170 may adjust base, treble, volume, and so on.

The data processor (not shown) in the first controller 170 may data-process the demultiplexed data signal. For example, when the demultiplexed data signal is an encoded data signal, the encoded data signal may be decoded. The encoded data signal may be electronic program guide (EPG) information including broadcast information such as start time and finish time of a broadcast program that is broadcast in each channel.

Although FIG. 3 illustrates the case in which a signal from the OSD generator 340 and the image processor 320 is mixed by the mixer 345 and then is 3D-processed by the formatter 360, the present invention is not limited thereto, and the mixer 345 may be positioned after the formatter. That is, output of the image processor 320 may be 3D-processed by the formatter 360, and the OSD generator 340 may perform 3D processing along with OSD generation and then mix the 3D signals processed by the mixer 345.

The block diagram of the first controller 170 of FIG. 3 is a block diagram of an embodiment of the present invention. Components of the block diagram may be integrated, added, or omitted according to the specification of the first controller 170 that is actually embodied.

In particular, the frame rate converter 350 and the formatter 360 may not be disposed in the first controller 170 but may be separately disposed from the first controller 170 or may be provided as one module.

Figure 4:
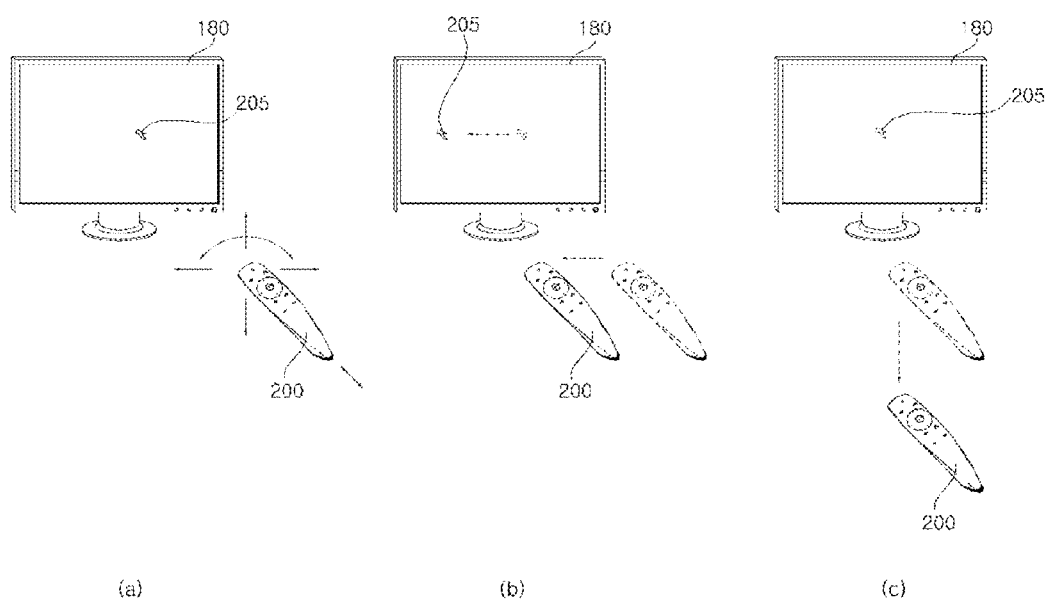
FIG. 4 is a diagram illustrating a method for controlling a remote controller of FIG. 2.

FIG. 4 is a diagram illustrating a method for controlling the remote controller 200 of FIG. 2.

FIG. 4(*a*) illustrates the case in which a pointer 205 corresponding to the remote controller 200 is displayed on the display 180.

A user may move or rotate the remote controller 200 up and down, right and left (FIG. 4(*b*)), and forward and backward (FIG. 4(*c*)). The pointer 205 displayed on the display 180 of the image display apparatus may correspond to movement of the remote controller 200. As shown in the drawing, the corresponding pointer 205 is moved and displayed according to movement in 3D space, and thus the remote controller 200 may be referred to as a spatial remote controller or a 3D pointing device.

FIG. 4(*b*) illustrates the case in which, when a user moves the remote controller 200 to the left, the pointer 205 displayed on the display 180 of the image display apparatus is also moved to the left in response to the movement of the remote controller.

Information about movement of the remote controller 200, detected through the sensor of the remote controller 200, may be transmitted to the image display apparatus. The image display apparatus may calculate coordinates of the pointer 205 from the information about the movement of the remote controller 200. The image display apparatus may display the pointer 205 to correspond to the calculated coordinates.

FIG. 4(*c*) illustrates the case in which a user moves the remote controller 200 away from the display 180 while pushing a specific button in the remote controller 200. Accordingly, a selected area in the display 180, corresponding to the pointer 205, may be zoomed in to be enlarged and displayed. On the other hand, when the user moves the remote controller 200 close to the display 180, the selected area in the display 180, corresponding to the pointer 205, may be zoomed out to be reduced and displayed. When the remote controller 200 is away from the display 180, the selected area may be zoomed out, and when the remote controller 200 becomes close to the display 180, the selected area may be zoomed in.

When a specific button in the remote controller 200 is pushed, recognition of up/down and right/left may be excluded. That is, when the remote controller 200 is moved away from or close to the display 180, up/down and right/left movement may not be recognized and only forward and backward movement may be recognized. When a specific button in the remote controller 200 is not pushed, only the pointer 205 may be moved according to up/down and right/left movement of the remote controller 200.

The moving speed or moving direction of the pointer 205 may correspond to the moving speed or moving direction of the remote controller 200.

Figure 5:
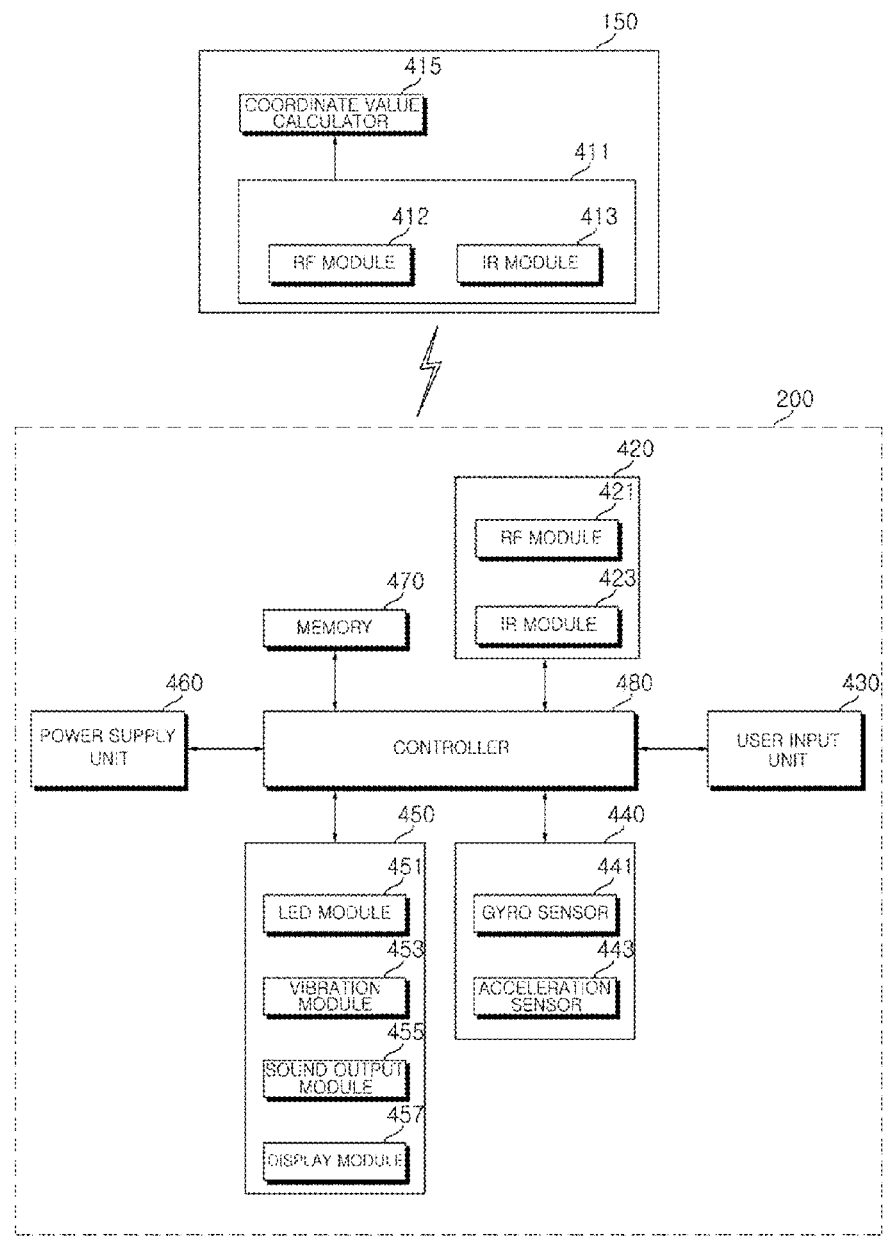
FIG. 5 is an internal block diagram of the remote controller of FIG. 2.

FIG. 5 is an internal block diagram of the remote controller 200 of FIG. 2.

Referring to the drawing, the remote controller 200 may include a wireless communication unit 425, a user input unit 435, a sensor unit 440, an output unit 450, a power supply unit 460, a memory 470, and a controller 480.

The wireless communication unit 425 may transmit and receive a signal to and from arbitrary any one of image apparatus apparatuses according to the aforementioned embodiments of the present invention. Among the image apparatus apparatuses according to embodiments of the present invention, an example of the image display apparatus 100 will be described.

According to the embodiment, the remote controller 200 may include an RF module 421 that may transmit and receive a signal to and from the image display apparatus 100 according to RF communication standard. In addition, the remote controller 200 may include an IR module 423 that may transmit and receive a signal to and from the image display apparatus 100 according to IR communication standard.

According to the embodiment, the remote controller 200 may transmit a signal containing information about movement of the remote controller 200 to the image display apparatus 100 through the RF module 421.

In addition, the remote controller 200 may receive the signal transmitted from the image display apparatus 100 through the RF module 421. As necessary, the remote controller 200 may transmit a command about power on/off, channel change, volume control, and so on to the image display apparatus 100 through the IR module 423.

The user input unit 435 may include a keypad, a button, a touchpad, a touchscreen, or the like. A user may manipulate the user input unit 435 to input a command associated with the image display apparatus 100 to the remote controller 200. When the user input unit 435 includes a hard key button, the user may input a command associated with the image display apparatus 100 to the remote controller 200 through a push operation of the hard key button. When the user input unit 435 includes a touchscreen, the user may touch a soft key of the touchscreen to input a command associated with the image display apparatus 100 to the remote controller 200. In addition, the user input unit 435 may include various types of input elements that the user is capable of manipulating, such as a scroll key or a jog key, and the present embodiment does not limit the scope of the present invention.

The sensor unit 440 may include a gyro sensor 441 or an acceleration sensor 443. The gyro sensor 441 may sense information about movement of the remote controller 200.

For example, the gyro sensor 441 may sense information about an operation of the remote controller 200 based on the x, y, and z-axes. The acceleration sensor 443 may sense information about the moving speed of the remote controller 200. The sensor unit 440 may further include a distance measuring sensor so as to sense a distance from the display 180.

The output unit 450 may output an image or voice signal which corresponds to manipulation of the user input unit 435 or a signal transmitted from the image display apparatus 100. The user may recognize whether the user input unit 435 is manipulated or the image display apparatus 100 is controlled, through the output unit 450.

For example, the output unit 450 may include an LED module 451, a vibration module 453, a sound output module 455, or a display module 457, and here the LED module 451 is lit, the vibration module 453 generates vibration, the sound output module 455 outputs sound, or the display module 457 outputs an image when the user input unit 435 is manipulated or a signal is transmitted and received to and from the image display apparatus 100 through the wireless communication unit 425.

The power supply unit 460 may supply power to the remote controller 200. When the remote controller 200 is not moved for a predetermined time period, the power supply unit 460 may stop power supply to reduce power waste. The power supply unit 460 may re-start power supply when a predetermined key included in the remote controller 200 is manipulated.

The memory 470 may store various types of programs and application data items required to control or operate the remote controller 200. When the remote controller 200 wirelessly transmits and receives a signal to and from the image display apparatus 100 through the RF module 421, the remote controller 200 and the image display apparatus 100 may transmit and receive the signal through a predetermined frequency band. The controller 480 of the remote controller 200 may store information about a frequency band, etc. for wirelessly transmitting and receiving a signal to and from the image display apparatus 100 paired with the remote controller 200 in the memory 470 and may refer the information.

The controller 480 may control overall information associated with control of the remote controller 200. The controller 480 may transmit a signal corresponding to predetermined key manipulation of the user input unit 435 or a signal corresponding to movement of the remote controller 200 sensed by the sensor unit 440 to the image display apparatus 100 through the wireless communication unit 425.

The user input interface unit 150 of the image display apparatus 100 may include a wireless communication unit 151 for wirelessly transmitting and receiving a signal to and from the remote controller 200, and a coordinate value calculator 415 for calculating a coordinates of a pointer corresponding to an operation of the remote controller 200.

The user input interface unit 150 may wirelessly transmit and receive a signal to and from the remote controller 200 through an RF module 412. In addition, the user input interface unit 150 may receive a signal that is transmitted from the remote controller 200 according to IR communication standard, through an IR module 413.

The coordinate value calculator 415 may compensate for hand shake or errors in a signal corresponding to an operation of the remote controller 200, received through the wireless communication unit 151, to calculate coordinates (x,y) of a pointer 202 to be displayed on a display 180.

A signal transmitted from the remote controller 200, which is input to the image display apparatus 100 through the user input interface unit 150, may be transmitted to a first controller 170 of the image display apparatus 100. The first controller 170 may identify information about the operation and key manipulation of the remote controller 200 from the signal transmitted from the remote controller 200 and may control the image display apparatus 100 in response to the information.

As another example, the remote controller 200 may calculate pointer coordinates corresponding to the operation and output the pointer coordinates to the user input interface unit 150 of the image display apparatus 100. In this case, the user input interface unit 150 of the image display apparatus 100 may transmit information about the received pointer coordinates to the first controller 170 without separate compensation of hand shake or error.

As another example, compared to the drawing, the coordinate value calculator 415 may be included in the first controller 170, but not in the user input interface unit 150.

FIG. 6 is a diagram illustrating an example of an internal configuration of the power supply unit 190 and the display 180 of FIG. 2.

Referring to the drawing, a liquid crystal display (LCD) panel-based display 180 may include the liquid crystal display panel 210, a driving circuit unit 230, and a backlight unit 250.

The liquid crystal display panel 210 may include a first substrate including a thin film transistor arranged at intersections between a plurality of gate lines GL and a plurality of data lines DL that are arranged to cross each other in a matrix form and a pixel electrode connected to the thin film transistor, a second substrate including a common electrode, and a liquid crystal layer formed between the first substrate and the second substrate, in order to display an image.

The driving circuit unit 230 may drive the liquid crystal display panel 210 through a control signal and data signal supplied from the second controller 175 of FIG. 2. To this end, the driving circuit unit 230 may include a timing controller 232, a gate driver 234, and a data driver 236.

The timing controller 232 may receive a control signal, RGB data signals, a vertical synchronization signal Vsync, and so on from the second controller 175 and control the gate driver 234 and the data driver 236 in response to the control signal, re-arrange the RGB data signals, and provide the RGB data signals to the data driver 236.

According to control of the gate driver 234, the data driver 236, and the timing controller 232, a scanning signal and an image signal may be supplied to the liquid crystal display panel 210 through the gate line GL and the data line DL.

The backlight unit 250 may supply light to the liquid crystal display panel 210. To this end, the backlight unit 250 may include a plurality of light sources 252 as a light source, a scan driver 254 for control of scanning drive of the light sources 252, and a lamp driver 256 for on/off of the light sources 252.

While light transmittance of the liquid crystal layer is adjusted according to an electric field formed between the common electrode and the pixel electrode of the liquid crystal display panel 210, a predetermine image may be displayed using the light emitted from the backlight unit 250.

The power supply unit 190 may apply a common electrode voltage Vcom to the liquid crystal display panel 210 and apply a gamma voltage to the data driver 236. In addition, the power supply unit 190 may supply driving power for driving the light sources 252 to the backlight unit 250.

Figure 7A:
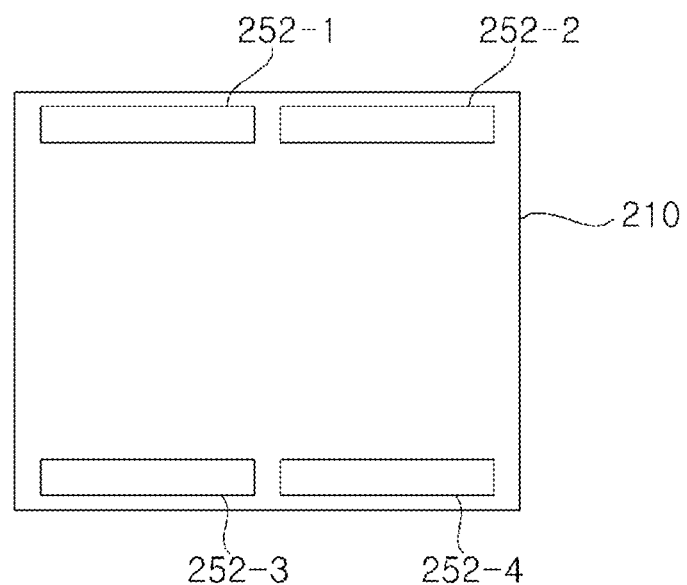
FIGS. 7A to 7C are diagrams illustrating various examples of arrangement of a light source of FIG. 6.
Figure 7B:
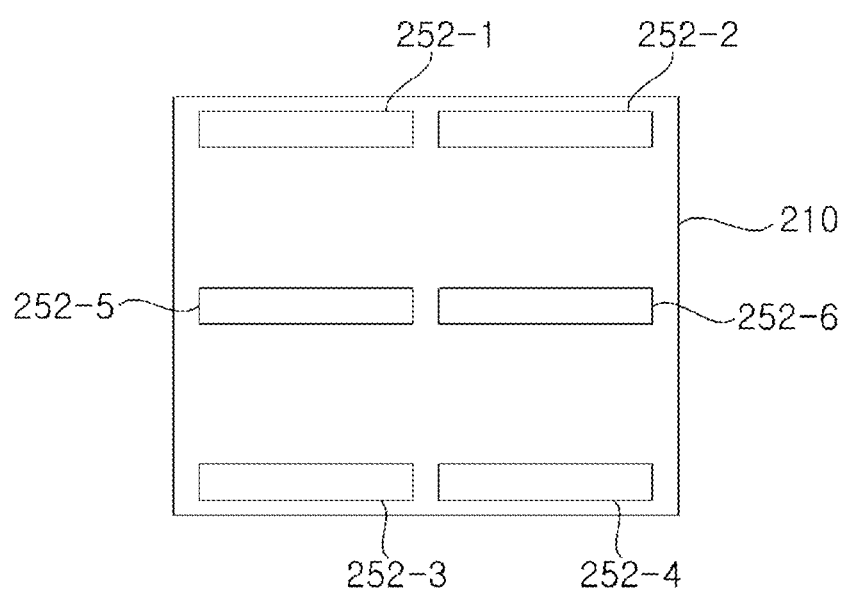
Figure 7C:
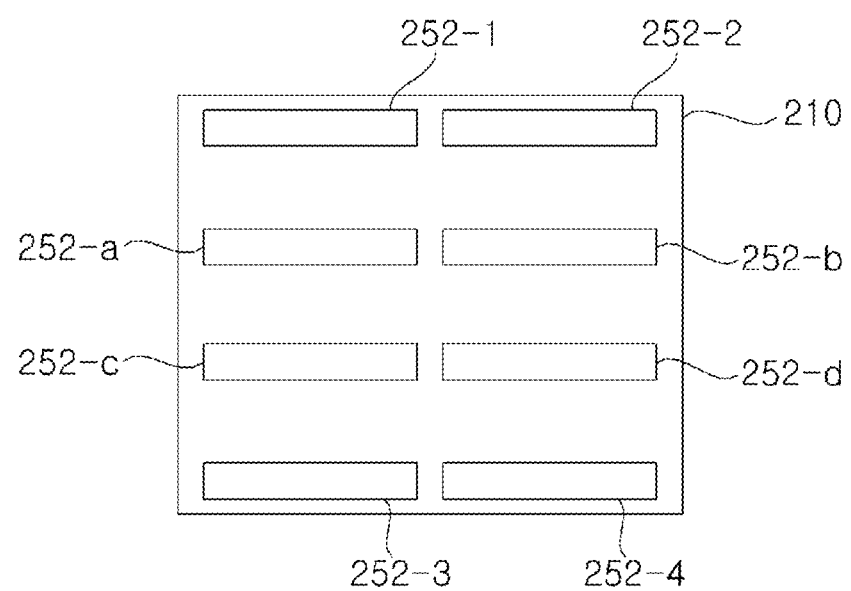

FIGS. 7A to 7C are diagrams illustrating various examples of arrangement of the light source of FIG. 6.

First, FIG. 7A illustrates a plurality of light sources 252-1, 252-2, 252-3, and 252-4 that are arranged on a rear surface, an upper side, and a lower side of the liquid crystal display panel 210. The light sources 252-1, 252-2, 252-3, and 252-4 may include a plurality of light emitting diodes (LEDs).

FIG. 7B illustrates a plurality of light sources 252-1, 252-2, 252-3, 252-4, 252-5, and 252-6 that are arranged on a rear surface, an upper side, a lower side, and a middle side of the liquid crystal display panel 210. The light sources 252-1, 252-2, 252-3, 252-4, 252-5, and 252-6 may include a plurality of light emitting diodes (LEDs).

FIG. 7C illustrates a plurality of light sources 252-1, 252-2, 252-3, and 252-4 that are arranged on a rear surface, an upper side, and a lower side of the liquid crystal display panel 210, and a plurality of light sources 252-a, 252-b, and 252-c, and 252-d that are arranged on a middle area between the upper side and the lower side. The light source may include a plurality of light emitting diodes (LEDs).

Figure 8:
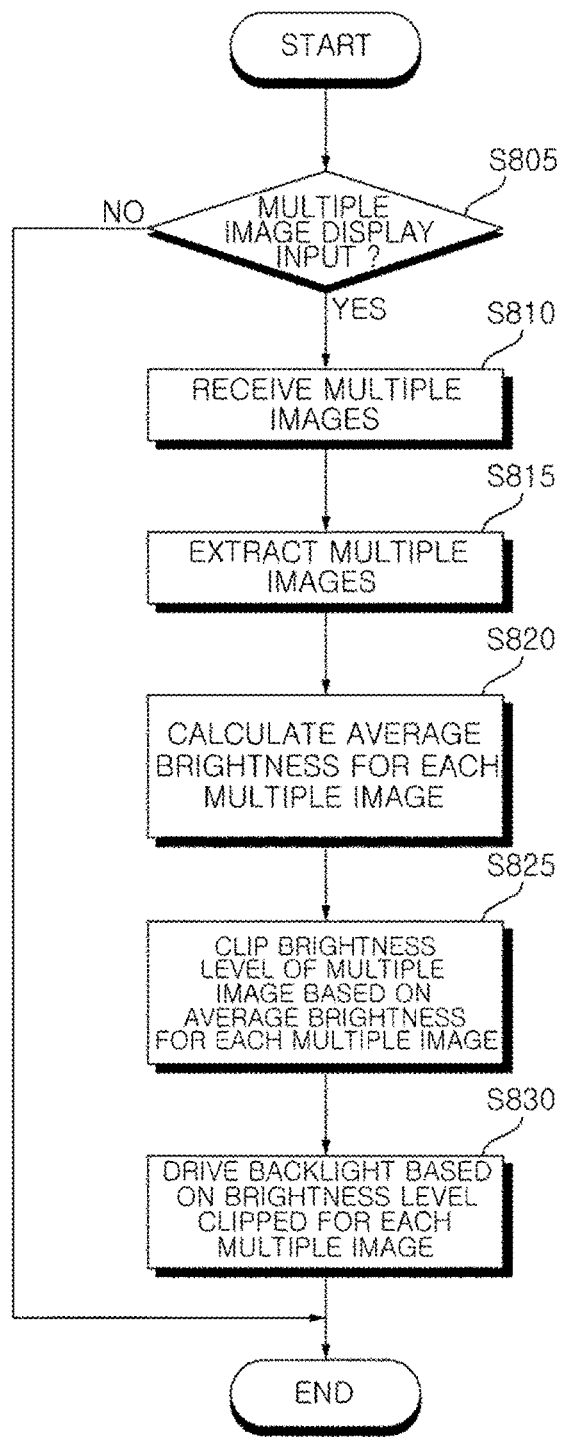
FIG. 8 is a flowchart illustrating an operating method of an image display apparatus according to an embodiment of the present invention.

FIG. 8 is a flowchart illustrating an operating method of an image display apparatus according to an embodiment of the present invention. FIGS. 9 to 16 are diagrams for explanation of the operating method of FIG. 8.

First, referring to FIG. 8, the first controller 170 of the image display apparatus 100 may determine whether multiple image display input is present according to a user input signal input through the user input interface unit 150 (S805). When the multiple image display input is present, multiple images may be received.

For example, when a multiple-image display key (not shown) of the remote controller 200 is operated or a multiple-image display item is selected through a menu displayed on the display 180, the first controller 170 of the image display apparatus 100 may determine that the multiple-image display input is present.

When the multiple-image display input is present, the image receiver 105 of the image display apparatus 100 may receive multiple images.

For example, the image receiver 105 may receive a broadcast image through a broadcast receiver 110, receive a game image from a game console (not shown) through a first HDMI terminal of an external device interface unit 130, receive an optical disc reproducing image from an optical disc reproducing apparatus (not shown) through a second HDMI terminal of the external device interface unit 130, and receive a PC image from a computer through a RGB terminal.

The first controller 170 may receive multiple images and merge and output the multiple images as one single image. To this end, the broadcast image, the game image, the optical disc reproducing image, and the PC image may each be scaled and then mixed.

Figure 9:
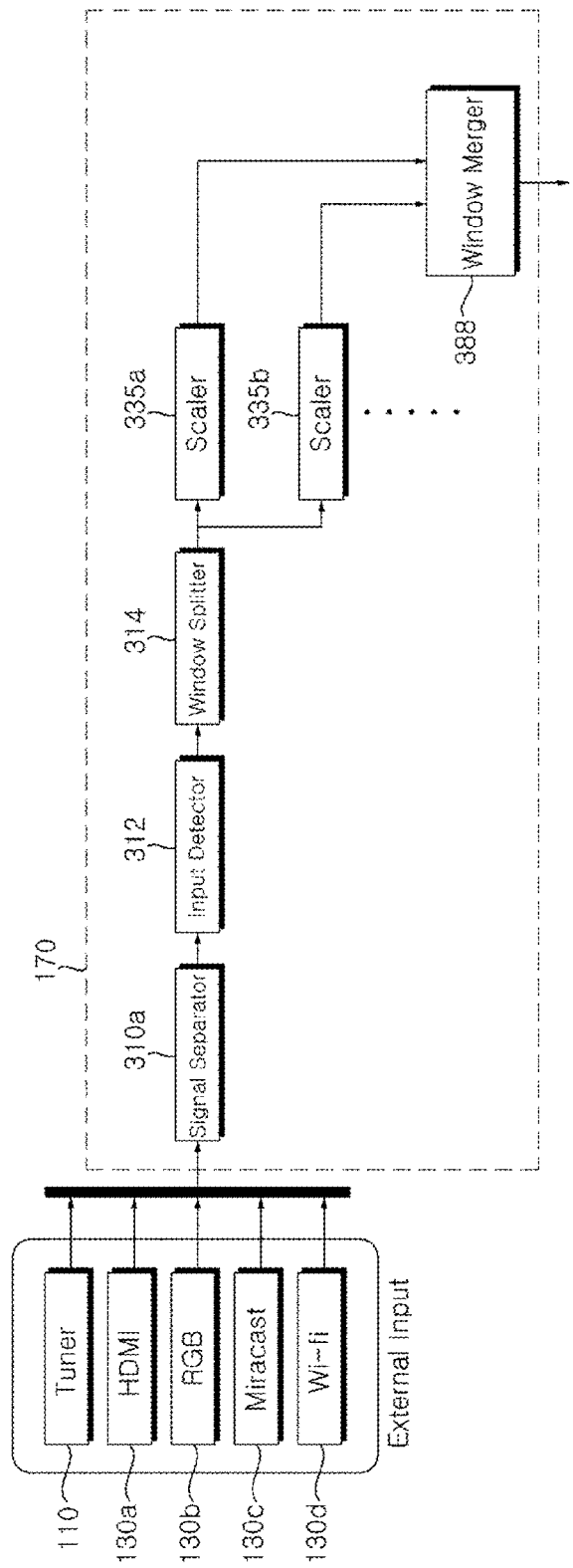

FIG. 9 is a diagram for explanation of an operation of the first controller 170 associated with multiple-image merging.

Referring to the drawing, the image receiver 105 may include the tuner 110, a HDMI terminal 130a, an RGB terminal 130b, a miracast receiver 130c, a Wi-Fi receiver 130d, etc.

For example, the image receiver 105 may receive the broadcast image from the tuner 110, the game image through a HDMI terminal 130a, the optical disc reproducing image through the HDMI terminal 130a, and the PC image through the RGB terminal 130b.

The broadcast image, the game image, the optical disc reproducing image, and the PC image may be separated by a signal separator 310a.

An input detector 312 may detect information from each image. For example, the input detector 312 may detect image information such as resolution and frequency of each image.

A window splitter 314 may cut each image with a predetermined window size based on the image information from each image.

Then a plurality of scalers 335a, 335b, . . . may scale each image cut with a predetermined size.

The window splitter and the scaler may be embodied as one device. That is, after scaling, an image may be cut.

A window merger may merge the plurality of scaled multiple images. Accordingly, a single image containing multiple images may be merged and output.

Then, the second controller 170 of the image display apparatus 100 may separate multiple images from a single image containing the multiple images from the first controller 170 (S815).

The second controller 170 may further receive source information of each of the multiple images in the single image, information of the size of the multiple images, positional information, etc. other than the single image from the first controller 170.

In addition, the second controller 170 may extract each image from a single image based on at least one of the source information, the size information of the multiple images, the positional information, etc. Accordingly, the broadcast image, the game image, the optical disc reproducing image, the PC image, and so on may each be extracted.

Then the second controller 170 may calculate average brightness for each multiple image (S820). In addition, the second controller 170 may perform clipping on a brightness level of the multiple images based on the APL for each multiple image (S8225) and drive a light source based on the brightness level clipped for each multiple image (S830).

Operations 820 to 830 (S820, S825, and S830) may be associated with local dimming for each multiple image according to an embodiment of the present invention and will be described with reference to FIG. 10 and subsequent diagrams.

Figure 10:
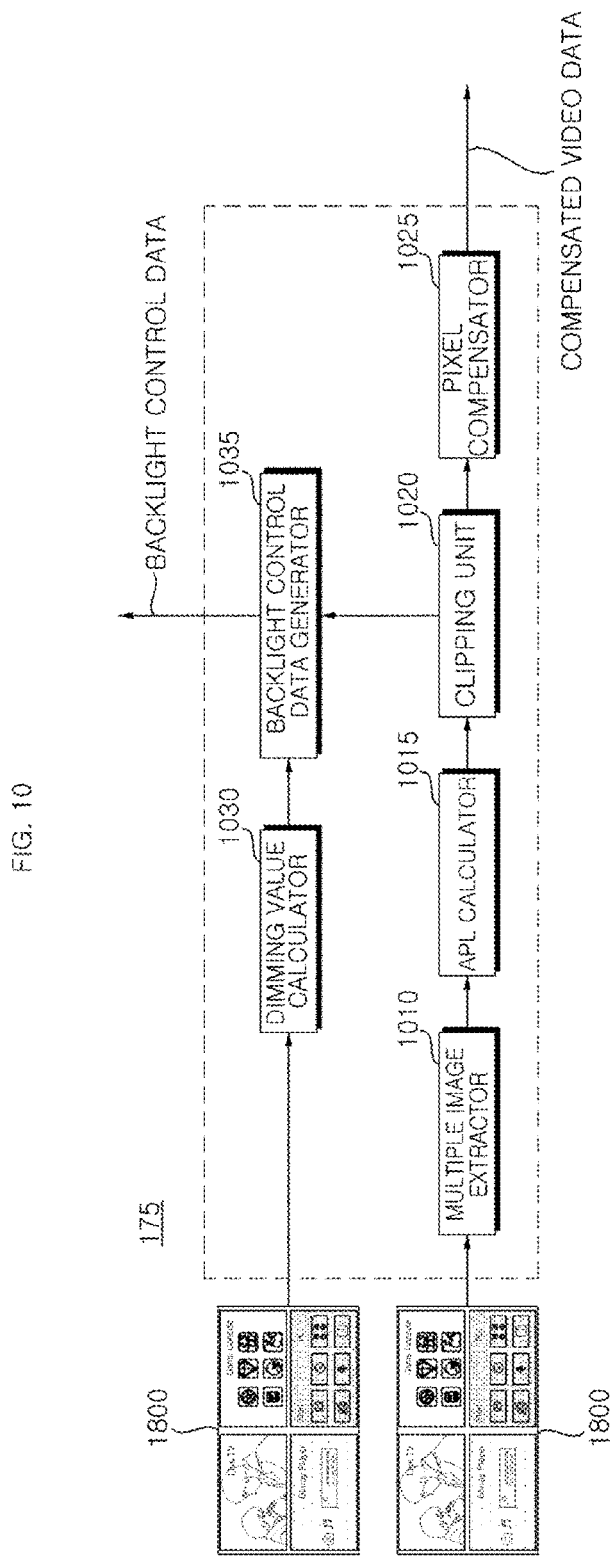

FIG. 10 is an internal block diagram of the second controller 175.

Referring to the drawing, the second controller 175 of FIG. 10 may perform control to extract multiple images received from an image receiver and to perform local dimming on each extracted multiple image, according to multiple image display input.

In detail, the second controller 175 may perform control to extract multiple images from a single image 1800 including the multiple images, to calculate an APL for each extracted multiple image, to clip a brightness level of the multiple images based on the APL for each multiple image, and to drive a light source based on the clipped brightness value for each multiple image.

To this end, the second controller 175 may include a multiple image extractor 1010, an average brightness level (APL) calculator 1015, a clipping unit 1020, a pixel compensator 1025, a dimming value calculator 1030, and a backlight control data generator 1035.

The multiple image extractor 1010 may extract multiple images from the single image 1800 including the multiple images. Upon receiving size information, positional information, and so on of each multiple image from the first controller 170, the multiple image extractor 1010 may extract each image based on the size information, the positional information, and so on.

The APL calculator 1015 may calculate an APL for each extracted multiple image.

The clipping unit 1020 may clip an average value of the multiple image based on the APL for each multiple image.

For example, when the APL of each multiple image is large, the clipping unit 1020 may set a clipping value so as to increase brightness of black data with low brightness. That is, the clipping value may be adjusted upward.

As another example, when the APL of each multiple image is small, the clipping unit 1020 may set a clipping value so as to reduce brightness of black data with low brightness. That is, the clipping value may be adjusted downward.

The clipping unit 1020 may set the clipping value so as to increase brightness of black data as a difference between a maximum brightness level and a minimum brightness level in each multiple image is increased. That is, the clipping value may be adjusted upward.

In addition, the clipping unit 1020 may set the clipping value so as to reduce brightness of black data as a difference between a maximum brightness level and a minimum brightness level in each multiple image is reduced. That is, the clipping value may be adjusted downward.

The pixel compensator 1025 may compensate for pixels of video data to output the compensated video data based on a clipped brightness level for each multiple image.

The dimming value calculator 1030 may receive the single image 1800 including multiple images and calculate a dimming value for local dimming based on the single image 1800.

The backlight control data generator 1035 may generate backlight control data for control of a light source based on the clipped brightness level for each multiple image.

According to an operation of the second controller 175 of FIG. 10, a dimming value may be calculated based on the single image 1800, clipping may be performed for each multiple image, and lastly data for control of a backlight, that is, brightness data may be determined according to the calculated dimming value and the clipped brightness level.

That is, the backlight control data generator 1035 may output control data for control of the backlight based on the dimming value based on the single image 1800 and the clipped brightness level for each multiple image.

Accordingly, lastly, backlight control data appropriate for each multiple image, that is, brightness data may be output to the display 180, in particular, to the light sources 252. Accordingly, the plurality of light sources 252 may emit light according to the corresponding backlight control data, in particular, brightness data.

As a result, local dimming may be embodied in consideration of multiple images, thereby overcoming the issue in terms of different display of multiple images and enhancing overall image quality.

After clipping of brightness components, the pixel compensator 1025 may compensate for color components, thereby further enhancing image quality of a displayed image.

The pixel compensator 1025 may further compensate for color as a clipping value is increased.

Figure 11:
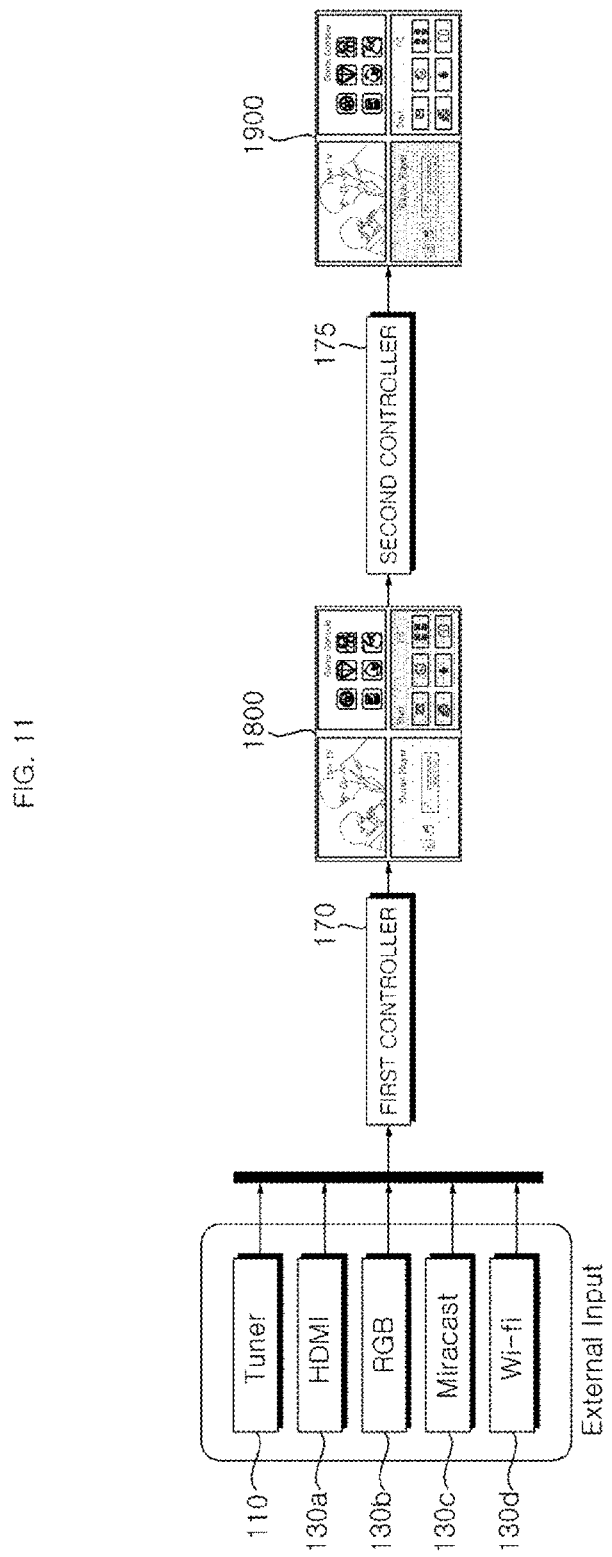

FIG. 11 is a diagram illustrating an example of the single image 1800 containing a multiple image output from the first controller 170 and an example of a single image 1900 that is local-dimmed for each multiple image output from the second controller 175.

As seen from the drawing, brightness levels of some images are changed, which will be described in detail with reference to FIGS. 12 to 13B.

Figure 12:
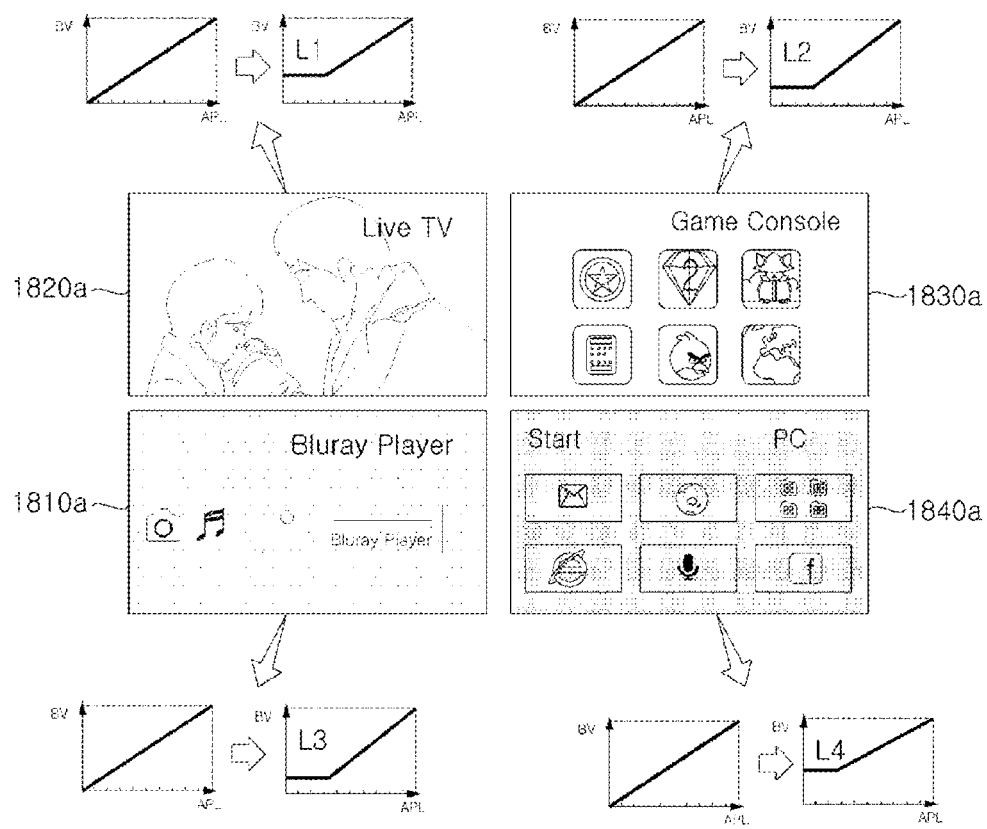

FIG. 12 is a diagram illustrating non-clipped multiple images.

FIG. 12 illustrates a broadcast image 1820a, a game image 1830a, an optical disc reproducing image 1810a, and a PC image 1840a as the multiple images.

With regard to an APL (APL) of each multiple image, it is assumed that the PC image 1840a is highest, and the game image 1830a, the broadcast image 1820a, and the optical disc reproducing image 1810a are sequentially lowered.

With regard to the multiple images, when a dimming value and an APL are collectively calculated with respect to all images and brightness data components output to a backlight are controlled based on the dimming value and the APL of the all images, the PC image 1840a with the highest APL may be represented as darker due to other images. Accordingly, contrast of an original image may not be accurately represented Oppositely, the optical disc reproducing image 1810a with the lowest APL may be represented as lighter due to other images. Accordingly, contrast of the original image may not be accurately represented.

According to the present invention, to overcome this issue, clipping is performed on each multiple image based on an APL for each multiple image.

For example, when the APL of each multiple image is large, the clipping unit 1020 may set a clipping value so as to increase brightness of black data with low brightness. That is, the clipping value may be adjusted upward.

As another example, when the APL of each multiple image is small, the clipping unit 1020 may set a clipping value so as to reduce brightness of black data with low brightness. That is, the clipping value may be adjusted downward.

The clipping unit 1020 may set the clipping value so as to increase brightness of black data as a difference between a maximum brightness level and a minimum brightness level in each multiple image is increased. That is, the clipping value may be adjusted upward.

In addition, the clipping unit 1020 may set the clipping value so as to reduce brightness of black data as a difference between a maximum brightness level and a minimum brightness level in each multiple image is reduced. That is, the clipping value may be adjusted downward.

FIG. 12 illustrates the case in which a highest clipping value L4 is set with respect to the PC image 1840a with the highest APL, and then L2, L1, and L3 are set with respect to the game image 1830a, the broadcast image 1820a, and the optical disc reproducing image 1810a, respectively.

Accordingly, black data of the PC image 1840a with the highest APL may be set as lightest and black data of the optical disc reproducing image 1810a with the lowest APL may be set as darkest.

Accordingly, contrast of each multiple image may be enhanced.

Figure 13A:
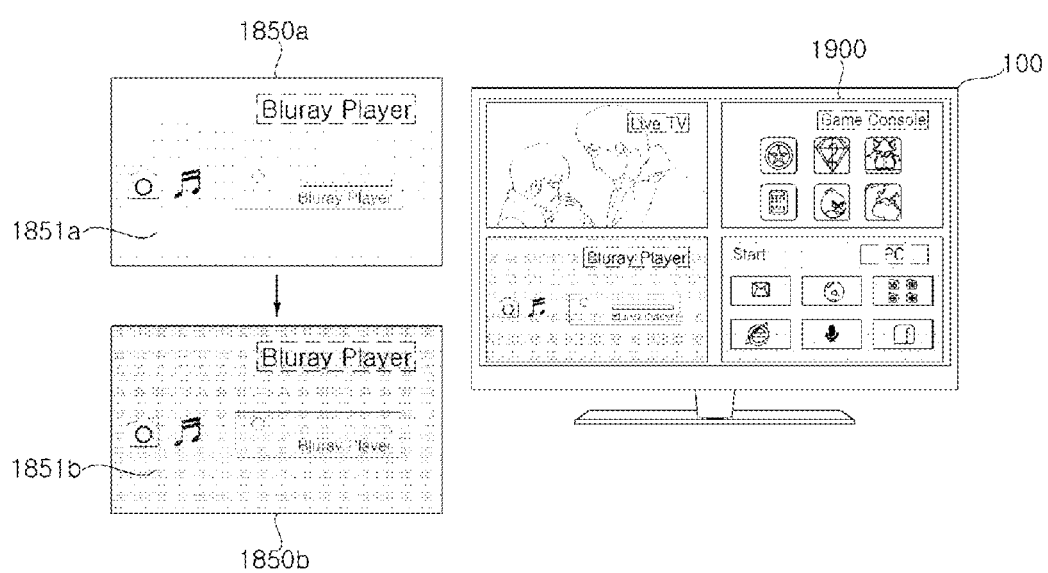

When an APL of a single image containing multiple images is a large first predetermined value, if an APL of a first image of the multiple images is a second predetermined value less than the first predetermined value, the second controller 175 may perform control to display black of the first image of the multiple images with lower brightness than black of other images of the multiple images during display of black of the first image of the multiple images, which will be described with reference to FIG. 13A.

FIG. 13A illustrates the case in which black data is set to lower brightness with respect to an optical disc reproducing image 1850a with the lowest APL.

Referring to the drawing, the second controller 175 may set black data to lower brightness with respect to the optical disc reproducing image 1850a with the lowest APL. Accordingly, an optical disc reproducing image 1850b with lower brightness may be displayed by driving a light source.

As a result, the single image 1900 containing the optical disc reproducing image 1850b may be displayed on the display 180, thereby overcoming the issue in terms of different display of multiple images and enhancing overall image quality.

When an APL of a single image containing multiple images is a small third predetermined value, if an APL of a first image of the multiple images is a fourth predetermined value greater than the third predetermined value, the second controller 175 may perform control to display black of the first image of the multiple images with higher brightness than black of other images of the multiple images during display of the first image of the multiple image, which will be described with reference to FIG. 13B.

Figure 13B:
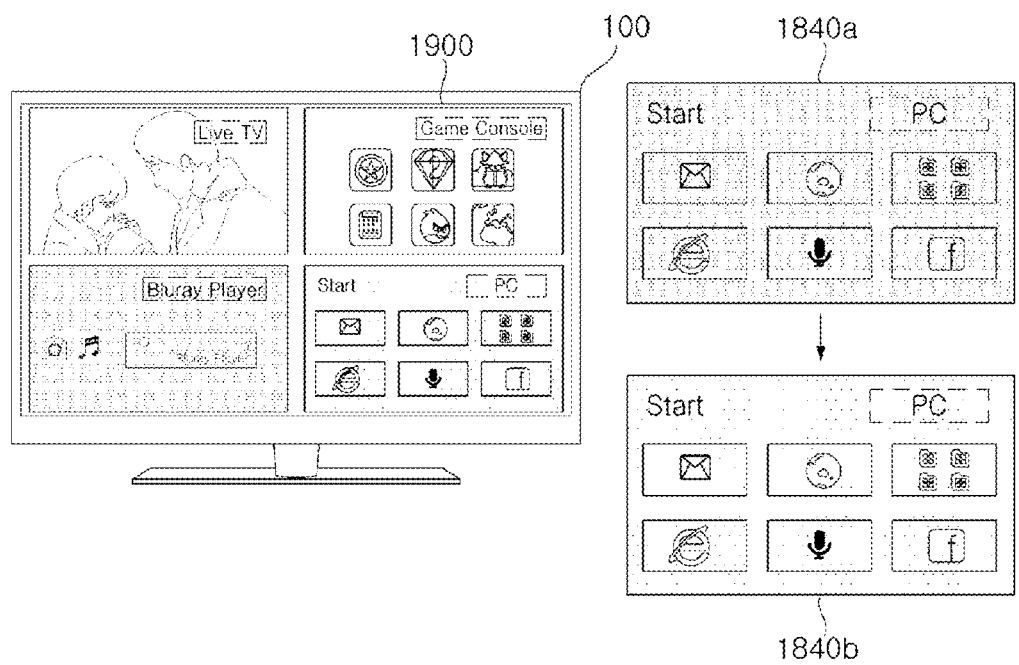

FIG. 13B illustrates the case in which black data is set to higher brightness with respect to a PC image 1840a with the highest APL.

Referring to the drawing, the second controller 175 may set black data to higher brightness with respect to the PC image 1840a with the highest APL. Accordingly, a PC image 1840b with higher brightness may be displayed by driving a light source.

As a result, the single image 1900 containing the PC image 1840b may be displayed on the display 180, thereby overcoming the issue in terms of different display of multiple images and enhancing overall image quality.

A single image containing multiple images may various numbers of multiple images instead of four multiple images.

Figure 14A:
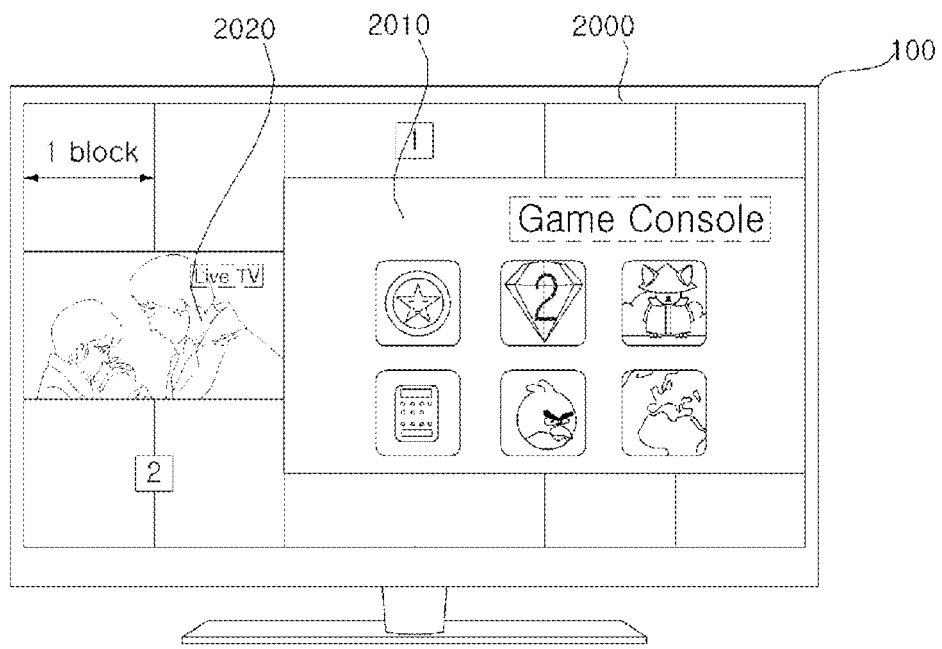
Figure 14B:
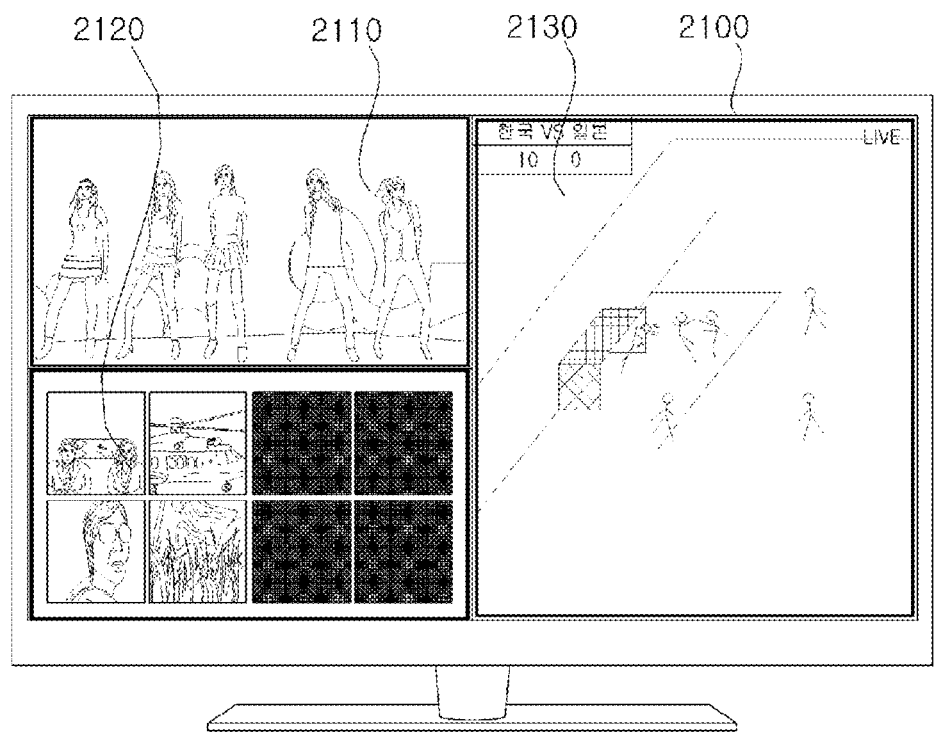

FIG. 14A illustrates a single image 2000 containing two multiple images 2010 and 2020, and FIG. 14B illustrates a single image 2100 containing three multiple images 2110, 2120, and 2130.

In this case, the two multiple images 2010 and 2020 may have different sizes, and at least two of the three multiple images 2110, 2120, and 2130 may have different sizes.

As described above, the second controller 175 may control to perform local dimming on each extracted multiple image with respect to a single image containing various numbers of multiple images.

That is, the second controller 175 may output backlight control data for control of a light source based on at least one of a brightness level and a dimming value of the extracted multiple images.

FIG. 15 is a diagram illustrating an internal block diagram of a second controller 175b.

Referring to the drawing, the second controller 175b of FIG. 15 is different from the second controller 175 of FIG. 10 in that a dimming value calculator 1030b calculates a dimming value for each extracted multiple image extracted by the multiple image extractor 1010.

In addition, the second controller 175b of FIG. 15 is different from the second controller 175 of FIG. 10 in that a backlight control data generator 1035b generates backlight control data for control of a light source based on a dimming value calculated for each multiple image and a brightness level clipped for each multiple image.

Except for theses, the second controller 175b of FIG. 15 is the same as the second controller 175 of FIG. 10.

As a result, the second controller 175b of FIG. 15 may calculate a dimming value for each multiple image, thereby overcoming the issue in terms of different display of multiple images and enhancing overall image quality.

Figure 16:
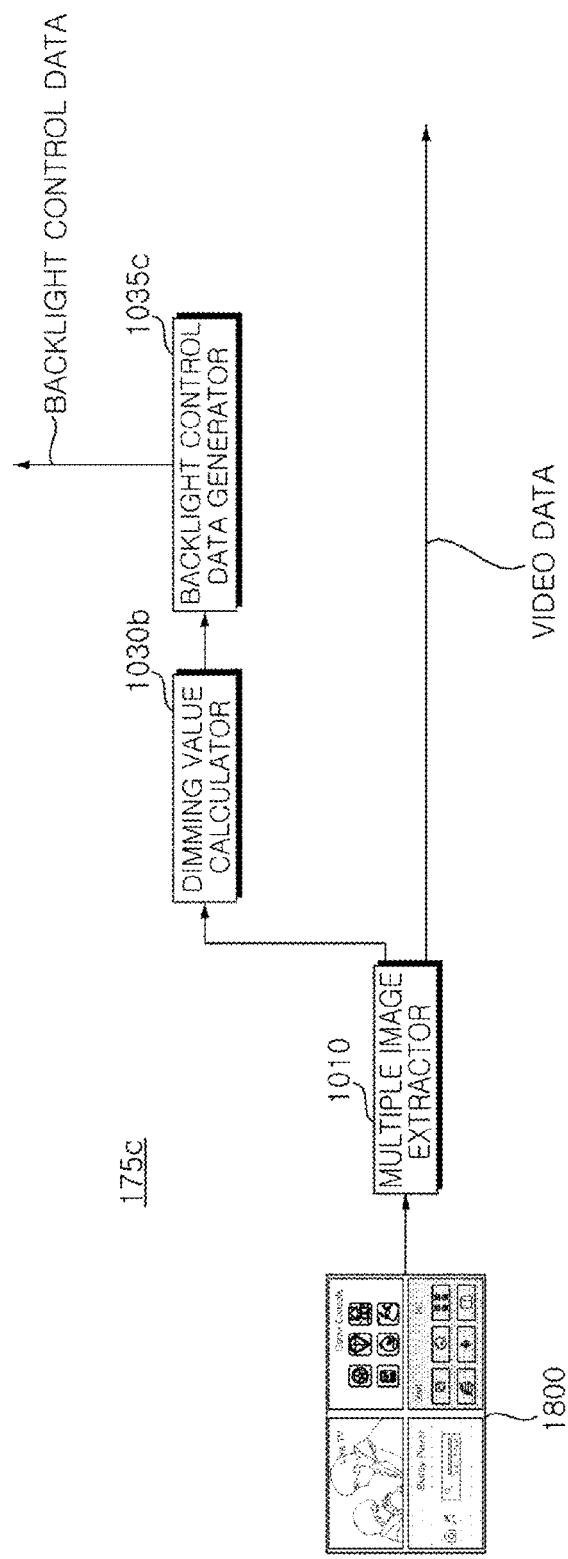

FIG. 16 is an internal block diagram of another example of a second controller 175c.

Referring to the drawing, the second controller 175c of FIG. 16 is different from the second controller 175b of FIG. 15 in that the second controller 175c does not include the APL calculator 1015, the clipping unit 1020, and the pixel compensator 1025.

That is, a dimming value calculator 1030c may calculate a dimming value for each multiple image extracted by the multiple image extractor 1010.

In addition, a backlight control data generator 1030c may generate backlight control data for control of a light source based on a dimming value calculated for each multiple image. Accordingly, according to a dimming value for each multiple image, the issue in terms of different display of multiple images may be overcome and overall image quality may be enhanced.

Figure 17:
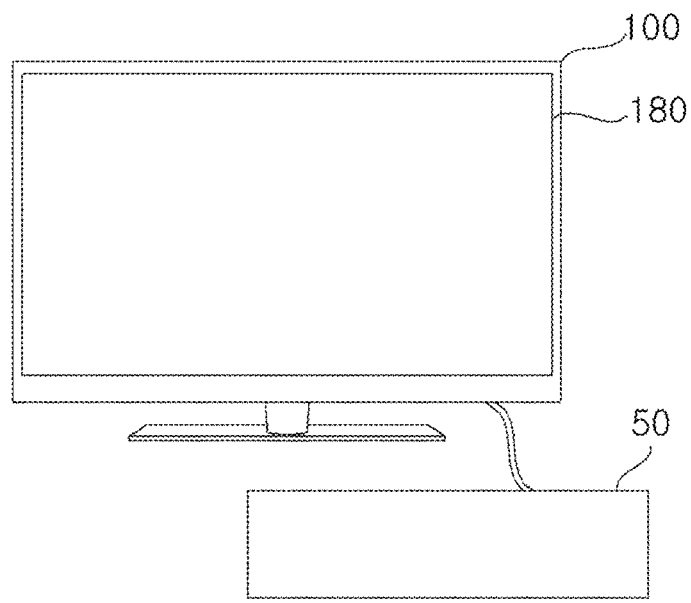
FIG. 17 is a diagram illustrating an image display apparatus according to another embodiment of the present invention.

FIG. 17 is a diagram illustrating an image display apparatus according to another embodiment of the present invention.

Figure 18:
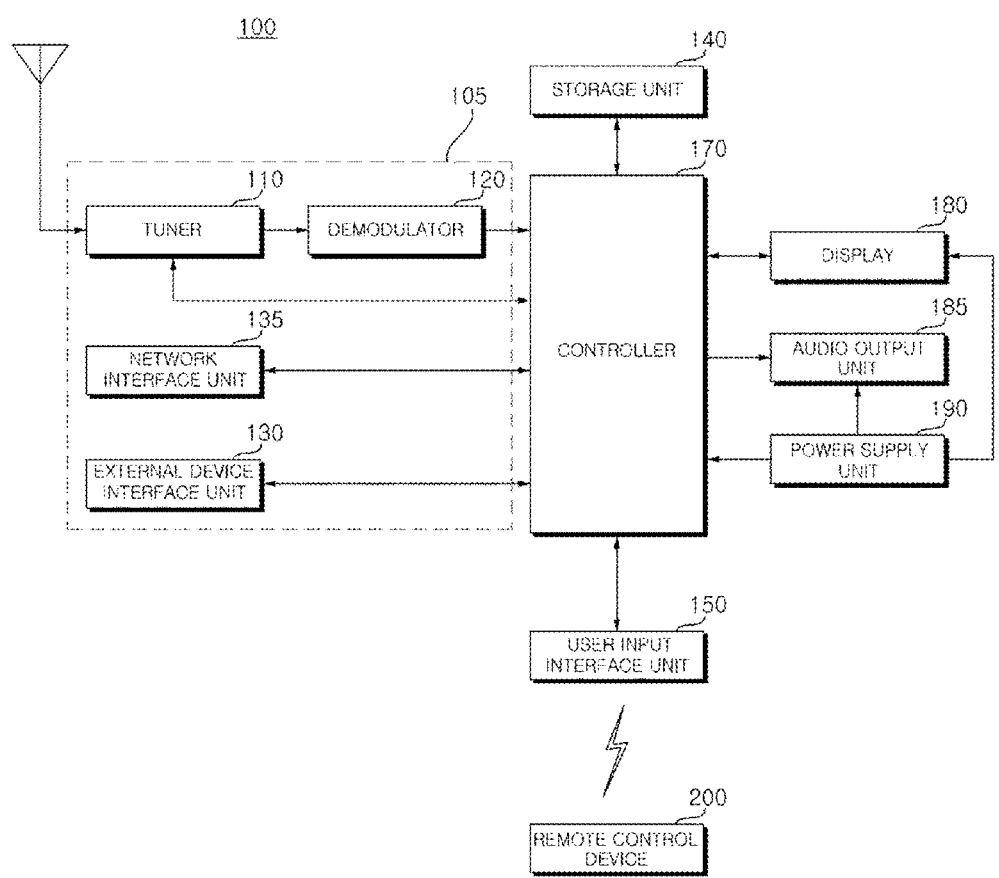
FIG. 18 is an internal block diagram illustrating an example of the image display apparatus of FIG. 17.

FIG. 18 is an internal block diagram illustrating an example of the image display apparatus of FIG. 17.

Figure 19:
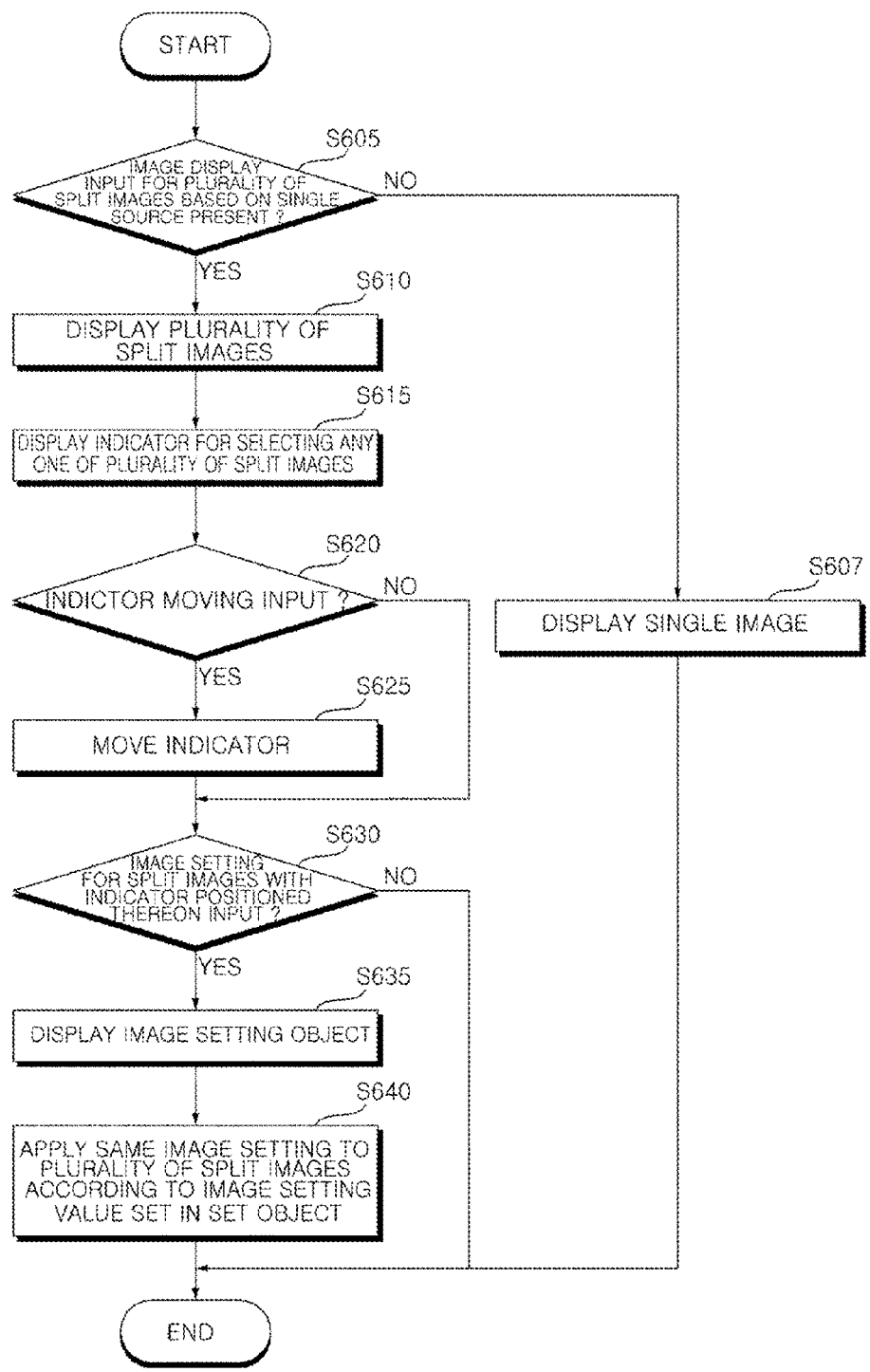
FIG. 19 is a flowchart illustrating an example of a method for operating an image display apparatus according to another embodiment of the present invention.

FIG. 19 is a flowchart illustrating an example of a method for operating an image display apparatus according to another embodiment of the present invention.

FIGS. 20 to 29 are diagrams for explanation of the operation method of FIG. 19.

DETAILED DESCRIPTION OF THE PREFERRED EMBODIMENTS

FIG. 17 is a diagram illustrating an image display apparatus 100 according to another embodiment of the present invention.

Referring to the drawing, the image display apparatus 100 may receive a broadcast signal BR through an antenna (not shown), signal-process the received broadcast signal to provide a broadcast image, and display the provided broadcast image. To this end, the image display apparatus 100 may include a display 180.

That is, the image display apparatus 100 of FIG. 17 may be interpreted as including an image display apparatus such as a television (TV) or a monitor.

The image display apparatus 100 may exchange data with a server (not shown) through the network interface unit 135 (refer to FIG. 2). In particular, the image display apparatus 100 may receive a stream image from the server (not shown)

The image display apparatus 100 may receive an external input image from an external device (not shown) through the external device interface unit 130 (refer to FIG. 2).

FIG. 17 illustrates a set-top box 50 as an example of an external device. In FIG. 17, the set-top box 50 and the image display apparatus 100 are connected by wire (e.g., a HDMI method). The set-top box 50 may receive a broadcast signal, signal-process the broadcast signal, and provide the broadcast signal to the image display apparatus 100. In particular, the set-top box 50 may supply a plurality of broadcast images as one screen image.

Accordingly, the image display apparatus 100 may display a plurality of broadcast images as one screen image through the external device interface unit 130 (refer to FIG. 2).

According to an embodiment of the present invention, an image display apparatus may receive a stream containing a plurality of split images from one source, display the plurality of split images as the same screen image, and display an indicator for selecting or focusing on any one of the plurality of split images. In this case, when image setting input is input with respect to a split image with the indicator positioned thereon, the image display apparatus may display an image setting object and set the same setting value as a setting value set according to the image setting object with respect to the plurality of split images so as to simply perform image setting on the plurality of split images.

In particular, the image display apparatus may simply perform image quality setting of image sharpness, motion compensation, color temperature, hue, saturation, brightness, contrast, motion vector, frame rate items, and so on, on the plurality of split images.

The image display apparatus may simply perform audio setting of equalizer, normalizer, and surround items of audio corresponding to an image, on the plurality of split images.

The indicator may be displayed such that a user may easily focus on or select a desired split image, which will be described in more detail with reference to FIG. 19 and subsequent diagrams.

FIG. 18 is an internal block diagram illustrating an example of the image display apparatus 100 of FIG. 17.

The image display apparatus of FIG. 18 is the same as the image display apparatus 100 of FIG. 17 except that the image display apparatus of FIG. 18 includes one controller, and thus a detailed description thereof will be omitted here.

FIG. 19 is a flowchart illustrating an example of a method for operating an image display apparatus according to another embodiment of the present invention. FIGS. 20 to 29 are diagrams for explanation of the operation method of FIG. 19.

First, referring to FIG. 19, the image display apparatus 100 may receive an image through the image receiver 105. The image display apparatus 100 may signal-process the received image and display the signal-processed image on the display 180.

For example, the image display apparatus 100 may receive a broadcast signal received through an antenna through the tuner 110 and so on, signal-process the broadcast signal through the controller 170, and display a broadcast image formed by signal-processing the broadcast signal on the display 180. In particular, one broadcast signal may be processed and one broadcast image may be displayed on the display 180.

Then the image display apparatus 100 may determine whether single-source based display input for a plurality of split images is present (S1905) and display the plurality of split images when the display input is present (S1910).

For example, the controller 170 may receive an external input image through the external device interface unit 130 when an external input image display input from a set-top box is present through the user input interface unit 150.

In this case, the controller 170 may receive a plurality of split images through the external device interface unit 130 when display input for the plurality of split images, indicating display of the plurality of split images among external input images, is present.

For example, the controller 170 may receive a plurality of split images through the set-top box 50. In detail, when the split image display input is present, a content provider providing a broadcast image through the set-top box 50 may transmit a plurality of split images as one stream in order to enhance use convenience during user watching.

In addition, the image display apparatus 100 may receive one stream containing a plurality of split images through the external device interface unit 130.

The controller 170 in the image display apparatus 100 may perform control to demultiplex the received stream, to extract a plurality of split images from the demultiplexed signal, to signal-process each split image, and to display the plurality of split images as one screen image on the display 180. Accordingly, the user may simultaneously watch the plurality of split images, thereby enhancing use convenience of the user.

The image display apparatus 100 may display an indicator for selecting or focusing on any one of the plurality of split images (S1915).

For example, when an operation of a menu key or the like of the remote control device 200 is present during display of a plurality of split images, the controller 170 may perform control to generate an indicator for selecting or focusing on any one of the plurality of split images and to display the generated indicator on any one of the plurality of split images on the display 180.

For example, when four split images are displayed on the display 180, an indicator for thickening an edge of any one of the split images may be displayed on the display 180.

The image display apparatus 100 may determine whether indicator moving input is present (S1925) and move and display the indicator when the indicator moving input is present (S1925).

The controller 170 may perform control to move and display the indicator according to the indicator moving input. For example, when direction-key moving input of the remote control device 200 is input, the controller 170 may move the indicator in a corresponding direction. In detail, the indicator may be moved to be positioned on a left split image according to left key moving input.

The controller 170 may perform control to display a pointer that is moved and displayed according to movement of the remote control device, as shown in FIG. 4, and may perform control to select or focus on any one of the plurality of split images based on movement of the pointer during display of the plurality of split images. For example, the indicator may be displayed on a split image with the pointer positioned thereon or moved between the plurality of split images according to movement of the pointer.

The image display apparatus 100 may determine whether image setting input for a split image with the indicator positioned thereon is present (S1930) and display an image setting object when the image setting input is present (S1935). In addition, the image display apparatus 100 may perform control to apply the same image setting to the plurality of split images according to a setting value set in the setting object (S1940).

When the image setting input is present, the controller 170 may perform control to display the image setting object for image setting for a split image with the indicator positioned thereon.

The image setting object may include at least one of image sharpness, motion compensation, color temperature, hue, saturation, brightness, contrast, motion vector, and frame rate items In addition, the image setting object may include at least one of equalizer, normalizer, and surround items of audio corresponding to an image.

The external device interface unit 130 may further receive split-image related information containing genre information of split images as well as the split images in a stream.

When any one of the plurality of split images is selected or focused on, if image setting input is present, the controller 170 may perform control to determine, as a default setting value, any one of an optimum setting value, a maximum setting value, and a recent setting value, corresponding to genre of the corresponding split image, and to provide the determined value into the image setting object. Accordingly, the user may easily set various setting values during image setting.

When various setting values in the image setting object are set according to user input, the controller 170 may perform image signal processing according to a setting value on a corresponding split image and may also perform image signal processing according to a setting value on the remaining split images.

In addition, the controller 170 may perform control to display the plurality of split images based on a setting value that is set to be the same with respect to all the plurality of split images on the display 180. Accordingly, image setting may be simply applied to the plurality of split images.

According to this method, the user may set images in terms of a split image in which the user is most interested so as to provide an image based on setting according to user preference.

The split image related information received through the external device interface unit 130 may further include information indicating whether a stream contains a plurality of split images and index information about each of the plurality of split images as well as genre information of split images. The controller 170 may perform control to display the plurality of split images in an order based on the index information during display of the plurality of split images based on the index information of each of the plurality of split images.

The split image related information received through the external device interface unit 130 may further include region size information or region position information of each of the plurality of split images. The controller 170 may extract the size information or the region position information and determine the size or position of the plurality of split images during display of the plurality of split images based on the extracted size information or region position information.

In operation 605, when image display input for a plurality of split images is not present, a single image may be displayed (S1907). For example, one broadcast image that is being displayed may be continuously displayed.

The operating method of FIG. 19 will be described in more detail with reference to FIG. 20 and subsequent diagrams.

Figure 20:
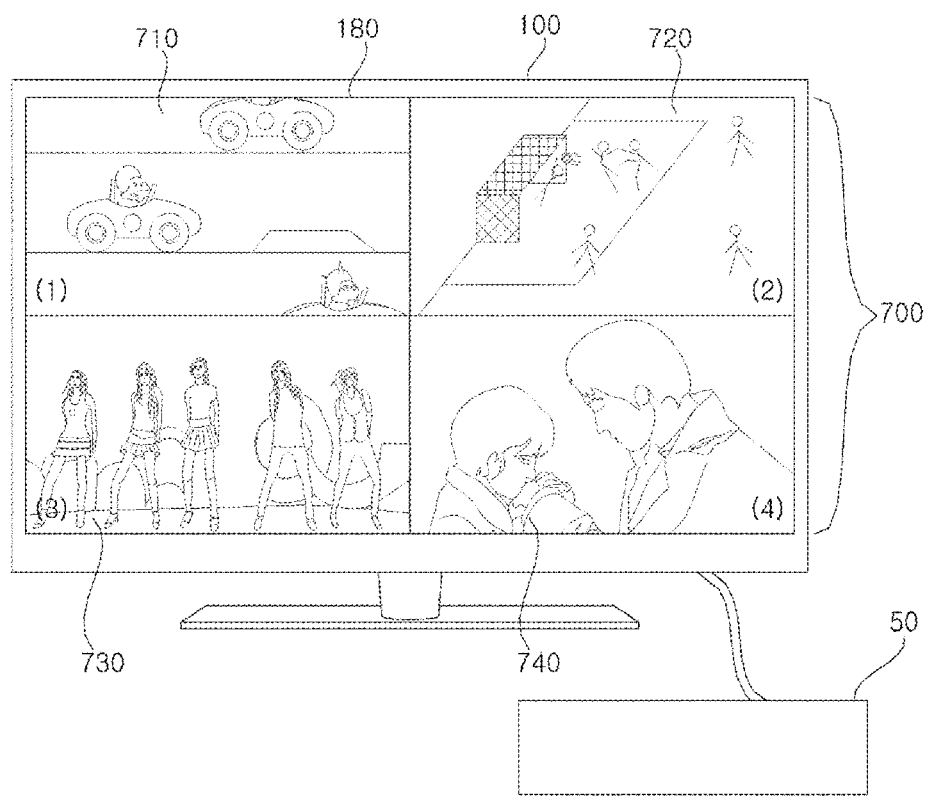

FIG. 20 is a diagram illustrating the case in which an image 700 including a plurality of split images 710, 720, 730, and 740 from the set-top box 50 is displayed on the display 180 of the image display apparatus 100.

Although the diagram illustrates the case in which the plurality of split images 710, 720, 730, and 740 are arranged in an order of top left, top right, bottom left, and bottom right, various changes may be formed.

The plurality of split images 710, 720, 730, and 740 provided by a content provider may be received as one stream by the image display apparatus 100, but customized image setting for the plurality of split images requires high-performance specification of the image display apparatus 100.

Unlike in FIG. 20, a plurality of images provided by a plurality of external devices through a plurality of terminals may be provided to the image display apparatus 100. In this case, customized setting for a plurality of images may also require high-performance specification of the image display apparatus 100.

To overcome this issue, according to embodiments of the present invention, image setting may be performed based on a split image or image in which a user is most interested and the set image setting value may be processed to be applied to other split image or images.

Figure 21:
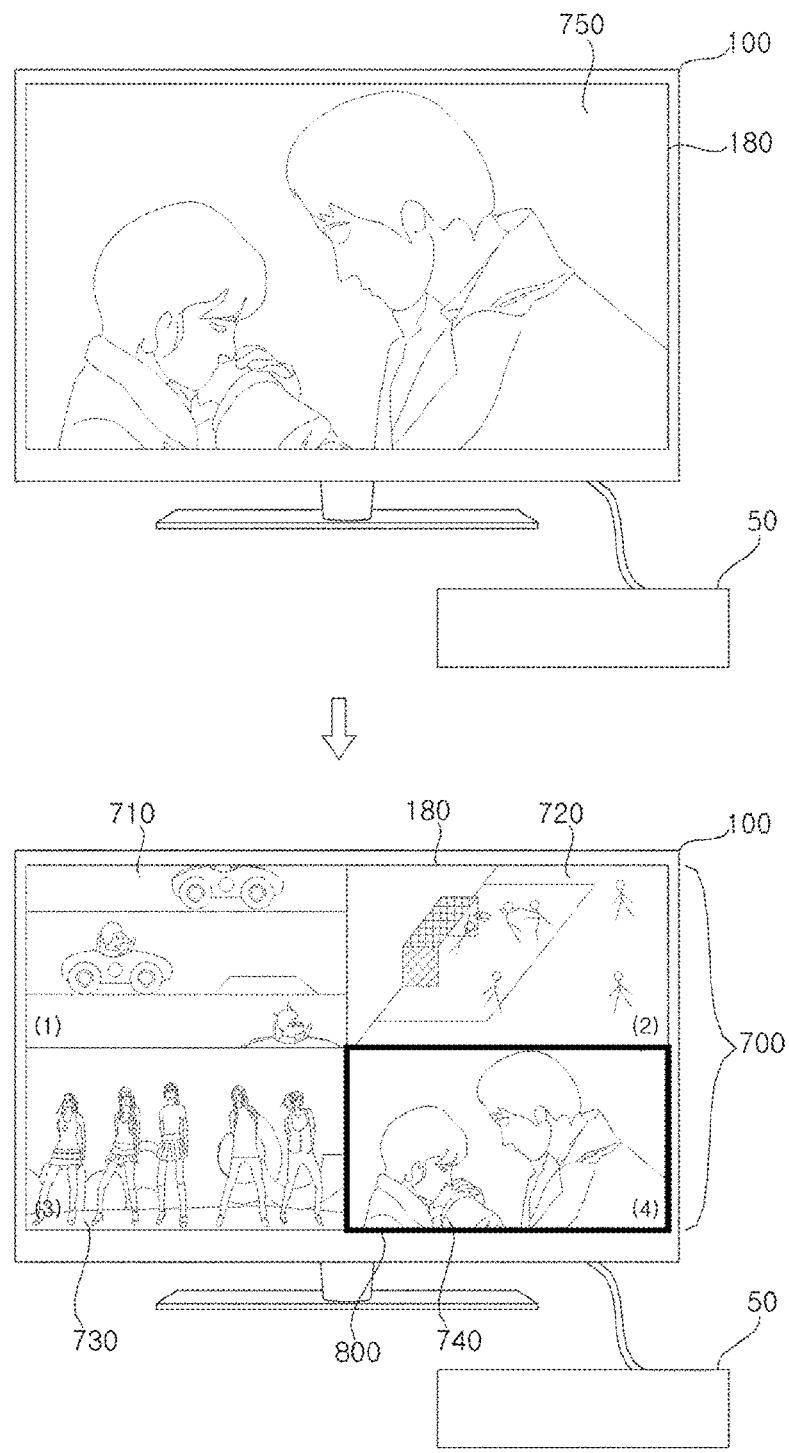

FIG. 21 illustrates the case in which a plurality of split images is displayed on the display 180 of the image display apparatus 100 when display input for the plurality of split images is present while a single image 750 is received by the display 180 of the image display apparatus 100.

In this case, the controller 170 may perform control to display a single image and then to display the plurality of split images when display input for the plurality of split images is present, and perform control to highlight a split image corresponding to the single image among the plurality of split images.

FIG. 21 illustrates the case in which a fourth split image is highlighted among first to fourth split images 710 to 740 because the fourth split image corresponds to the single image 750 that the user is watching. In particular, FIG. 21 illustrates the case in which an indicator 800 surrounding the fourth split image is displayed.

Likewise, an indicator may be automatically displayed such that the user may directly recognize a split image related to an image that the user is watching among a plurality of split images.

FIG. 22 illustrates the case in which an image setting object 900 is displayed on the fourth split image 740 when image setting input is present through a confirmation key 202 of a remote control device while the indicator 800 is displayed on the fourth split image 740 among the first to fourth split images 710 to 740.

The image setting object 900 may include at least one of SHARPNESS, MEMC, COLOR TEMP, HUE, SATURATION, BRIGHTNESS, CONTRAST, and FRAME RATE.

FIG. 22 illustrates the case in which the image setting object 900 includes MEMC, and SHARPNESS, COLOR TEMP items.

FIG. 22 illustrates the case in which the MEMC item is set to 'medium', the SHARPNESS item is set to '80', and the COLOR TEMP item is set to 'warm'.

The MEMC, SHARPNESS, and COLOR TEMP items may be separately adjusted using an item direction key or the like.

After the image setting value is terminated, the controller 170 may perform signal processing so as to apply the same image setting value to all the first to fourth split images 710 to 740 as well as the fourth split image 740.

For example, since the MEMC item is 'medium', the SHARPNESS item is '80', and the COLOR TEMP item is 'warm' in the image setting object 900 of FIG. 22, image signal processing may be performed on all the first to fourth split images 710 to 740.

The controller 170 may perform control to display the first to fourth split images 710 to 740 that are image-signal processed based on the image setting value as one screen image. Accordingly, the user may watch the plurality of split images according to image setting desired by the user, thereby enhancing use convenience of the user.

Figure 23:
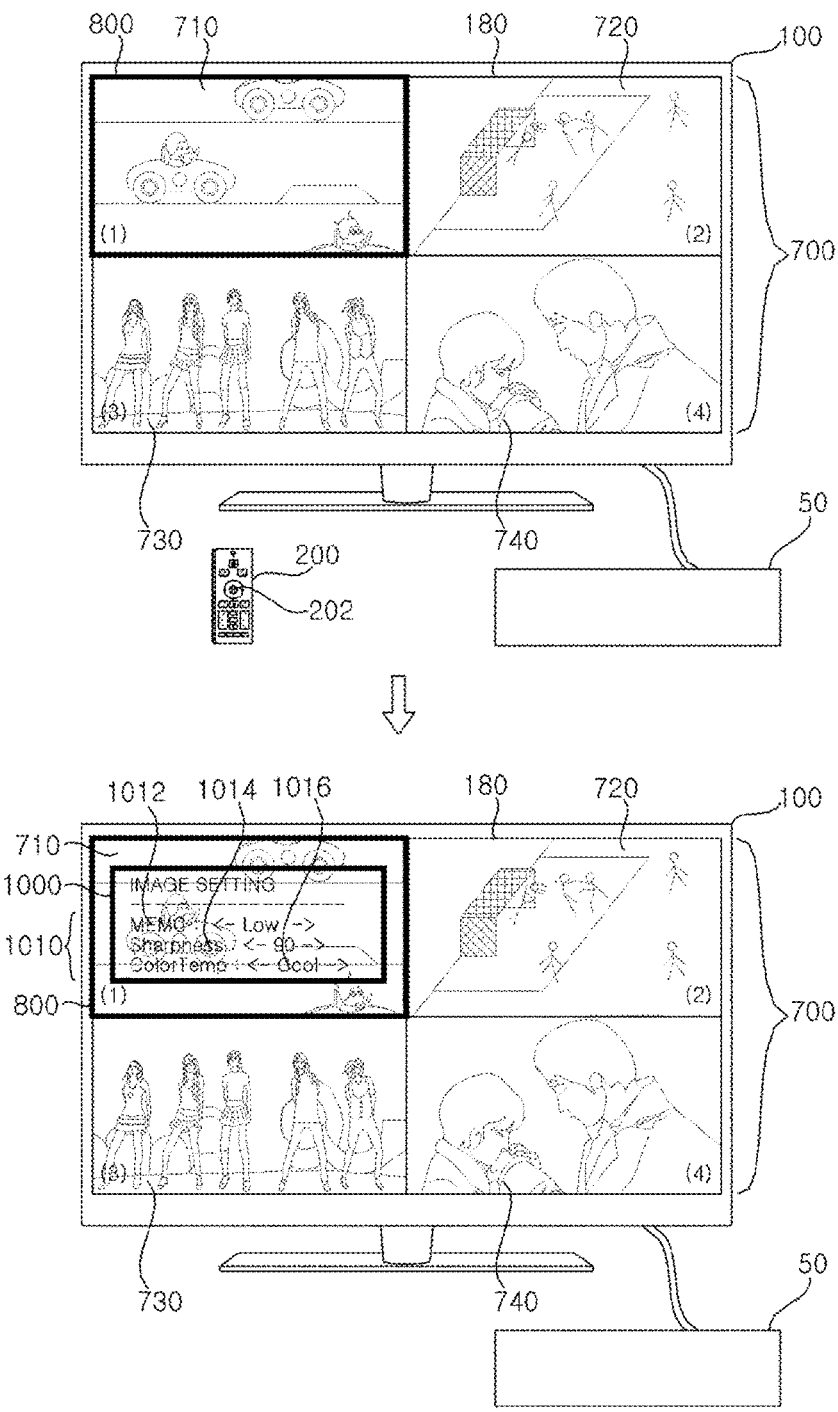

FIG. 23 illustrates the case in which an indicator is moved and positioned on the first split image 710 when indicator moving input is present through a direction key 203 of a remote control device while the indicator 800 is displayed on the fourth split image 740 among the first to fourth split images 710 to 740.

For example, when the user manipulates left and up keys of the direction key 203 of the remote control device 200, the indicator 800 positioned at right and bottom portions may be moved to left and top parts and positioned on the first split image 710. Accordingly, the indicator may be simply moved according to user manipulation.

Figure 24:
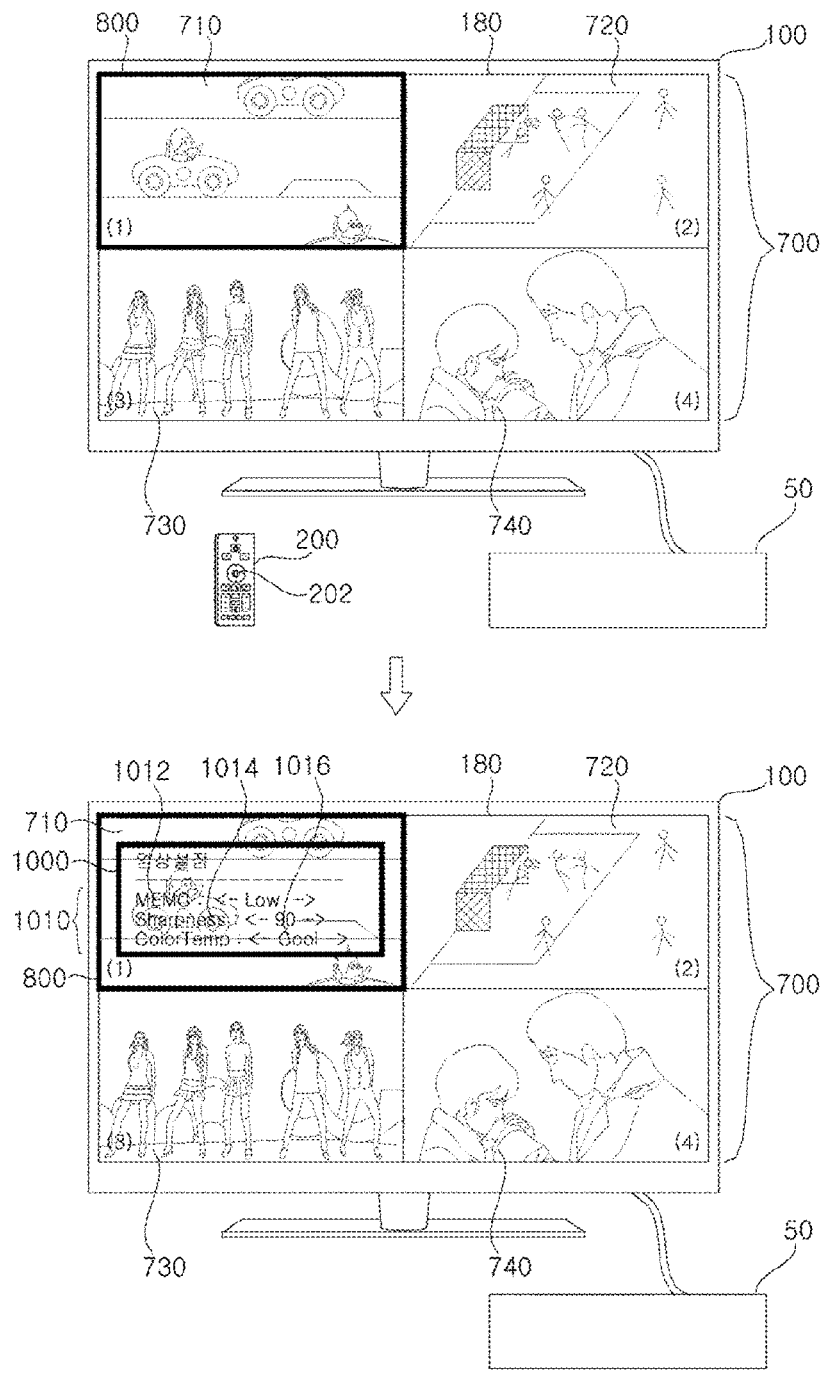

FIG. 24 illustrates the case which an image setting object 1000 is displayed on the first split image 710 when image setting input is present through the confirmation key 202 of the remote control device while the indicator 800 is displayed on the first split image 710 of the first to fourth split images 710 to 740.

FIG. 24 illustrates the case which the image setting object 1000 includes MEMC, and SHARPNESS, COLOR TEMP items.

FIG. 24 illustrates the case in which the MEMC item is set to 'low', the SHARPNESS item is set to '90', and the COLOR TEMP is set to The MEMC, SHARPNESS, and COLOR TEMP items may be separately adjusted using a direction key.

After the image setting value is terminated, the controller 170 may perform signal processing so as to apply the same setting value to all the first to fourth split images 710 to 740 as well as first split image 710

For example, since the MEMC item is 'low', the SHARPNESS item is '90', and the COLOR TEMP item is 'cool' in the image setting object 1000 of FIG. 24, image-signal processing may be performed all the first to fourth split images 710 to 740.

The controller 170 may perform control to display the first to fourth split images 710 to 740, which are image-signal processed based on the image setting value, as one screen image. Accordingly, the user may watch the plurality of split images according to image setting desired by the user, thereby enhancing use convenience of the user.

The controller 170 may perform control to display a signal-processed single image based on an image value of the single image when image display containing the split images is released.

FIGS. 25A to 25D illustrate various image setting objects.

Figure 25A:
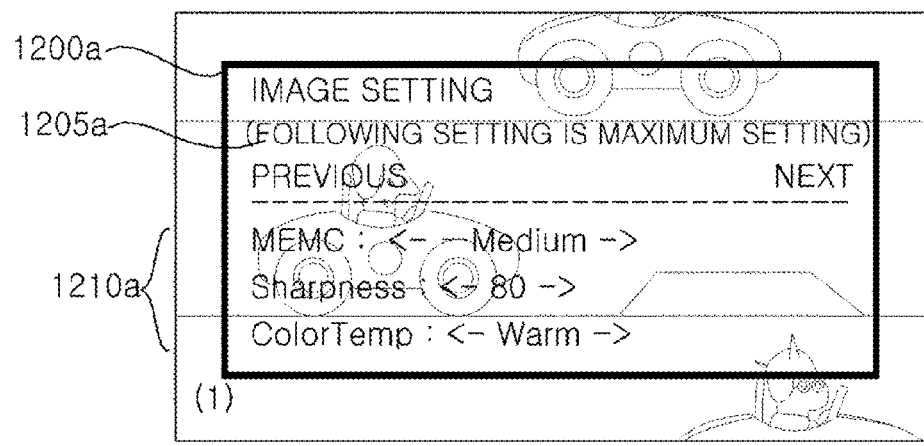

FIG. 25A illustrates an image setting object 1200a for providing an image setting value corresponding to a maximum setting value as a default value.

The image setting object 1200a of FIG. 25A may include a message 1205a indicating maximum setting and items 1210a thereof. The image setting object 1200a may have different image setting values according to genres of split images. In particular, maximum setting values may be different. The controller 170 may perform control to determine a maximum setting value as a default setting value according to genre of a split image and to provide the maximum setting value into an image setting object.

The maximum setting value may refer to a value that is set the most by the user. In particular, the maximum setting value may refer to a maximum setting value for each respective image genre.

Figure 25B:
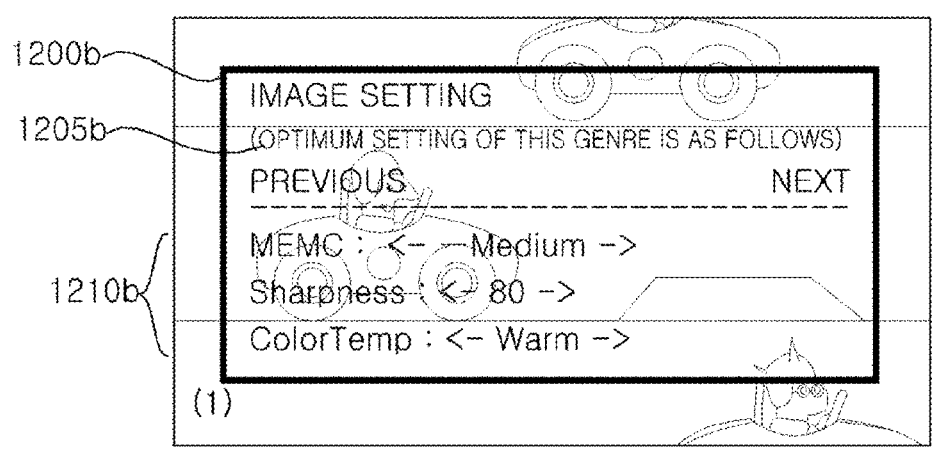

FIG. 25B illustrates an image setting object 1200b for providing an image setting value corresponding to an optimum setting value as a default value.

The image setting object 1200b of FIG. 25B may include a message 1205b indicating optimum setting and items 1210b thereof. The image setting object 1200b may have different image setting values according to genres of split images. In particular, optimum setting values may be different. The controller 170 may perform control to determine an optimum setting value as a default setting value according to genre of a split image and to provide the optimum setting value into an image setting object.

Figure 25C:
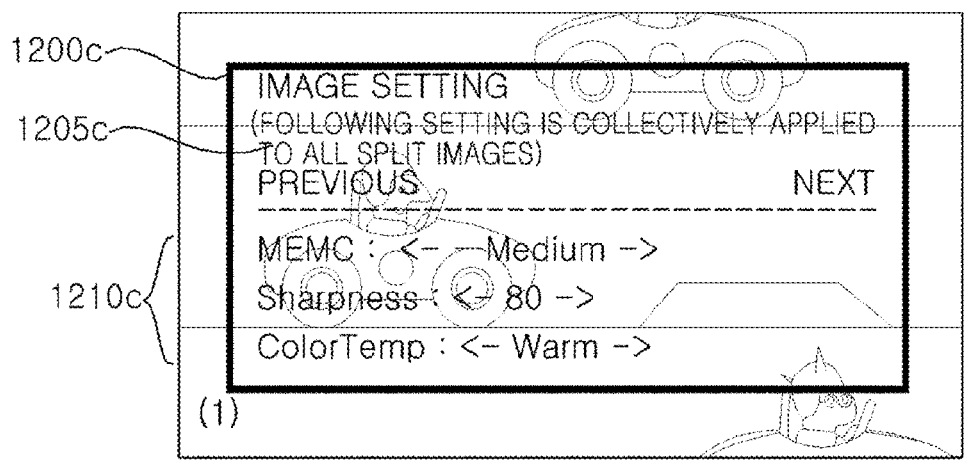

FIG. 25C illustrates an image setting object 1200c including a message 1205c indicating that a setting value is collectively applied to all split images and setting items 1210c thereof.

The message indicating that a setting value is collectively applied to all split images according to various setting values in the image setting object 1200c of FIG. 25C so as to be recognized by the user.

Figure 25D:
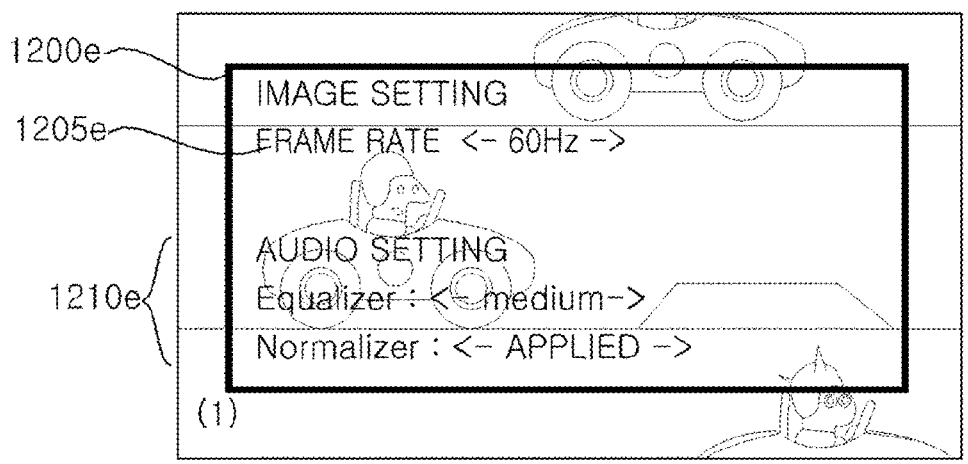

FIG. 25D illustrates an image setting object 1200e containing a frame rate item 1205e and an audio setting item 1210e.

The audio setting item 1210e may include an equalizer, a normalizer item, a surround item, and so on. FIG. 25D illustrates the case in which the audio setting item 1210e includes the equalizer item and the normalizer item.

In particular, FIG. 25D illustrates the case in which the frame rate item 1205e is '60 Hz', the equalizer item is 'medium', and the normalizer item is 'applied'.

Under this setting, the controller 170 of the image display apparatus 100 may perform frame rate setting and audio signal processing on all the first to fourth split images 710 to 740.

During display of a plurality of split images, audio may be output only for a split image with an indicator positioned thereon, and audio for the corresponding split image may be output according to movement of the indicator. In this case, as illustrated in FIG. 25D, audio-signal processing may be performed based on the case in which the set equalizer item is 'medium' and the set normalizer item is 'applied'.

Figure 26:
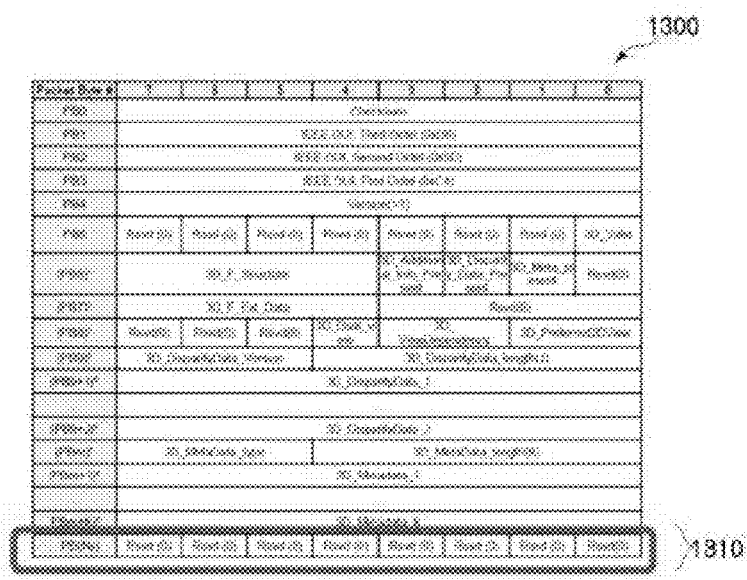
Figure 27:
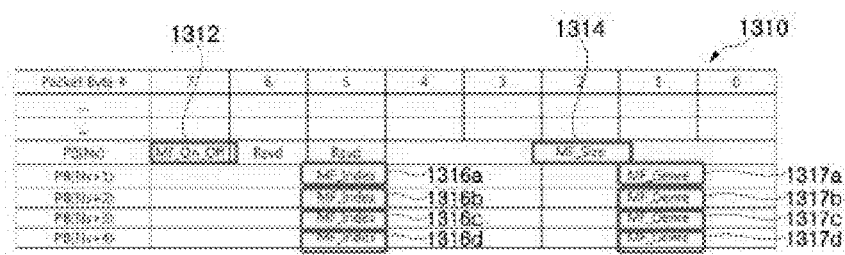
Figure 28:
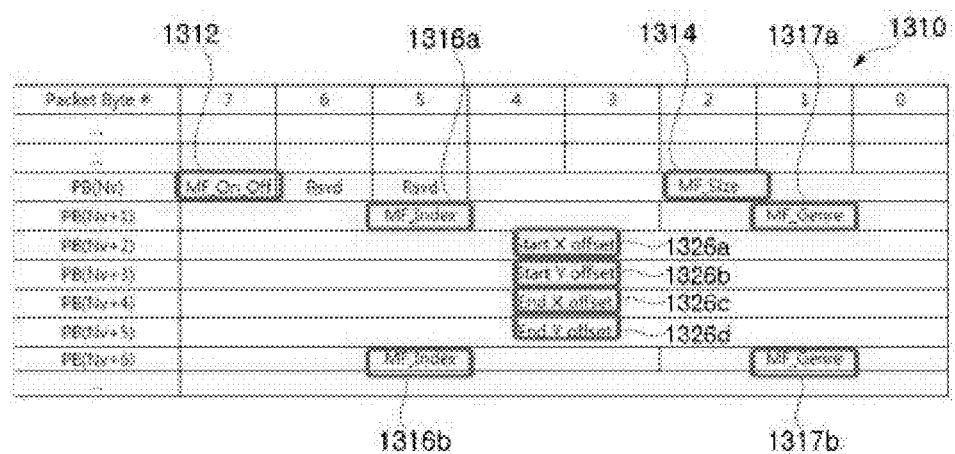

FIGS. 26 to 28 are diagrams illustrating an example of a method for transmitting split image related information to the image display apparatus 100 from the set-top box 50.

FIG. 26 is a diagram illustrating a configuration of HDMI Vendor-Specific InfoFrame 1300.

With regard to the HDMI Vendor-Specific InfoFrame 1300, a content provider or the like may add split image related information to an available Reserved Byte. FIG. 26 illustrates the case in which a Reserved Packet Byte 1310 is used.

FIG. 26 illustrates the case in which the split image related information 1310 as an example of the Reserved Packet Byte 1310 includes information 1312 indicating whether a stream contains a plurality of split images, number information 1314 of the split images, index information 1316a to 1316d about each of the plurality of split images, and genre information 1317a to 1317d of each split image.

The information 1312 indicating whether a stream contains a plurality of split images may indicate that a screen image containing a split image is on when 'MF_On_Off' is '0x1' and that the screen image containing the split image is off when 'MF_On_Off' is '0x0'.

The number information 1314 of the split images may have a value of 1 to 32 as 'MF_Size'. Each value may indicate the number of split screen images, that is, the number of split images.

Index information 1316 of the split image may indicate an index of the split image using 'MF_Index'.

Genre information 1317 of the split image may indicate GENERAL when 'MFGenre' is '0x0', indicate CINEMA when 'MF_Genre' is '0x1', indicate SPORTS when 'MF_Genre' is '0x2', indicate GAME when 'MF_Genre' is '0x3', and indicate MUSIC when 'MF_Genre' is '0x4'.

For example, when 'MF_On_Off' is '0x1', this means that a plurality of split images is present, and when 'MF_Size' is '0x4', this means four split images.

When 'MF_Index' is '0x0' and 'MF_Genre' is '0x1', a CINEMA image is positioned at a top left portion, when 'MF_Index' is '0x1' and 'MF_Genre' is '0x2', a SPORTS image is positioned at a top right portion, when 'MF_Index' is ' 0x2' and 'MF_Genre' is '0x3', a GAME image is positioned at a bottom left portion, and when 'MF_Index' is ' 0x3' and 'MF_Genre' is '0x4', a MUSIC image is positioned at a bottom right portion.

The controller 170 may split regions in the panel using panel resolution of the display 180 and the number information 1314 of the split images.

In addition, the controller 170 may generate an indicator corresponding to the size of an edge of a split region. The controller 170 may move the displayed indicator according to indicator moving input.

FIG. 27 illustrates the case in which the split image related information 1310 as another example of the Reserved Packet Byte 1310 further include region size information or region position information 1236 of each of the plurality of split images.

The split image related information 1310 of FIG. 27 may include information 1312 indicating whether the stream described with reference to FIG. 26 contains a plurality of split images, the number information 1314 of split images, index information 1316a to 1316d of each of the plurality of split images, and genre information 1317a to 1317d of each split image.

Hereinafter, only the region size information or region position information 1236 of each of the plurality of split images, which is a difference from FIG. 26, will be described.

As illustrated in the drawing, the region size information or region position information 1236 may include 'Start X Offset' 1326a, 'Start Y Offset' 1326b, 'END X Offset' 1326c, and 'END Y Offset' 1326d. Accordingly, region size information or position information may be recognized.

Figure 29:
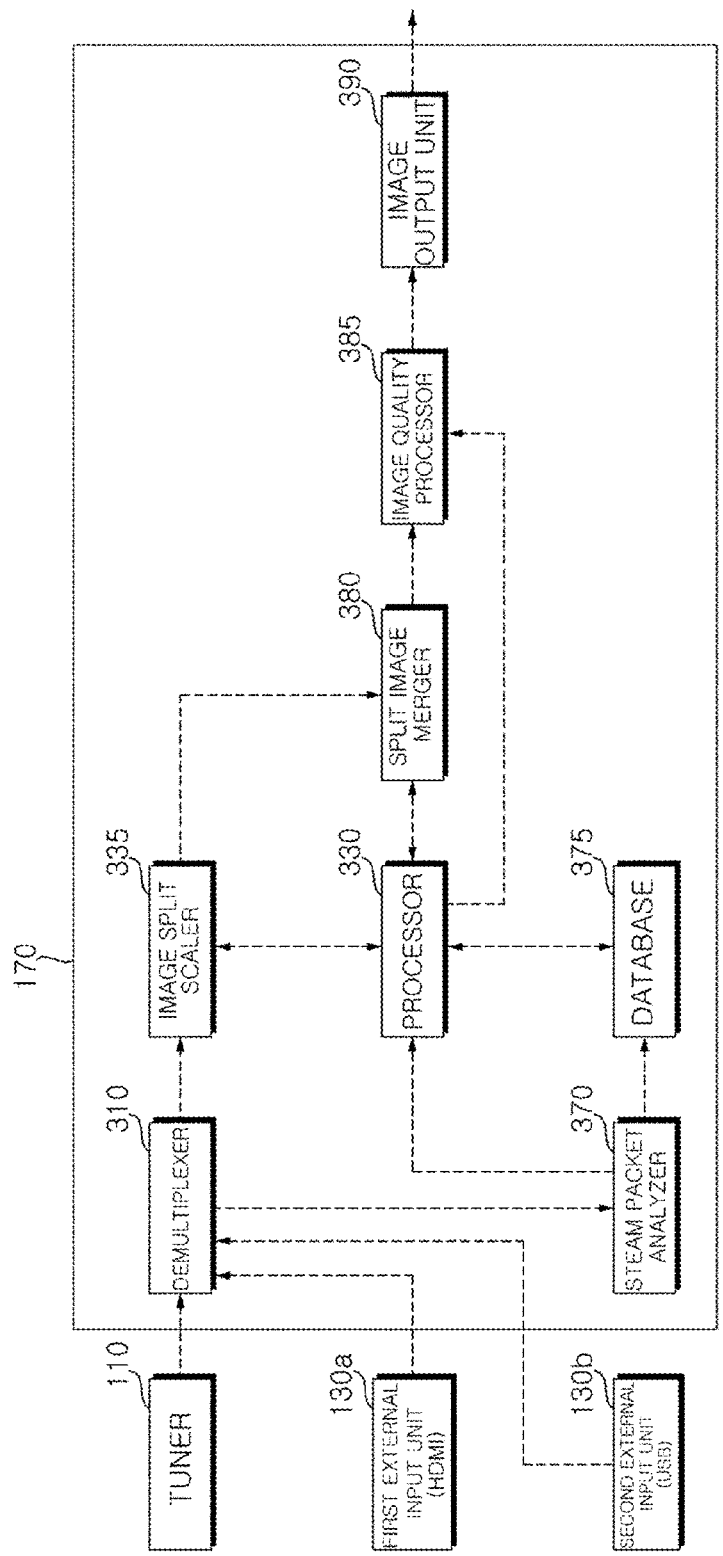

FIG. 29 is an internal block diagram of another example of the controller 170 in an image display apparatus.

Referring to FIG. 29, the controller 170 may receive an image signal from a plurality of units. In FIG. 29, an image signal or a stream may be received through the tuner 110, a first external input unit 130a such as a HDMI terminal, and a second external input unit 130b such as a USB terminal and forwarded to the controller 170.

The controller 170 may include a demultiplexer 310 for extracting a plurality of split images from the stream received through the tuner 110, the first external input unit 130a such as a HDMI terminal, and the second external input unit 130b such as a USB terminal, a scaler 335 for scaling each of the plurality of split images, a split image merger 380 for merging the scaled split images, and an image quality processor 385 for processing image quality of all the merged split images according to a set image setting value.

The scaler 335 may scale the split images using the panel resolution of the display 180 and the number information 1314 of the split image so as to display the split images in the split regions in the panel.

The controller 170 may further include a stream analyzer 370 for analyzing a stream packet based on the split image related information. The stream analyzer 370 may extract genre information of split images and index information of the split images from the split image related information.

In addition, the extracted genre information and index information of the split image may be provided to the controller 170 and a database 375.

The database 375 may store a user setting value set for each respective genre, and the user setting value may be used to display maximum setting, optimum setting, and recent setting as illustrated in FIGS. 25A and 25B.

The plurality of split images, image quality of which is processed by the image quality processor 385, may be changed to a signal for transmission to the display 180 through an image output unit 390. For example, the image output unit 390 may output a LVDS signal or a mini LVDS signal.

With regard to FIG. 29, it may be possible to display a plurality of images to which the same image setting value is applied as well as to display a plurality of split images to which the same image setting value is applied.

That is, according to another embodiment of the present invention, the image display apparatus 100 may include the image receiver 105 for receiving a plurality of images, the display 180 for displaying the plurality of images as the same screen image, and the controller 170 that performs control to display an indicator for selecting or focusing on any one of the plurality of images, to display an image setting object when image setting input for an image with an indicator positioned thereon is present, and to set a setting value set according to an image setting object to the same value with respect to all the plurality of images.

In particular, as illustrated in FIG. 29, the controller 170 may perform control to receive an image signal or stream through the tuner 110, the first external input unit 130*a* such as a HDMI terminal, and the second external input unit 130*b* such as a USB terminal, to display streams received from different sources as a plurality of images as the same screen image, and to display an indicator for selecting or focusing on any one of the plurality of images, perform control to display an image setting object when image setting input for the image with the indicator positioned thereon is present, and set a setting values set according to an image setting object to the same value with respect to the plurality of images, thereby enhancing use convenience of a user.

The image receiver 105 may receive image related information containing genre information of an image. When any one of the plurality of images is selected or focused on, if image setting input is present, the controller 170 may determine, as a default setting value, any one of an optimum setting value, a maximum setting value, and a recent setting value, corresponding to genre of the corresponding image and provide the determined value into the image setting object.

The controller 170 may perform control to display source information about the plurality of images together during display of the plurality of images.

In detail, the image receiver 105 may further receive image related information containing source information of the image. The controller 170 may perform control to extract the source information and to display an object containing the source information together on the plurality of images.

For example, when a source of a first split image of FIGS. 20 to 24 is a game console, an object indicating 'game console' may be displayed in the first split image, when a source of a second split image is the set-top box 50, an object indicating 'settop' may be displayed in the second split image, when a source of a third split image is an antenna, an object indicating 'RF' may be displayed in the third split image, and when a source of a fourth split image is an optical disc device, an object indicating 'Blulay' may be displayed in the fourth split image. Accordingly, the user may directly check a source of an image.

According to another embodiment of the present invention, an image display apparatus may include an interface unit for receiving a stream containing a plurality of split images from one source, a display for displaying the plurality of split images as the same screen image, and a controller for performing control to display an indicator for selecting or focusing on any one of the plurality of split images, to display an image setting object when image setting input for a split image with the indicator positioned thereon is present, and to set a setting value set according to an image setting object to the same value with respect to all the plurality of split images, thereby simply performing image setting on the plurality of split images.

In particular, image quality setting of image sharpness, motion compensation, color temperature, hue, saturation, brightness, contrast, motion vector, frame rate items, and so on may be simply performed on the plurality of split images.

Audio setting of equalizer, normalizer, and surround items of audio corresponding to an image may be simply performed on the plurality of split images.

The indicator may be displayed such that the user may easily focus on or select a split image desired by the user.

Figure 30:
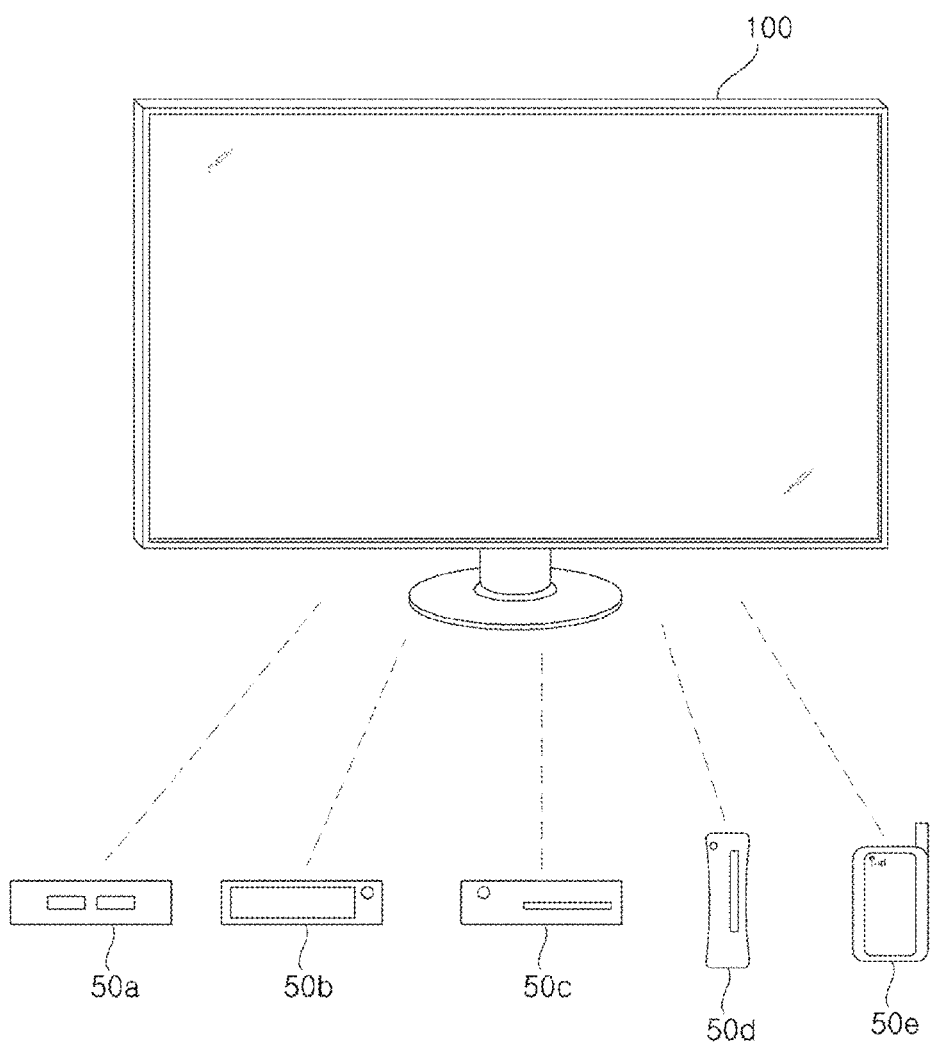
FIG. 30 is a diagram illustrating an image display apparatus according to another exemplary embodiment of the present invention.

FIG. 30 is a diagram illustrating an image display apparatus 100 according to another exemplary embodiment of the present invention.

Referring to the drawing, the image display apparatus 100 may receive data from a plurality of external devices. In particular, the image display apparatus 100 may receive a plurality of external input images.

Although the drawing illustrates a set-top box 50*a*, a game console 50*b*, an optical disc reproducing device 50*c*, a computer 50*d*, and a mobile terminal 50*e* as a plurality of external devices, various devices such as an antenna, a camera, a camcorder, and a storage device such as a USB may be used.

According to the present invention, the image receiver 105 (refer to FIG. 2) in the image display apparatus 100 may receive a plurality of external input images through various interface or input terminals, signal-process the plurality of received external input images, display a plurality of images as the same screen image, and display source information of the plurality of images together during display of the plurality of images. Accordingly, the source information of the plurality of images may be simply recognized while the plurality of images is displayed as the same screen image, which will be described in more detail with reference of FIG. 31 and subsequent diagrams.

A broadcast image of the plurality of images may be contained as the default. That is, the image display apparatus 100 according to the present invention may correspond to a television (TV) including a tuner and so on.

The image display apparatus 100 may change positions for displaying a plurality of images according to moving input of the plurality of images, thereby enhancing use convenience of a user.

Figure 31:
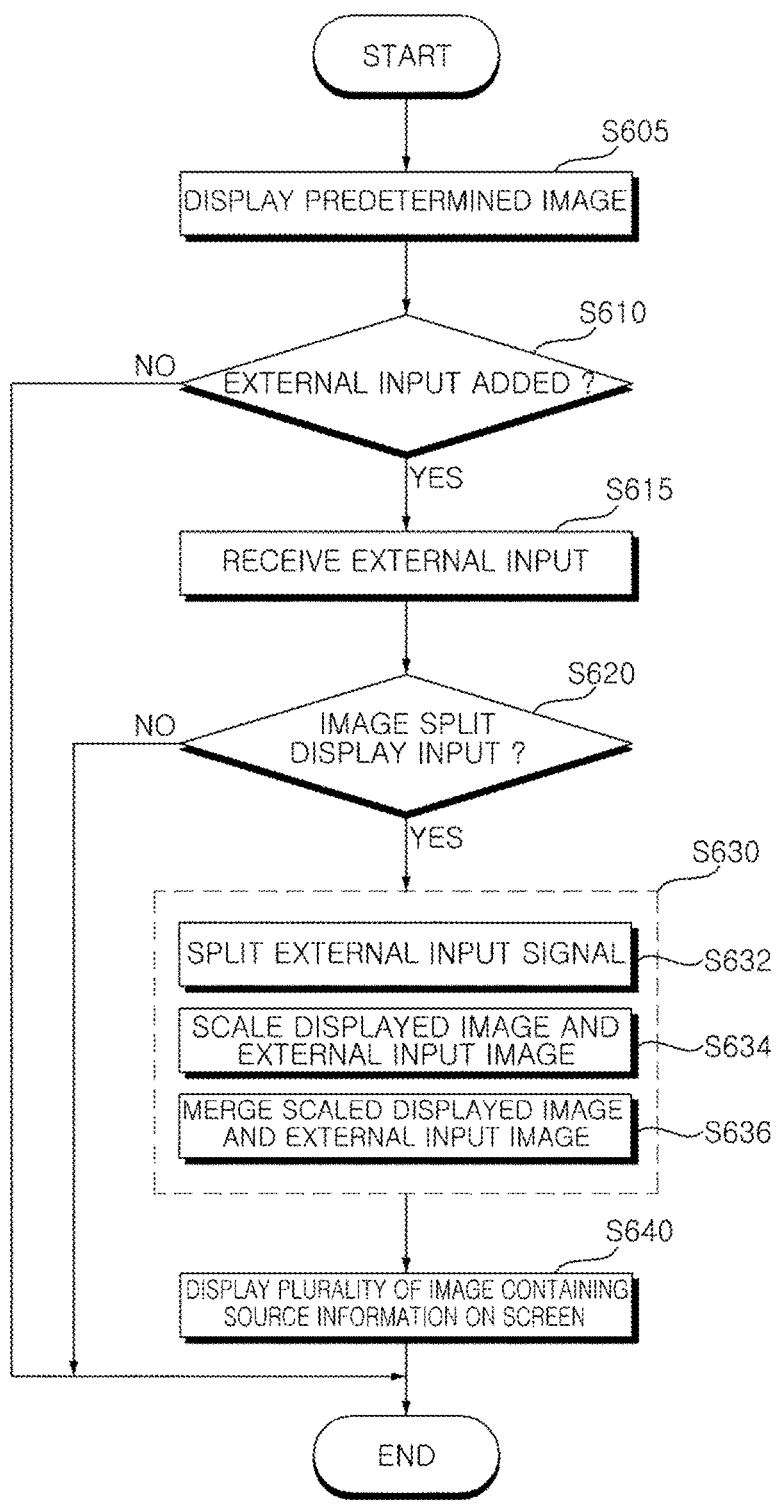
FIG. 31 is a flowchart illustrating an example of a method for operating an image display apparatus according to another exemplary embodiment of the present invention.

FIG. 31 is a flowchart illustrating an example of a method for operating an image display apparatus according to another exemplary embodiment of the present invention. FIGS. 32 to 38B are diagrams for explanation of the operation method of FIG. 31.

First, referring to FIG. 31, the image display apparatus 100 may display a predetermined image through the display 180 (S3105). The predetermined image may be a broadcast image received through the tuner 110 of FIG. 2, an external input image received through the external device interface unit 130, or the like.

Then the image display apparatus 100 may determine whether external input is added (S3110) and receive external input when the external input is added (S3115).

When any one of the set-top box 50*a*, the game console 50*b*, the optical disc reproducing device 50*c*, and the computer 50*d* is connected through a HDMI terminal of the external device interface unit 130, the image display apparatus 100 may determine that external input is added and receive an external input image from a corresponding device.

When the external device is connected, a signal may be received from the external device, and the controller 170 may determine whether the external device is connected. In this case, the signal may be a power signal for determining whether the external device is connected.

The received external input image may be image-signal processed by the controller 170.

Then the image display apparatus 100 may determine whether an image split display input is present (S3120), perform signal processing corresponding to the image split display input (S3130), and display a plurality of screen images containing source information as the signal processing is performed (S3140).

When a key corresponding to the image split display input is operated through a remote control device, the controller 170 of the image display apparatus 100 may perform control to display a plurality of images as the same screen image and to display source information of the plurality of images together during display of the plurality of images.

The image-signal processing S3130 may include splitting an external input signal S3132, scaling a displayed image and an external input image S3134, and merging the scaled display image and external input image S3136.

The controller 170 may extract an image from the stream received through the image receiver 105, scale the extracted image, perform image-quality processing corresponding to the scaled image, and display the plurality of images with processed image-quality as one screen image. In addition, the controller 170 may output one image containing a plurality of merged images to be displayed on the display 180.

The controller 170, in particular, a demultiplexer 310 may separate an external image signal and a data signal of an external image during the extraction of the external input signal.

The data signal of the external image may include image source information, image size information, and resolution image.

The controller 170, in particular, an OSD generator 340 may generate an object indicating an image source using source information of an image. The object indicating the image source information may be contained in each of the plurality of images.

The object indicating the image source may be, for example, 'Live TV', 'game console', 'PC', or 'Bluray' and other various changes may be formed. An image that is not based on a text may be displayed.

Likewise, source information of each of the plurality of images may be displayed together while the plurality of images is displayed as a single screen image such that a user simply recognizes the source information of the plurality of images, thereby enhancing use convenience of the user.

During display of the single image, moving input for each image may be present. For example, when any one of the images is dragged and dropped to a predetermined region, the image may be moved and displayed at the corresponding position. According to moving input of the plurality of images, positions for displaying the plurality of images may be freely changed, thereby enhancing use convenience of a user.

Figure 32:
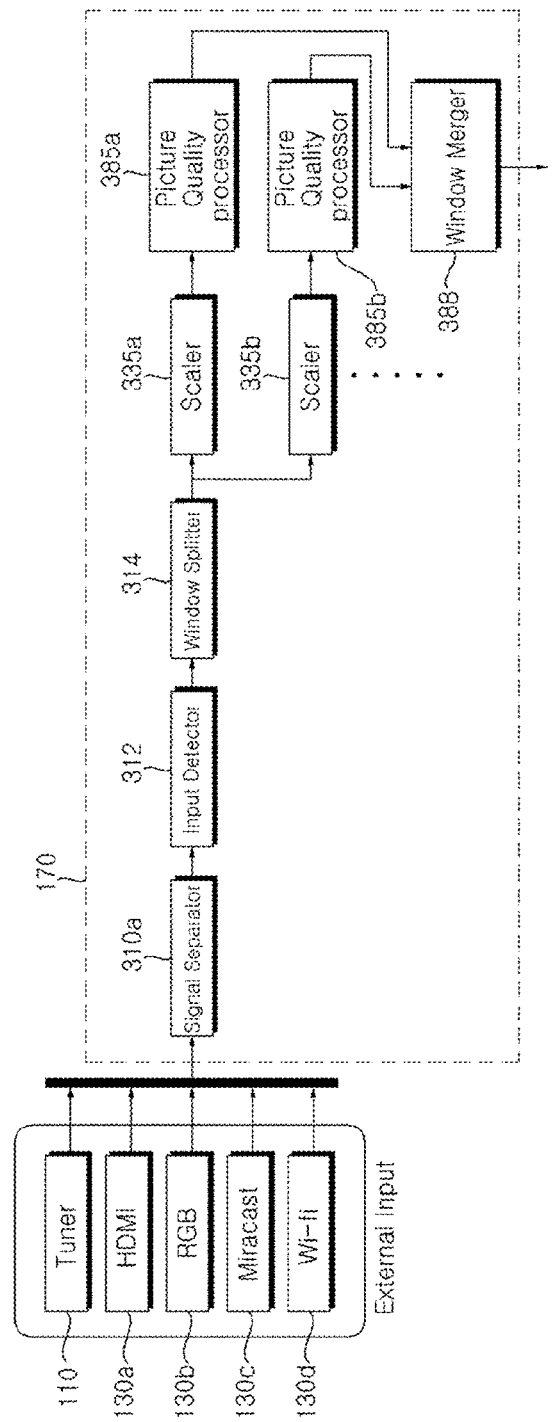

FIG. 32 is an internal block diagram illustrating another example of the controller 170 according to an exemplary embodiment of the present invention.

Referring to the drawing, various external signals, in particular, external input images may be received through the image receiver 105. The drawing illustrates the case in which a broadcast signal is received through the tuner 110, and an external input signal from the set-top box 50*a*, the game console 50*b*, the optical disc reproducing device 50*c*, the computer 50*d*, the mobile terminal 50*e*, and so on is received through a HDMI terminal 130*a*, a RGB terminal 130*b*, a miracast interface 130*c*, and a Wi-Fi interface 130*d* of the external device interface unit 130.

The controller 170 may receive a broadcast signal, an external input signal, and so on and signal-process them.

To this end, the controller 170 may include a signal separator 310*a*, an input detector 312, a window splitter 314, scalers 335*a*, 335*b*, . . . , a picture quality processor 385*a*, 385*b*, . . . , a window merger 388, and so on.

The signal separator 310*a* may separate various external input signals, a broadcast signal, and so on and separate an image, audio, and data from each signal, in particular, a stream.

The input detector 312 may extract image source information, image size information, and resolution information from the data, in particular, image related information separated by the signal separator 310*a*.

Here, the image source information may be used to generate the object indicating the source information by the OSD generator 340, and the image size information and the resolution information may be used to scale an image by the scaler 335.

The window splitter 314 may split a window in an image according to the number of input external input images, the size of the display 180, resolution, and so on.

The scalers 335*a*, 335*b*, . . . may scale the external input image according to the window in the image, the image size information, and the image resolution information. That is, the scalers 335*a*, 335*b*, . . . may each change a scaling ratio for image scaling based on the image size information, the image resolution information, size of the display 180, resolution, and so on, and may each scale the external input image.

The picture quality processor 385*a*, 385*b*, . . . may perform image-quality signal processing on each scaled image. For example, the picture quality processor 385*a*, 385*b*, . . . may perform signal-processing on image sharpness, motion compensation, color temperature, hue, saturation, brightness, contrast, and so on.

In particular, the picture quality processor 385*a*, 385*b*, . . . may perform signal-processing on image sharpness, motion compensation, color temperature, hue, saturation, brightness, contrast, and so on so as to correspond to an image source type or an image genre.

The window merger 388 may merge the plurality of scaled and image-quality processed images in one screen image. In addition, the window merger 388 may output one merged screen image.

The window merger 388 may make the object indicating the source information generated by the OSD generator 340 be contained in each image. Accordingly, the object indicating each source information item may be contained in the plurality of images.

FIGS. 33 to 38B are diagrams for explanation of the operating method of FIG. 31.

FIG. 33 illustrates the case in which, when external input is added while the display 180 of the image display apparatus 100 displays a broadcast image 1810, an image split display object 1820 for guidance of image split display is displayed according to the external input addition. FIG. 33 illustrate an example in which an object 1812 indicating 'live Tv' as source information is displayed together in the broadcast image 1810.

The controller 170 may perform control to display the image split display object for guiding the image split display according to the external input addition when the external input is added during display of the broadcast image 1810.

In this case, when an item 'Yes' is selected to cause input image split display input, during display of one broadcast image, the broadcast image may be split into two images, and the two images may be displayed on one screen, as illustrated in the drawing.

The drawing illustrates the case in which a displayed broadcast image is reduce-scaled, a scaled broadcast image 1810a is displayed at a left portion, and an external input first external input image 1830a is displayed at a right portion.

An object 1812a indicating information of reducing-scaled 'Live TV' may be displayed in the reducing-scaled broadcast image 1810a.

The first external input image 1830a may be an image input from the game console 50b among the plurality of external devices of FIG. 1, and may be reducing-scaled by the controller 170 and then displayed as one screen image together with the broadcast signal, as illustrated in the drawing.

The first external input image 1830a may be displayed together with an object 1832a indicating source information such as 'game console'. The drawing illustrates the case in which the object 1832a is displayed to overlap on the first external input image 1830a.

The drawing illustrates the case in which two images are displayed in side by side format, and thumbnail images associated with the broadcast image 1810 and the first external input image 1830a are displayed in the remaining region.

The controller 170 may perform control to further display thumbnail images associated with a plurality of images while a plurality of images is displayed as the same screen image.

The drawing illustrates a first thumbnail image list 1825a displayed above the broadcast image 1810 and the first external input image 1830a, and a second thumbnail image list 1825b displayed below the broadcast image 1810 and the first external input image 1830a.

FIG. 34 illustrates the case in which the number of external input is increased compared to FIG. 33.

The drawing illustrates the case in which, when external input is added from a PC 50d during display of the broadcast image 1810 and the first external input image 1830a, a right region is split to display the first external input image 1830a and a second external input image 1840a.

The second external input image 1840a may be an image input from the game console 50b among the plurality of external devices of FIG. 1, and may be reducing-scaled by the controller 170 and then displayed as one screen image together with the broadcast signal, as illustrated in the drawing.

The second external input image 1840a may be displayed together with an object 1842a indicating source information such as 'PC'. The drawing illustrates the case in which the object 1842a is displayed to overlap on the second external input image 1840a.

The drawing illustrates the case in which three images are displayed on the display 180, and thumbnail images associated with the broadcast image 1810, the first external input image 1830a, and the second external input image 1840a are displayed on the remaining regions except for the region for display of the three images.

The drawing illustrates a first thumbnail image list 1826a displayed above the broadcast image 1810, and a second thumbnail image list 1826b displayed below the broadcast image 1810.

The controller 170 may perform control to reduce the number of thumbnail images as the number of a plurality of images is increased. That is, the number of the thumbnail images of FIG. 34 may be further reduced compared to the number of the thumbnail images since the size of the remaining region except for display of the images is reduced compared to FIG. 33.

As seen from FIGS. 33 and 34, the sizes of the displayed images are constant even if the number of the images is increased, but other various changes may be formed.

That is, the controller 170 may further reducing-scale an external input image during scale of the external input image as the number of a plurality of images is increased. The controller 170 may perform control to display scaled images in line.

Whenever external input is added, the controller 170 may change a scaling ratio for display of a plurality of images or change positions for display of the plurality of images in order to split and display an image.

FIG. 35 illustrates the case in which the number of external input is increased compared to FIG. 34.

The drawing illustrates the case in which, when external input is added from the optical disc reproducing device 50c during display of the broadcast image 1810, the first external input image 1830a, and the second external input image 1840a, a left image is split to display the broadcast image 1810 and a third external input image 1850a.

The third external input image 1850a may be an image input from the optical disc reproducing device 50c among the plurality of external devices of FIG. 1, and may be reducing-scaled by the controller 170 and then displayed as one screen image together with the broadcast signal, as illustrated in the drawing.

The third external input image 1850a may be displayed together with an object 1852a indicating source information such as 'Bluray'. The drawing illustrates the case in which the object 1845a is displayed to overlap on the third external input image 1850a.

Likewise, source information of each of the plurality of images may be displayed together while the plurality of images is displayed as a single screen image such that a user simply recognizes the source information of the plurality of images.

Figure 36A:
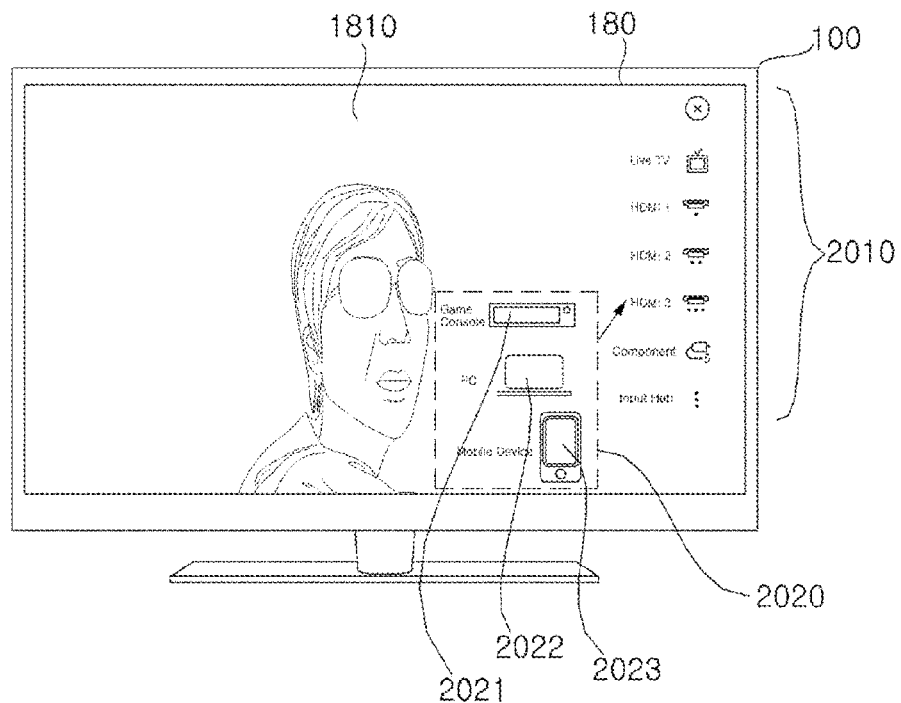

FIG. 36A illustrates the case in which, when external input is added during display of the predetermined image, an object 2020 indicating the added external input terminal is displayed.

For example, when the game console 50b, the PC 50d, and the mobile terminal 50e are added as external input while the predetermined image 1810 is displayed on the display 180 or input for viewing an external input list is present, the object 2020 indicating the added external input terminal may be displayed in order to display the added external input as illustrated in the drawing.

In the drawing, the object 2020 indicating the external input terminal may include a game console item 2021, PC item 2022, and a mobile terminal item 2023. In particular, the drawing illustrates the case in which corresponding items are added to a list 2010 indicating an existing external input terminal. Accordingly, a user may intuitively recognize a terminal from which external input is added.

Figure 36B:
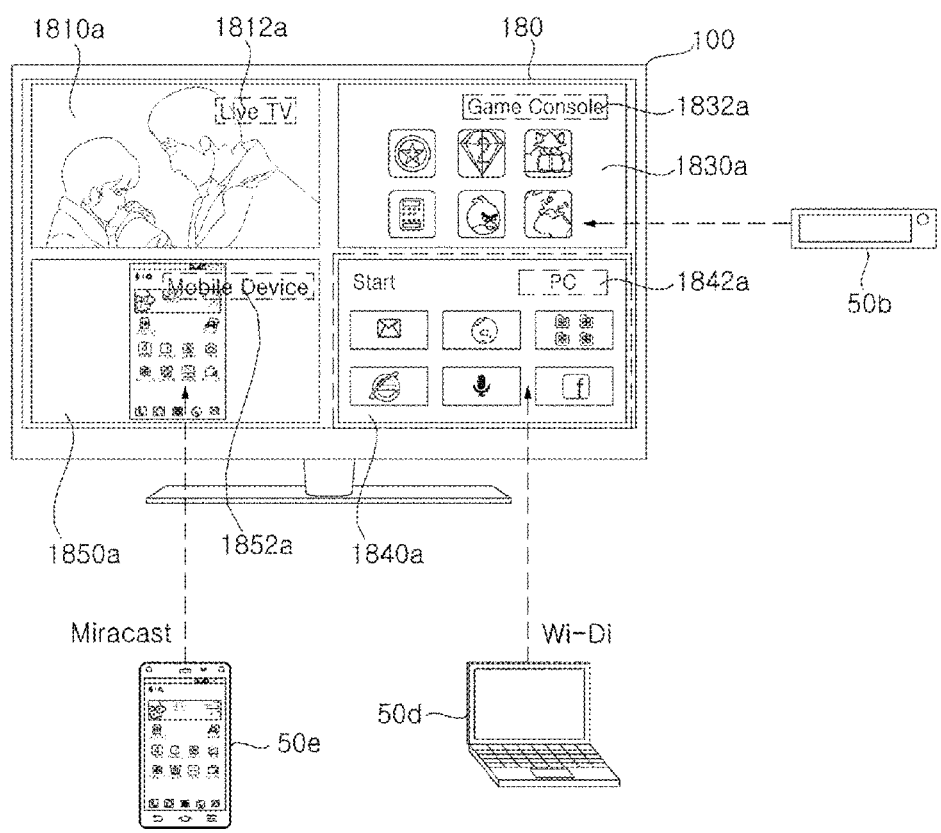

FIG. 36B illustrates the case in which the broadcast image 1810a, a game image 1830a, PC image 1840a, and a mobile terminal image 1850a are displayed as one screen image on the display 180.

That is, the image display apparatus 100 may receive corresponding images from an antenna, the game console 50b, the PC 50d, and the mobile terminal 50e, respectively, perform signal processing such as scaling, and display a plurality of images as one screen image.

In this case, the broadcast image 1810a, the game image 1830a, the PC image 1840a, and the mobile terminal image 1850a may include objects 1812a, 1832a, 1842a, and 1852a indicating source information thereof.

The drawing illustrates the case in which the mobile terminal 50e transmits an image of a mobile terminal to the image display apparatus 100 and the image display apparatus 100 displays the image of the corresponding mobile terminal as a separate split image at a bottom left portion according to a miracast function. However, other various changes may be formed.

When the added external input is from the mobile terminal 50e, the controller 170 may perform control to display an external input image from the mobile terminal 50e to overlap on a screen image including the plurality of displayed images without change in scaling ratio or displayed position.

In particular, the controller 170 may perform control to display the external input image from the mobile terminal 50e in a region of the screen image, in which the plurality of images are not displayed.

Figure 36C:
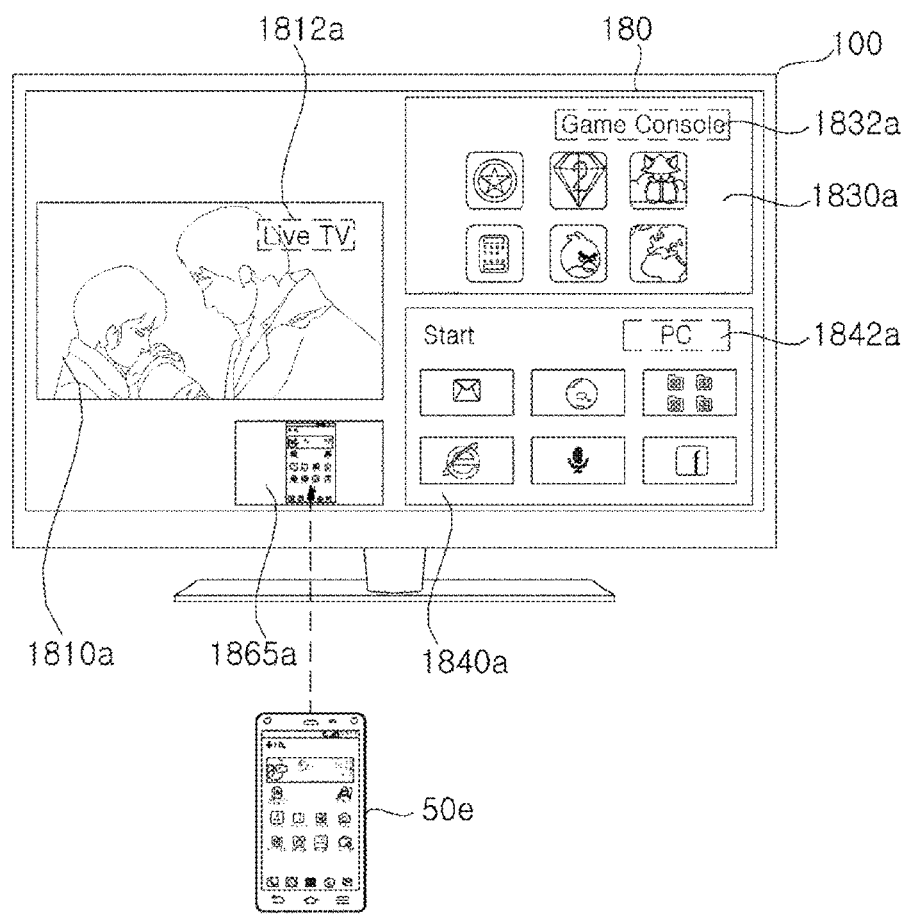

FIG. 36C illustrates the case in which an image 1865a of a mobile terminal is displayed in the remaining region except for the region for display of the split images when the mobile terminal 50e transmits an image thereof to the image display apparatus 100 according to a miracast function while three split images 1810, 1830, and 1840 are displayed as one screen image.

FIGS. 37A to 38B are diagrams illustrating various examples of a moving method of a split image.

Figure 37A:
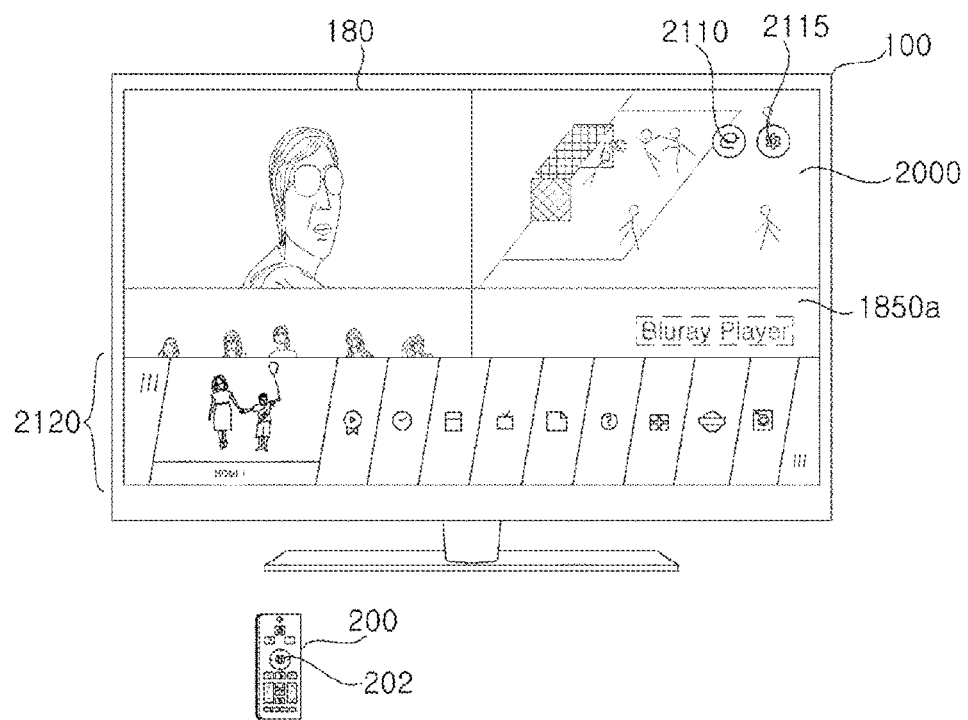

FIG. 37A illustrates the case in which a predetermined key 202 of the remote control device 200 is operated while an image 2000 containing a plurality of split images and an application list 2120 containing a plurality of application items are displayed.

Accordingly, as illustrated in the drawing, an object 2110 indicating an external input item and an object 2115 indicating a setting item may be displayed.

Figure 37B:
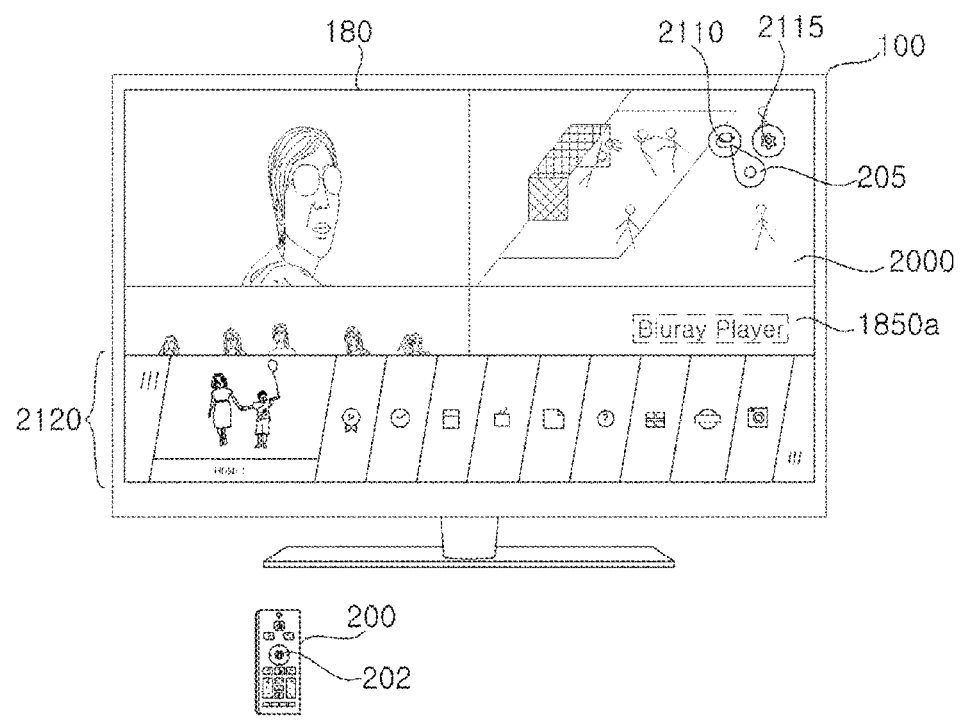

FIG. 37B illustrates the case in which a pointer 205 displayed to correspond to the remote control device 200 is positioned on the object 2110 indicating an external input item to select the object 2110 indicating the external input item.

When input for viewing an external input list is present, the controller 170 may perform control to display an object indicating the external input list containing a plurality of external input items and to move and display an image corresponding to a selected external input item when any one of a plurality of external input items is selected and is moved to any one of regions for display of a plurality of displayed images.

Figure 37C:
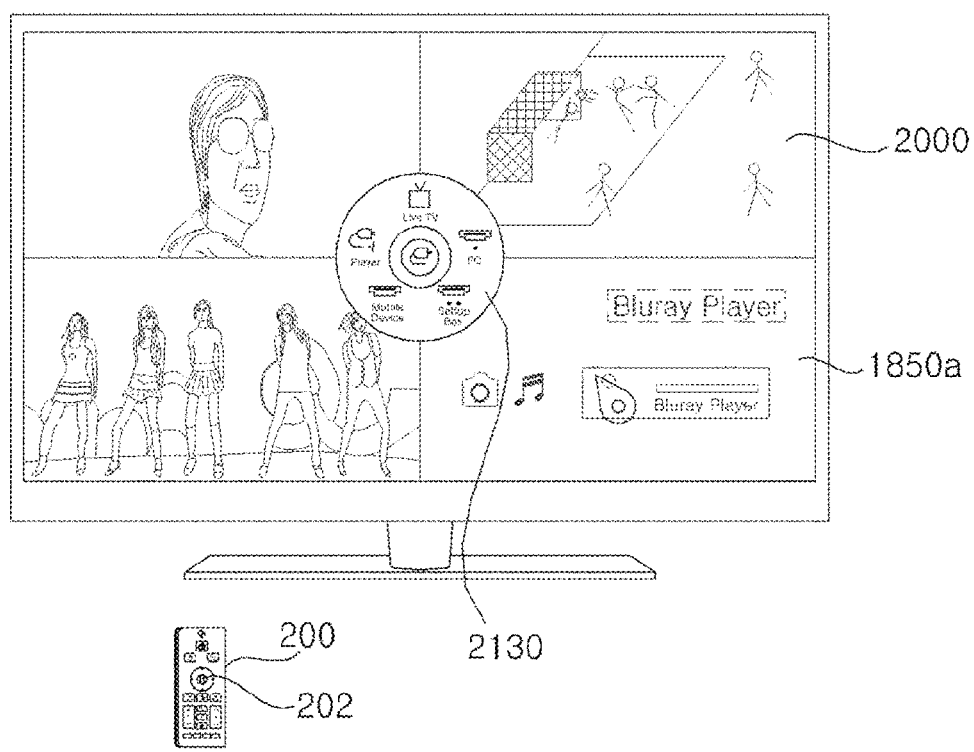

FIG. 37C illustrates the case in which an object 2130 indicating an external input list is displayed at the center of a screen image 2000 according to selection of the object 2110 indicating the external input item. The object 2130 indicating the external input list may contain items indicating a source of a currently displayed split image.

Figure 37D:
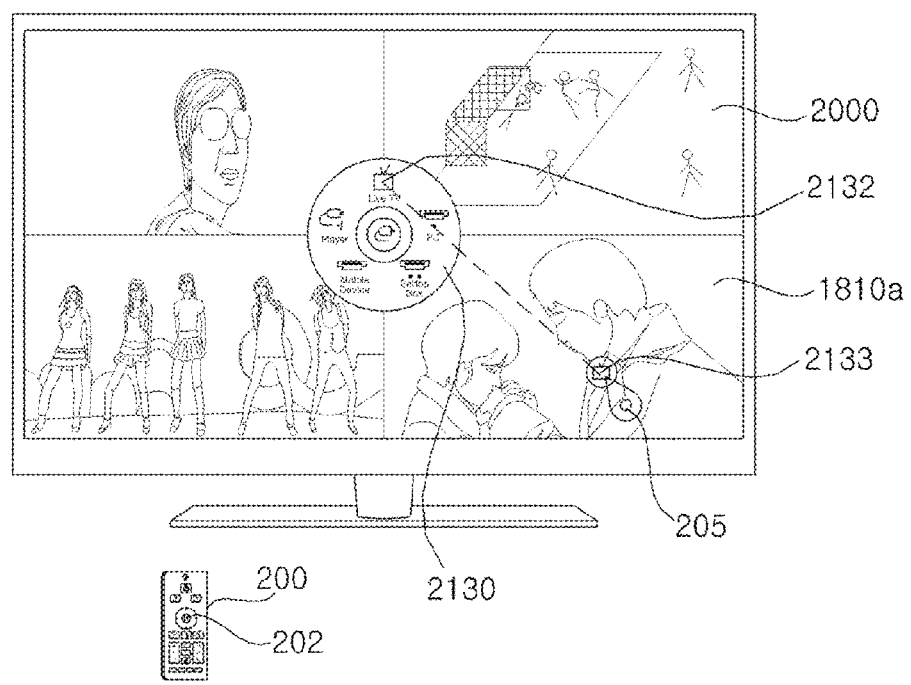

FIG. 37D illustrates the case in which a TV item 2132 is selected from the object 2130 indicating an external input list and is dragged and dropped to a bottom right region. Accordingly, the broadcast image 1810a may be moved and displayed at the bottom right region. The broadcast image 1810a may include the object 1812a indicating source information, as illustrated in the drawing.

On the other hand, any one of a plurality of displayed split images may be dragged and dropped to change a displayed position.

The controller 170 may perform control to display, on the display 180, a pointer that is moved and displayed based on a moving signal from the remote control device 200 and perform control to move and display a dragged image in a corresponding region when any one of a plurality of displayed images is dragged and dropped to the corresponding region, which will be described with reference to FIGS. 38A and 38B.

Figure 38A:
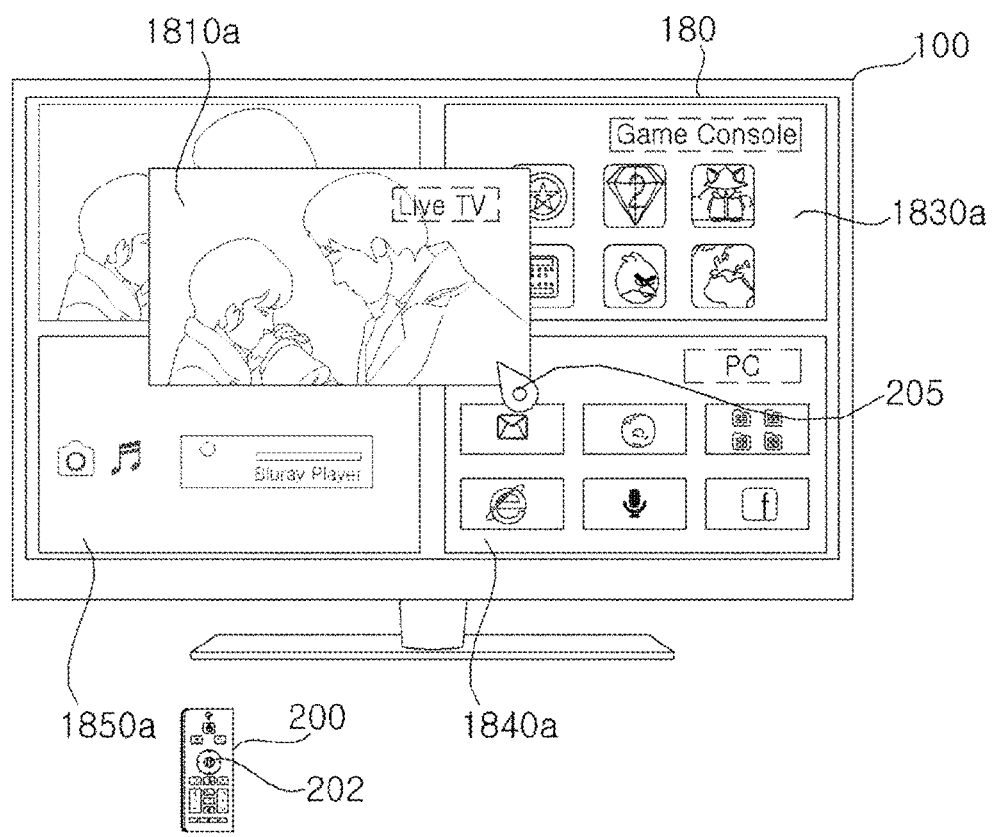
Figure 38B:
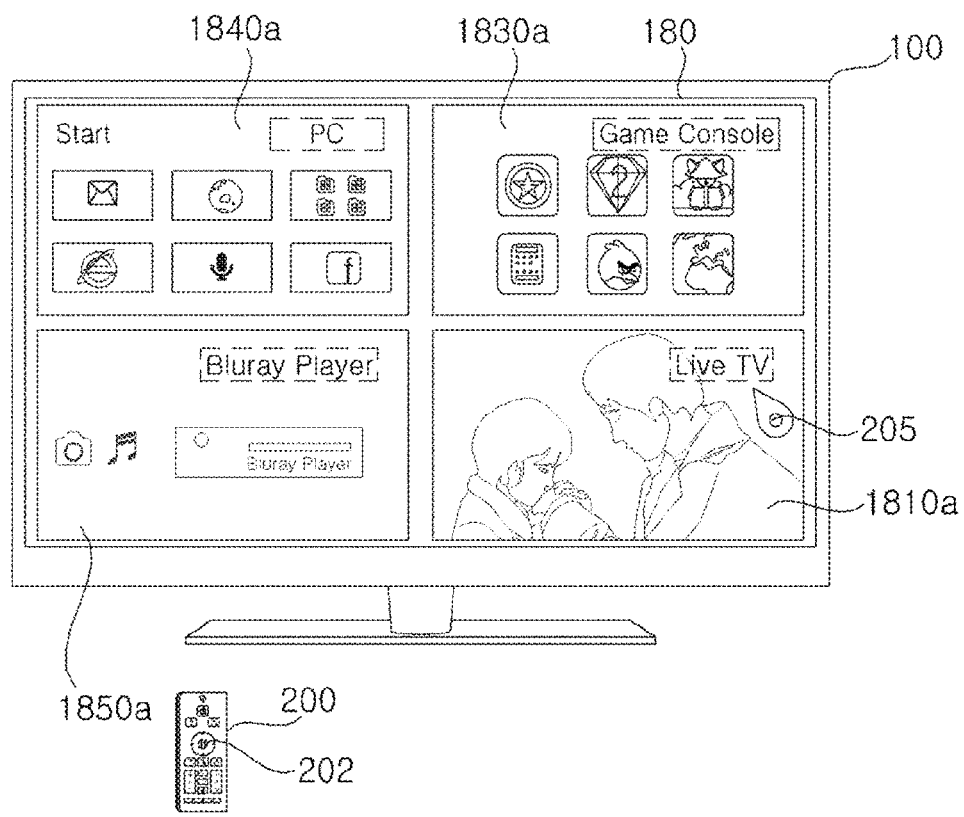

FIG. 38A illustrates the case in which the broadcast image 1810a is dragged in a bottom right direction using the pointer 205 while a plurality of split images 1810a, 1830a, 1840a, and 1850a is displayed as one screen image.

The broadcast image 1810a may be sequentially changed in a displayed position in response to drag moving input. In addition, when the broadcast image 1810a is dropped to a bottom right region, the broadcast image 1810a may be moved and displayed in the bottom right region of a plurality of split regions, as illustrated in FIG. 38B.

In particular, the drawing illustrates the case in which the broadcast image 1810a displayed in a top left portion and the PC image 1840a displayed in a bottom right portion are exchanged in displayed positions.

Accordingly, a user may simply move a split image to a position desired by the user.

According to an embodiment of the present invention, an image display apparatus may include a display panel, a backlight unit including a plurality of light sources to output light to the display panel, an image receiver to receive multiple images from a plurality of image sources, and a controller to perform control to display the multiple images received from the image receiver and to independently perform local dimming on each multiple image according to multiple image display input, and thus may perform local dimming for each multiple image during display of the multiple images. That is, brightness expressiveness or contrast for each multiple images may be enhanced, thereby overcoming the issue in terms of different display of multiple images and enhancing overall image quality.

According to another embodiment of the present invention, an image display apparatus may include a display panel, a backlight unit including a plurality of light sources to output light to the display panel, an image receiver to receive multiple images from a plurality of image sources, and a controller to perform control to display the multiple images received from the image receiver, to calculate an APL for each multiple image, to perform clipping on a brightness level of the multiple images based on the APL for each multiple image, and to drive a light source based on a brightness level clipped for each multiple image, according to multiple image display input, and thus may perform local dimming for each multiple image during display of the multiple images. That is, brightness expressiveness or contrast for each multiple images may be enhanced, thereby overcoming the issue in terms of different display of multiple images and enhancing overall image quality.

According to another embodiment of the present invention, an image display apparatus may include a display panel, a backlight unit including a plurality of light sources to output light to the display panel, an image receiver to receive multiple images from a plurality of image sources, and a controller to perform control to display black of a first image with lower brightness than black of other images of the multiple images during display of black of the first image of the multiple images when an APL of a single image containing multiple images is a first predetermined value, if an APL of the first image of the multiple images is a second predetermined value less than the first predetermined value, and thus may perform local dimming for each multiple image during display of the multiple images. That is, brightness expressiveness or contrast for each multiple images may be enhanced, thereby overcoming the issue in terms of different display of multiple images and enhancing overall image quality.

According to another embodiment of the present invention, an image display apparatus may include an image receiver for receiving a plurality of images, a display for displaying the plurality of images as the same screen image, and a controller for performing control to display an indicator for selecting or focusing on any one of the plurality of images, to display an image setting object when image setting input for an image with the indicator positioned thereon is present, and to set a setting value set according to the image setting object to the same value with respect to all the plurality of images, thereby simply performing image setting on the plurality of images.

According to another exemplary embodiment of the present invention, an image display apparatus may include a display, an image receiver for receiving a plurality of images, and a controller for performing control to display a plurality of images as the same screen image according to image split display input and to display source information of the plurality of images together during display of the plurality of images such that a user simply recognizes the source information of the plurality of image while the plurality of images is displayed as the same screen image.

According to moving input of a plurality of images, positions for displaying the plurality of images may be freely changed, thereby enhancing use convenience of a user.

The operating method of an image display apparatus according to the present invention may also be embodied as processor readable codes on a processor readable recording medium. The processor readable recording medium is any type of recording device that stores processor readable data. Examples of the processor readable recording medium include read-only memory (ROM), random-access memory (RAM), CD-ROMs, magnetic tapes, hard discs, floppy discs, a optical data storage devices, and so on. In addition, the processor readable recording medium may also be distributed over network coupled computer systems so that the processor readable code is stored and executed in a distributed fashion.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An image display apparatus comprising:
a display panel;
a backlight unit including a plurality of light sources to output light to the display panel;
an image receiver that receives multiple images from a plurality of image sources, the image receiver including a broadcast receiver to receive a broadcast image and a plurality of HDMI terminals for connecting external devices; and
a controller device that controls the display panel to display the multiple images received from the image receiver and to independently perform local dimming on each of the multiple images according to multiple image display input,
wherein the controller device performs clipping on a brightness level of each of the multiple images based on an average brightness level for each of the multiple images,
wherein when the average brightness level of each of the multiple images is a large value, the controller device adjusts a clipping value of each of the multiple images upward so as to increase brightness of black data of each of the multiple images,
wherein as the average brightness level of each of the multiple images is a small value at least below the large value, the controller device adjusts the clipping value of each of the multiple images downward so as to decrease brightness of black data of each of the multiple images,
wherein the controller device controls the display panel to display black of a first image with lower brightness than black of other images of the multiple images during display of black of the first image of the multiple images when an average brightness level of a single image containing the multiple images is a first predetermined value, an average brightness level of the first image of the multiple images is a second predetermined value less than the first predetermined value, and an average brightness level of the first image of the multiple images is a lowest average brightness level,
wherein the controller device sets black data of a second image of the multiple images with a highest average brightness level as lightest.

2. The image display apparatus according to claim 1, wherein the controller device outputs backlight control data for control of the plurality of the light sources based on at least one of the brightness level and a dimming value of the multiple images.

3. The image display apparatus according to claim 1, wherein the controller device performs control to display black of a first image with higher brightness than black of other images of the multiple images during display of black of the first image of the multiple images when the average brightness level of a single image containing the multiple images is a third predetermined value, when the average brightness level of the first image of the multiple images is a fourth predetermined value greater than the third predetermined value.

4. The image display apparatus according to claim 1, wherein the controller device performs control to calculate an average brightness level for each of the multiple images, to perform clipping on the brightness level of the multiple images based on the average brightness level for each of the multiple images, and to drive the plurality of the light sources based on the brightness level clipped for each of the multiple images.

5. The image display apparatus according to claim 1, wherein the controller device comprises:
an average brightness level calculator to calculate the average brightness level for each of the multiple images;
a clipping unit to perform clipping on the brightness level of the multiple images based on the average brightness level for each of the multiple images; and
a backlight control data generator to generate backlight control data for control of the plurality of the light sources based on the brightness level clipped for each of the multiple images.

6. The image display apparatus according to claim 5, wherein the controller device further comprises a pixel compensator to compensate for a pixel of video data based on a brightness level clipped for each of the multiple images and to output compensated video data.

7. The image display apparatus according to claim 1, wherein the controller device receives a single image containing the multiple images and calculates a dimming value for local dimming based on the single image, extracts multiple images from the single images containing the multiple images, calculates the average brightness level for each of the extracted multiple images, and outputs backlight control data for control of the plurality of the light sources based on the dimming value and the average brightness level.

8. The image display apparatus according to claim 1, wherein the controller device comprises:
   a dimming value calculator to receive a single image containing the multiple images and to calculate a dimming value for local dimming based on the single image;
   an average brightness level calculator to calculate the average brightness level for each of the multiple images;
   a clipping unit to perform clipping on the brightness level of the multiple images based on the average brightness level for each of the multiple images; and
   a backlight control data generator to generate backlight control data for control of the plurality of the light sources based on a brightness level clipped for each of the multiple images and the dimming value.

9. The image display apparatus according to claim 8, wherein the controller device further comprises a pixel compensator to compensate for a pixel of video data based on the brightness level clipped for each of the multiple images and to output compensated video data.

10. The image display apparatus according to claim 1, wherein the controller device calculates each of the multiple images, calculates the average brightness level for each of the multiple images, performs clipping on the brightness level of the multiple images based on the average brightness level for each of the multiple images, and generates backlight control data for control of the plurality of the light sources based on a brightness level clipped for each of the multiple images and a dimming value calculated for each of the multiple images.

11. The image display apparatus according to claim 1, wherein the controller device comprises:
   a dimming value calculator to calculate a dimming value for each of the multiple images;
   an average brightness level calculator to calculate the average brightness level for each of the multiple images;
   a clipping unit to perform clipping on the brightness level of the multiple images based on the average brightness level for each of the multiple images; and
   a backlight control data generator to generate backlight control data for control of the plurality of the light sources based on the brightness level clipped for each of the multiple images and a dimming value calculated for each of the multiple images.

12. The image display apparatus according to claim 1, wherein the controller device extracts multiple images from a single image containing the multiple images, calculates a dimming value for each of the extracted multiple images, and outputs backlight control data for control of the plurality of the light sources based on the dimming value.

13. The image display apparatus according to claim 1, wherein the controller device comprises:

a multiple image extractor to extract multiple images from a single image containing the multiple images;
   a dimming value calculator to calculate a dimming value for each of the extracted multiple images; and
   a backlight control data generator to generate backlight control data for control of the plurality of the light sources based on the dimming value.

14. An image display apparatus comprising:
   a display panel;
   a backlight unit including a plurality of light sources to output light to the display panel;
   an image receiver that receives multiple images from a plurality of image sources, the image receiver including a broadcast receiver to receive a broadcast image and a plurality of HDMI terminals for connecting external devices; and
   a controller device that controls the display panel to display the multiple images received from the image receiver, to calculate an average brightness level for each of the multiple images, to perform clipping on a brightness level of the multiple images based on the average brightness level for each of the multiple images, to drive the plurality of the light sources based on a brightness level clipped for each of the multiple images,
   wherein when the average brightness level of each of the multiple images is a large value, the controller device adjusts a clipping value of each of the multiple images upward so as to increase brightness of black data of each of the multiple images,
   wherein as the average brightness level of each of the multiple images is a small value at least below the large value the controller device adjusts the clipping value of each of the multiple images downward so as to decrease brightness of black data of each of the multiple images,
   wherein the controller device controls the display panel to display black of a first image with lower brightness than black of other images of the multiple images during display of black of the first image of the multiple images when an average brightness level of a single image containing the multiple images is a first predetermined value, an average brightness level of the first image of the multiple images is a second predetermined value less than the first predetermined value, and an average brightness level of the first image of the multiple images is a lowest average brightness level,
   wherein the controller device sets black data of a second image of the multiple images with a highest average brightness level as lightest.

15. The image display apparatus according to claim 14, wherein the controller device performs control to display black of a first image with higher brightness than black of other images of the multiple images during display of black of the first image of the multiple images when an average brightness level of a single image containing the multiple images is a third predetermined value, when an average brightness level of the first image of the multiple images is a fourth predetermined value greater than the third predetermined value.

16. An image display apparatus comprising:
   a display panel;
   a backlight unit including a plurality of light sources to output light to the display panel;
   an image receiver that receives multiple images from a plurality of image sources, the image receiver including a broadcast receiver to receive a broadcast image and a plurality of HDMI terminals for connecting external devices; and a controller device that controls the display panel to display black of a first image with lower brightness than black of other images of the multiple images during display of black of the first image of the multiple images when an average brightness level of a single image containing multiple images is a first predetermined value, an average brightness level of the first image of the multiple images is a second predetermined value less than the first predetermined value, and an average brightness level of the first image of the multiple images is a lowest average brightness level, wherein the controller device performs clipping on a brightness level of each of the multiple images based on an average brightness level for each of the multiple images, wherein when the average brightness level of each of the multiple images is a large value, the controller device adjusts a clipping value of each of the multiple images upward so as to increase brightness of black data of each of the multiple images, wherein as the average brightness level of each of the multiple images is a small value at least below the large value the controller device adjusts the clipping value of each of the multiple images downward so as to decrease brightness of black data of each of the multiple images, wherein the controller device sets black data of a second image of the multiple images with a highest average brightness level as lightest.

17. The image display apparatus according to claim 16, wherein the controller device performs control to display black of the first image with higher brightness than black of other images of the multiple images during display of black of the first image of the multiple images when an average brightness level of the single image containing the multiple images is a third predetermined value, when an average brightness level of the first image of the multiple images is a fourth predetermined value greater than the third predetermined value.

* * * * *